US005530483A

United States Patent [19]

Cooper et al.

[11] Patent Number: 5,530,483

[45] Date of Patent: Jun. 25, 1996

[54] DELAY DETECTOR APPARATUS AND METHOD FOR PLURAL IMAGE SEQUENCES

[75] Inventors: James C. Cooper, Monte Sereno; Steven J. Anderson, Cupertino, both of Calif.

[73] Assignee: Pixel Instruments Corp., Los Gatos, Calif.

[21] Appl. No.: 321,280

[22] Filed: Oct. 11, 1994

[51] Int. Cl.$^6$ .......................... H04N 9/475; H04N 17/00

[52] U.S. Cl. .......................... 348/518; 348/422; 348/192; 382/209; 371/62

[58] Field of Search .................................... 348/512, 518, 348/615, 422, 192, 97, 129, 914; 382/209, 217, 218, 107, 236, 278; 371/62, 65, 57.1; H04N 17/00, 9/475

[56] References Cited

U.S. PATENT DOCUMENTS

| | | | |
|---|---|---|---|
| Re. 33,535 | 10/1987 | Cooper | 358/149 |
| 4,313,135 | 1/1982 | Cooper | 358/149 |
| 4,377,820 | 3/1983 | ReitMeier | 371/65 |
| 4,611,347 | 9/1986 | Netrauali et al. | 382/218 |
| 4,933,759 | 6/1990 | van der Meer et al. | 348/97 |
| 4,963,030 | 10/1990 | Makur | 348/422 |
| 4,972,412 | 11/1990 | Satoh | 371/62 |
| 5,068,723 | 11/1991 | Dixit et al. | 348/422 |
| 5,329,538 | 7/1994 | Kawano et al. | 371/65 |

*Primary Examiner*—Safet Metjahic
*Assistant Examiner*—Jeffrey S. Murrell
*Attorney, Agent, or Firm*—J. Carl Cooper

[57] ABSTRACT

The apparatus and method described herein shows a system of determining the delay of a delayed version of a sequence of images with respect to a relatively undelayed version. The system operates to take multiple samples of the delayed and undelayed versions at approximately the same sample position on the image and to correlate these samples over multiple image frames to determine which of a plurality of delayed images most closely match a given undelayed image. By knowing which delayed image frame most closely matches a given undelayed image frame it is shown to arrive at a coarse number of frames of delay. A fine delay measurement is achieved by adding a measure of the instantaneous frame to frame delay with respect to a known corresponding feature of the respective video type signals. The invention is also useful for comparing a given image to other images to determine the closest match.

56 Claims, 51 Drawing Sheets

FROM FIG.6A

TO FIG.6A-3

TO FIG. 7B
TO FIG. 7B-1
TO FIG. 7A-5
FROM FIG. 7A
C82 .1UF
C79 .1UF
C81 .1UF
C77 .1UF
+5VD
CER

FROM FIG. 7A-2
FROM FIG. 7A-5

RTS3
RTS2
RTS1
RTS0
GP3
GP2
GP1
GP0
COMPUTE 3
COMPUTE 2
COMPUTE 1
COMPUTE 0
FROM FIG. 7A-3
+5VD
R93 22K
R94 22K
R127 22K
TO FIG. 7A-7
J8
HEADER 2X7
R95 1K
R166 1K
U41C
74HC132
U42A
74HCT21
-12VA
U48 LM7905
IN
OUT
GND
C76 2.2UF 16V TANT
16V TANT

TO FIG. 7B-5

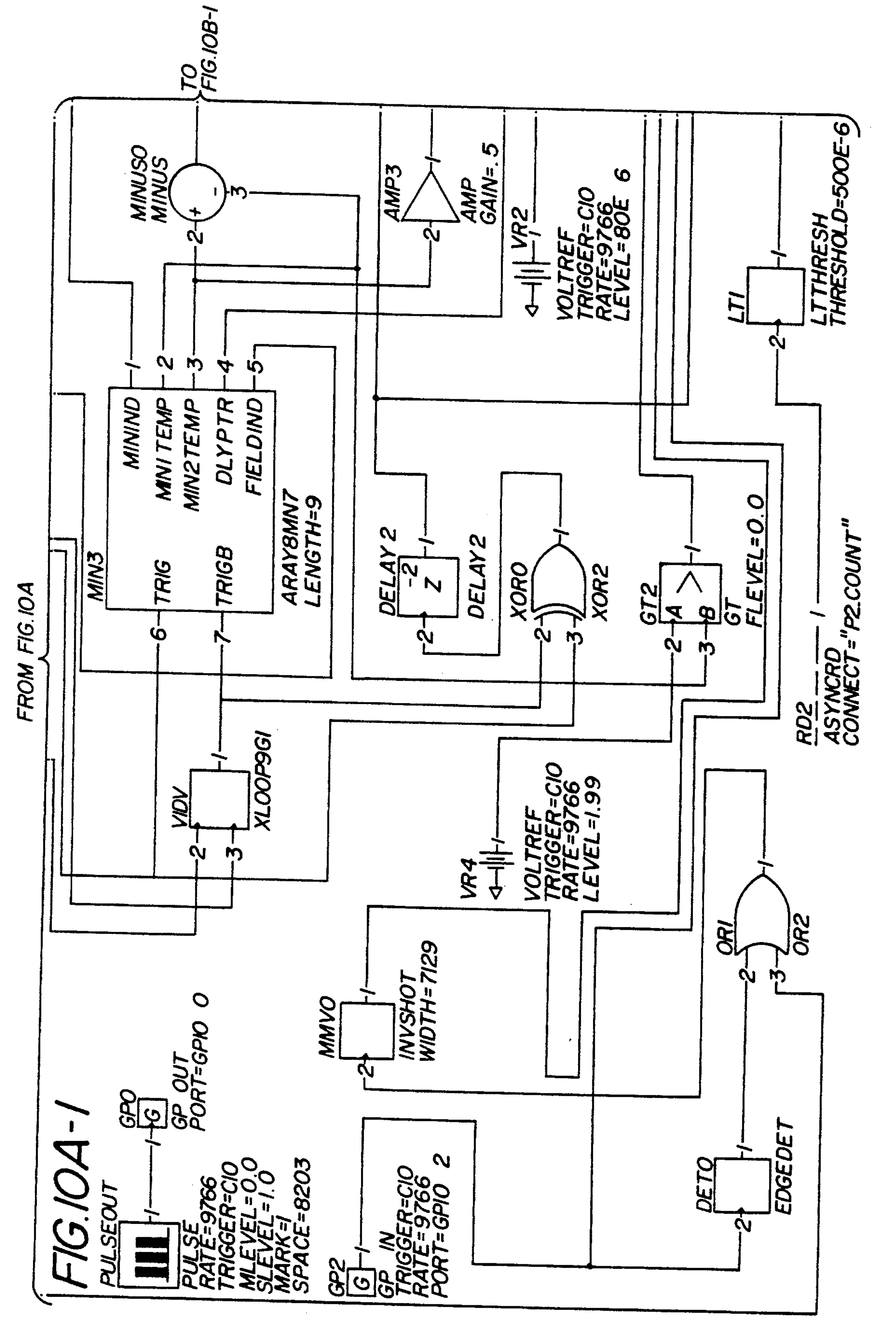
FIG.10A-1
TO FIG.10B-1
FROM FIG.10A
PULSEOUT
PULSE
RATE=9766
TRIGGER=CIO
MLEVEL=0.0
SLEVEL=1.0
MARK=1
SPACE=8203
GPO
GP OUT
PORT=GPIO 0
GP2
GP IN
TRIGGER=CIO
RATE=9766
PORT=GPIO 2
MIN3
MININD
MIN1TEMP
MIN2TEMP
DLYPTR
FIELDIND
TRIG
TRIGB
ARAY8MN7
LENGTH=9
MINUSO
MINUS
AMP3
AMP
GAIN=.5
VR2
VOLTREF
TRIGGER=CIO
RATE=9766
LEVEL=80E 6
LT1
LTTHRESH
THRESHOLD=500E-6
DELAY 2
DELAY2
XOR0
XOR2
GT2
GT
FLEVEL=0.0
RD2
ASYNCRD
CONNECT="P2.COUNT"
VIDV
XLOOP9GI
VR4
VOLTREF
TRIGGER=CIO
RATE=9766
LEVEL=1.99
MMVO
INVSHOT
WIDTH=7129
OR1
OR2
DETO
EDGEDET

DELAY DETECTOR APPARATUS AND METHOD FOR PLURAL IMAGE SEQUENCES

BACKGROUND OF THE INVENTION

The invention relates to the measurement of delays of sequences of images such as film and video type signals in order to provide a measure of quality of image processing circuitry or to provide compensation processing of associated signals. In particular, it is known to subject video like signals to various types of processing which delay the signal by delays which can consist of multiple frame periods in length. It is desirable to measure this delay in order to modify the processing or transmission of the signal to keep the delay to a minimum, to delay corresponding signals by a corresponding amount to preserve mutual synchronization, or for other purposes as will become known to one skilled in the art from the teachings herein.

1. Field of the Invention

The field of the invention includes processing of sequences of images such as television video signals, motion picture film and the like by various electronic, optical and mechanical devices, which processing adds a delay to the signal. Since these image sequences are often utilized in conjunction with other sequences of events or signals, the delays which are imparted cause synchronization problems with the need to correct other signals accordingly, or otherwise to minimize the delay. Of particular interest are television programs consisting of a video signal and one or more associated audio signals where the delay of the video signal without delaying the corresponding audio signal creates a corresponding lip sync error which can be most annoying to the television program viewer. The image sequences may be conveyed in raster scan, bit mapped, compressed or any other of the various forms or formats which are well known in the art on electronic, magnetic, optical or other of the various well known storage, distribution and transmission methods.

2. Description of the Prior Art

In the motion picture film industry it is known to measure the speed of film frames or sprocket holes past a given point to synchronize the film to sound recordings, however it is believed that there are no devices which measure the relative delay of a given film frame with respect to any plurality of its positions in time.

Several video processing devices utilize internal circuitry to determine the delay of the video signal through the device. While this method is capable of considerable accuracy and low cost, it is not readily suitable for measuring the delay through multiple devices since the individual delays would need to be summed by some means. In addition, the internal circuitry to provide such measurement must be incorporated in the design upon manufacture, otherwise costly retrofitting is required. There are already numerous devices in use which do not include such internal circuitry, thus there is a need for a device which can measure delays without internal modification of existing products.

U.S. Pat. No. 4,313,135 describes an audio to video synchronization apparatus and method with a method of detecting the delay of a video signal by comparing the relatively delayed and undelayed signals in a phase locked loop type circuit coupled with a video correlator (16 of FIG. 2). The correlator performs a correlation of the delayed and undelayed video to determine if the same frame of a current (undelayed) and previous (delayed) signal are being applied to the inputs.

The '135 correlator operates such that each signal, delayed and undelayed, is sampled and the sample value stored as in a sample and hold circuit, at the center of several active video lines. The line samples are subtracted, i.e. the sample from line number X from input (undelayed) video is subtracted from the sample from X of output (delayed) video, the absolute value of the difference being a measure of the correlation or matching of the lines. The absolute value of the differences for a number of lines is averaged thus giving a voltage which is proportional to the correlation between the delayed and undelayed video signals. If the undelayed and delayed video signal present the same image frame during the frame period they will match, thus the difference voltage will be low indicating the correlation is high. If the undelayed and delayed video signal present a different image frame during the frame period they will not match due at least to random noise, then the difference voltage will be higher indicating the correlation is low. This signal is used to determine if the delay is less than a frame or greater than a frame. In the presence of NTSC color subcarrier it is known that the picture period comprises two frames (or four fields), the subcarrier being reversed on the second frame with respect to the first. This allows the correlator to distinguish delays of up to one frame, from delays between one and two frames but can not distinguish delays over two frames from delays less than two frames, since the subcarrier for frame 1 is the same phase as in frame 3.

The circuit described in '135 has difficulty distinguishing the number of frames of delay of the delayed signal once the delay exceeds one unique picture period, since the correlation when anything but a less than one unique picture period signal delay is present is always low. Consequently while the correlation system shown in '135 may distinguish between a partial frame and a one plus partial frame delay, it is unsuitable for example to use to distinguish a delay of 3 frames from a delay of one frame.

U.S. Patent No. Re. 33,535 reissued Feb. 12, 1991 with an initial issue date of Oct. 27, 1987 shows how to measure relative audio to video delays by use of timing signals encoded on the video, but does not have measurement of relative delay by use of the video itself.

SUMMARY OF THE INVENTION

The invention described herein provides for taking a set of samples at known image locations on a known image frame of a relatively undelayed video or other type signal or image conveyance and taking a set of samples from corresponding image locations of each of multiple relatively delayed versions of said image frame. For most images, especially rectangular and the special rectangular case, square, the samples taken are located within a circle which is contained within the rectangle. It is thus preferred to take these samples from within the circle, and in particular from within a circle which has a diameter which is 10% to 50% smaller than the smaller side dimension of the rectangle and centered therein. This range of sizes is believed to provide optimum image to image differences. This is believed to be caused by the fact that the important parts of the image, and hence the most motion and detail, are intentionally kept in the center of the frame during production. It is also preferred to take the samples on only the luminance portion of the image, since the colors of a given image are often noisy, distorted and lower resolution as compared to the luminance, however if the color is of adequate quality, the samples may be taken accordingly from one or more of the various color components. Such color component operation may be simply obtained by placing a color component separator circuit in front of the A–D input as is well known in the art.

While the words sampling and taking samples as used herein includes the traditional meaning of taking and storing an analog or digital value of the brightness of the luminance or chrominance of the image, it will be understood that this wording is intended to also include the taking of any parameter which is related to the image and which in a given location of the image frame can be expected to be different for different images. What is important is that some measure of the image be taken at a given location so that the accumulation of the image to image differences of multiple ones of these measures may be made in order to determine a measure of image correlation or matching.

The undelayed sample set is compared to each of the delayed sample sets to determine which delayed sample set most closely matches the undelayed sample set. By determining the most closely matching delayed image sample set the delay of the delayed image is thereby determined to an accuracy of one image period. The delay may be determined with higher accuracy by comparing a known point on the undelayed image signal or conveyance to a known point on the delayed image signal or conveyance for a fine determination of the relative delay of the image frame period, or the phase between the delayed image and undelayed image. The points on the delayed or undelayed image signal may be sync pulses, sprocket holes, frame headers, or other known points whose location is defined. The fine delay is then combined with the coarse (frame match) delay to obtain the more accurate delay value. The invention is also useful for matching images or detecting a change in an image, without any determination of delay involved.

This delay measurement invention is especially useful for image systems having variable frame rates, as well as variable delays. For example imaging systems which have frames sent at constant rates where the constant rate can be changed from time to time as well as systems where each image, or group of images has associated with it a display time which determines how long each image or group of images is to be displayed. Such systems are novel and provide highly efficient transmission of motion images, since the frame rate may be changed to suit the amount of motion to be displayed at a particular instant in time. Such systems may be used for example in video systems or in film systems which are electronically controlled. The present invention is also useful for conversion systems which convert images from one format or system to another, such as for example a television standards convertor.

When the invention is used for determining the best match between a first image and a set of other images, this embodiment comprises taking a first set of samples from selected known locations on the first image, taking a second set of samples from one of the set of other images at the same or similar image locations and taking a third set of samples from another of the other images at the same or similar image locations, thus providing at least three sets of samples. The first set of samples is compared to the second set of samples and to the third set of samples, etc. to determine which most closely match the first set. The most closely matching set is useful in that it indicates a high probability of an image match.

When the invention is used for determining the delay of a delayed version of a sequence of images with respect to a relatively undelayed version, the embodiment comprises taking a first set of samples of one of the images of the undelayed sequence at known sample positions, followed by taking at least a second and third set of samples for separate images of the delayed sequence at the same or similar known sample positions and comparing the first set of samples to the second set of samples and to the third set of samples, etc. to determine which of the second, third etc. set of samples most closely matches said first set. It will be understood that while samples are preferred to be taken from consecutive images, that it is also useful to take them from nonconsecutive images, and in fact this may be required in systems which drop, repeat or interpolate images such as in standards convertors and many compression systems.

It may be noted that while the above description pertains to taking samples for comparing one undelayed image and a plurality of delayed images, it is also possible to compare one delayed image to a plurality of undelayed images, or to compare a plurality of undelayed images to a plurality of delayed images as will become apparent to one skilled in the art from the teachings herein.

The invention is useful with any sort of time related transmission, storage or conveyance of image information, such as television video, film, holographic recording, light transmission and others as will become apparent to one skilled in the art from the teachings given herein.

DESCRIPTION OF THE PREFERRED EMBODIMENT

Figure 1:
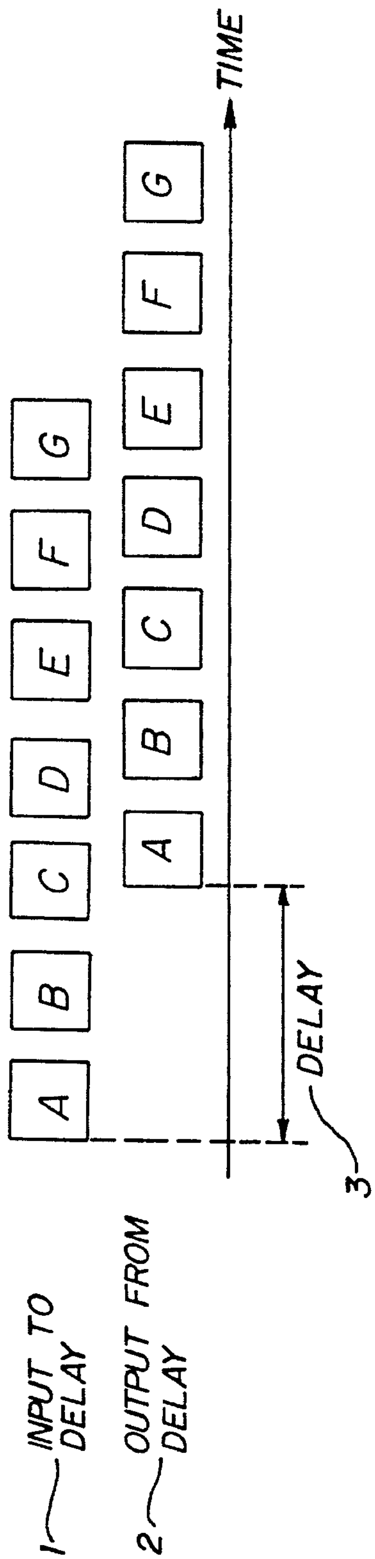
FIG. 1 is a drawing demonstrating the time relationship between relatively delayed and undelayed sequences of images.

FIG. 1 is a drawing demonstrating the time relationship between relatively delayed and undelayed sequences of images. An input sequence of images is shown as 1 and the delayed version of the same sequence of images is shown as 2. It is clearly seen that image A is delayed by time 3, and correspondingly that images B–G are also delayed by the same amount of time. This sequences of images is shown independent of the medium by which they are conveyed, and for example could represent a video signal which is passed through a video frame synchronizer or a motion picture film which is passed from one point to another with a temporary storage bin there between. Note that while FIG. 1 shows a constant frame rate, this is done only by way of example and non-constant frame rates are understood to be represented as well.

If the film were passed by one point at a first rate, for example a projection aperture in one theater or scanner and into the bin, and then taken out of the bin at another rate and passed by another point, for example a projection aperture in a second theater or scanner, the delay would be constantly changing as the amount of film stored in the bin increases or decreases due to the different feed in and feed out rates. Such operation may be found for example in multiple projection scanners providing movies starting at different time increments (such as every 15 minutes) or for multiple channel television distribution systems. Such operation could also be found for example in multiple room movie theaters providing movies starting at different time increments. In such systems it would be desirable to also delay a digital audio signal in memory, having it synchronized to the various image projections.

In television systems, video signals are frequently passed through video frame synchronizers where they are resynchronized to a different reference clock. This action results in a constantly varying delay amount which requires that the audio portion of the program also undergo a constantly changing delay in order to keep it in synchronization with the video. Such systems were described in more detail in the '135 patent and are well known in the art.

Figure 2:
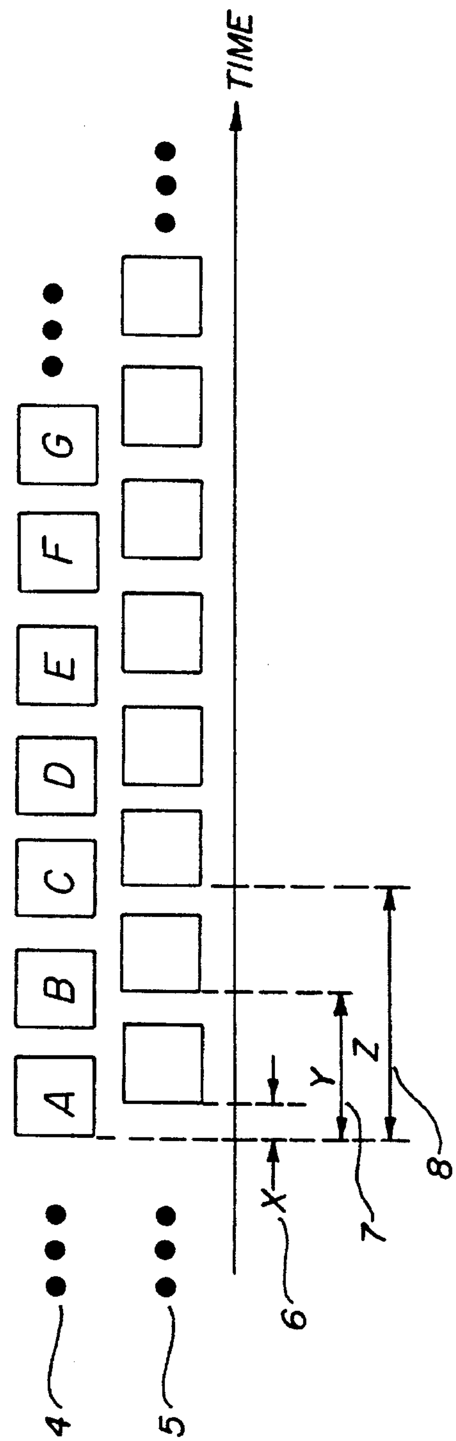
FIG. 2 is a drawing demonstrating the multiple possible time relationship between relatively delayed and undelayed sequences of images.

FIG. 2 is a drawing demonstrating the multiple possible time relationship between relatively delayed and undelayed sequences of images. An undelayed image sequence 4 is shown with its time relationship to a sequence of delayed images 5. Because it is not known which delayed image corresponds to a given undelayed image, the delay may be amount X shown by 6, amount Y shown by 7, amount Z shown by 8 or any other amount corresponding to one of the delayed images.

Figure 3:
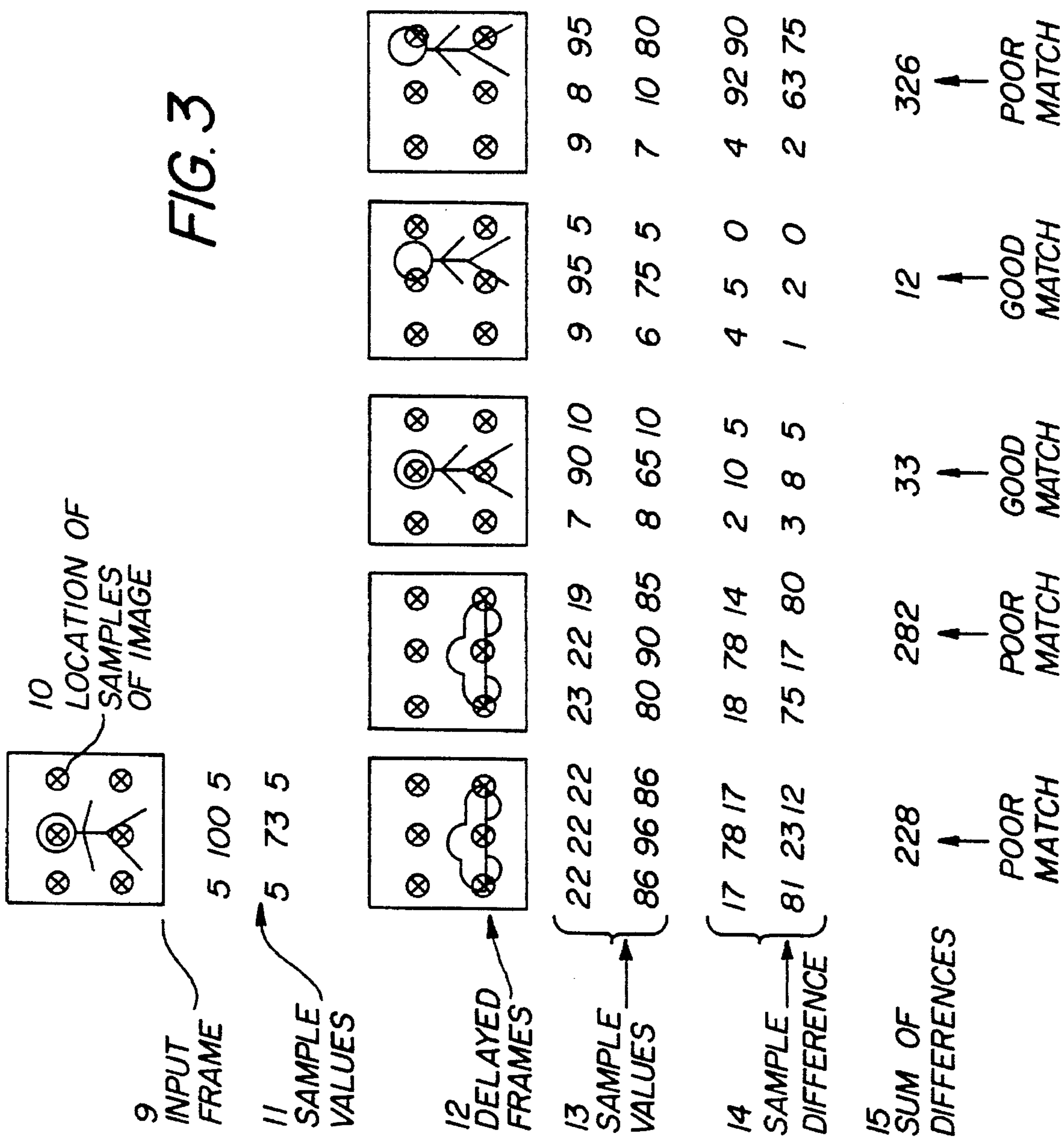
FIG. 3 is a drawing explaining a first embodiment of the invention.

FIG. 3 is a drawing explaining a first embodiment of the invention showing a method of determining how well a given image matches each of a number of other images. The other images may be a delayed version of an image stream from which the given image is taken, or may be other relatively unrelated images. The first or input image frame 9 is shown with six samples being taken at locations 10 shown by a circled X. The brightness values 11 of each of the six samples is shown in a corresponding matrix below the image 9.

A group of comparison images 12 which for this example may be delayed frames of the image sequence or independent images, which 9 is taken from is shown below. The sample brightness values for each frame is shown below the frame as 13. The magnitude of the difference between frame 9 and each delayed frame is shown as 14 below the corresponding frame. A sum of all of the difference magnitudes is shown as 15 below 14, with each being indicated as a good match or a poor match. It should be noted that two of the three frames with the stick figure are good matches, and the last frame where the stick figure has moved and the two frames with an auto figure are poor matches. In operation, it is preferred that the invention determines which of the good matches is the correct one by repeatedly determining the best match for each new input image frames and keeping a running average or history of which frame number is the best. Any temporary ambiguity such as shown in FIG. 3 may be resolved by reference to the history. For example, if the third frame has been the correct frame for the past several frames, then it is highly likely that the third frame is the correct match, even though its sum of differences (33) is higher than the fourth frame sum of differences (12). In this manner, the correct one of delays 6, 7 or 8 of FIG. 2 may be determined.

In addition, other operations may be utilized to resolve such ambiguities. For example it may be desired to set a threshold below which the match value must be before accepting that frame as a match. It is also useful that the next lowest match be a known amount above the threshold (an offset value), or above the lowest match value by a known amount or both. The threshold value and the known amount above the threshold may be suitably adjusted to match the amount of motion or frame/field differences in the signals such that for signals having lots of differences which provide a large number of high quality correlations the threshold and the known amount are set to relatively large amounts. For signals having few high quality correlations, the threshold and offset values can be set lower, thus allowing more frequent updates than would be obtained with high threshold and offset value, but with a lower immunity to errors. In addition, the signal to noise ratio or other measure of quality of the images or video signal(s) can be utilized to adjust these parameters, since a noisy signal provides more frame to frame changes (due to noise) thus allowing higher threshold and offset, up to a limit. For television video signals, at about a 45 dB signal to noise ratio, the noise on the sync causes the PLL to jitter, causing the sampling accuracy to diminish. The diminished sampling accuracy will add to the difference numbers due to the lack of positional correlation between samples from the (ideally) same position from undelayed and delayed frames.

For a given set of circumstances which indicates a match of images, it is useful to require a match at the same frame position for a known number of times, or alternatively for a known consecutive number of times before accepting that match position. It is also useful to only accept a match once in a given time period, forcing new match data to be ignored or held in abeyance until a known time after a previous match. Such operations will be recognized to provide a certain amount of security from false matching in the event that noise or other problems create ambiguous match data such as shown with respect to the third and fourth frames of FIG. 3.

The matching of images as shown in FIG. 3 thus determines a coarse delay to the nearest frame, and the fine delay is determined as shown in FIG. 2 by knowing which of the exact delays to choose. It is of course possible to actually only determine delay 6 and calculate delay 7 or 8 by simply adding two or three delay periods to 6 as is appropriate from the determination of the coarse delay as shown in FIG. 3, which coarse delay corresponds directly to the number of frame periods from a given undelayed to a given delayed frame.

It will be recognized by one skilled in the art that the inventive method of matching a given image to other images will have other uses as well as will become apparent to one skilled in the art from the teachings herein, for example finding a particular high resolution image or series of images stored in a data base of in, ages when one has a lower resolution version of the image available for comparison. Such an operation could aid in locating the exact source of pirated copyrighted images when only a poor quality copy was available.

Figure 4:
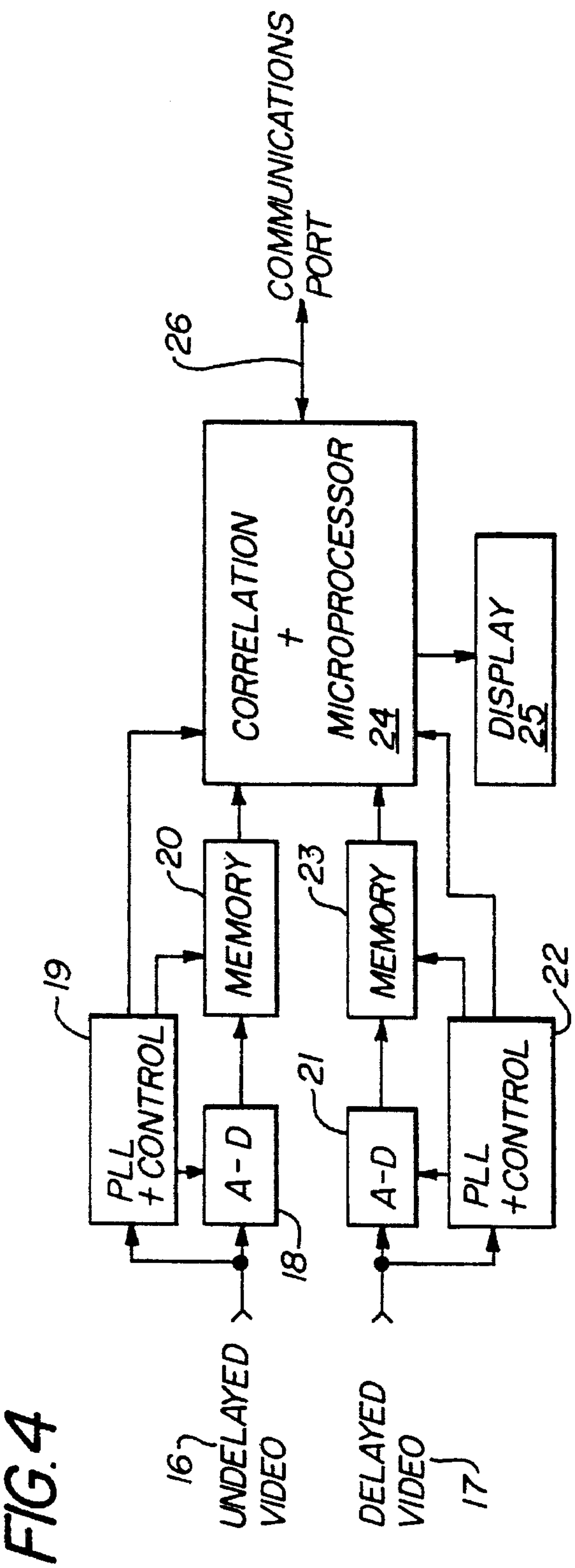
FIG. 4 is a drawing showing a first embodiment of the invention.

FIG. 4 is a block diagram showing a first embodiment of the invention for use with video signals. The undelayed video signal 16 is coupled to a PLL (phase locked loop) and control circuit 19 and an A–D convertor 18. Samples of the image are taken by the A–D at predetermined points on the image as controlled by 19. The samples are stored in a memory 20 and subsequently coupled to the correlation and microprocessor circuit 24 when all samples for a given image have been taken. Of course, it is possible to start as soon as the first pair to be correlated are available.

Similarly, the delayed video signal 17 is coupled to a PLL and control circuit 22 and an A–D convertor 21. Samples of the image are taken by the A–D at roughly the same predetermined points on the image as controlled by 22. It is of course desirable to have the samples taken at exactly the same points, however nothing is perfect, and it will be appreciated that often the image is the same or nearly the same in the entire area around the desired sample location so that exact positioning of the sample, while being desirable, is not required. The samples of the delayed image are stored in a memory 23 and subsequently coupled to the correlation and microprocessor circuit 24 when all samples for a given image have been taken. The correlation and microprocessor 24 operates on the samples from the memory to compute frame differences as described in respect to FIG. 3. In addition, 24 receives vertical and horizontal sync signals from 19 and 22 in order to allow the calculation of the exact delay 6, 7, or 8 as described in respect to FIG. 2. The desired result of the matching, either the calculated delay, the identity of the particular matched image, or the desired match information may then be displayed for the user on a display device 25, or communicated to other equipment over a communications channel 26.

One skilled in the art will recognize that the elements 25 and 26 may be any of those well known in the art and may be selected to fit a particular application without departing from the spirit and scope of the invention.

Figure 5:
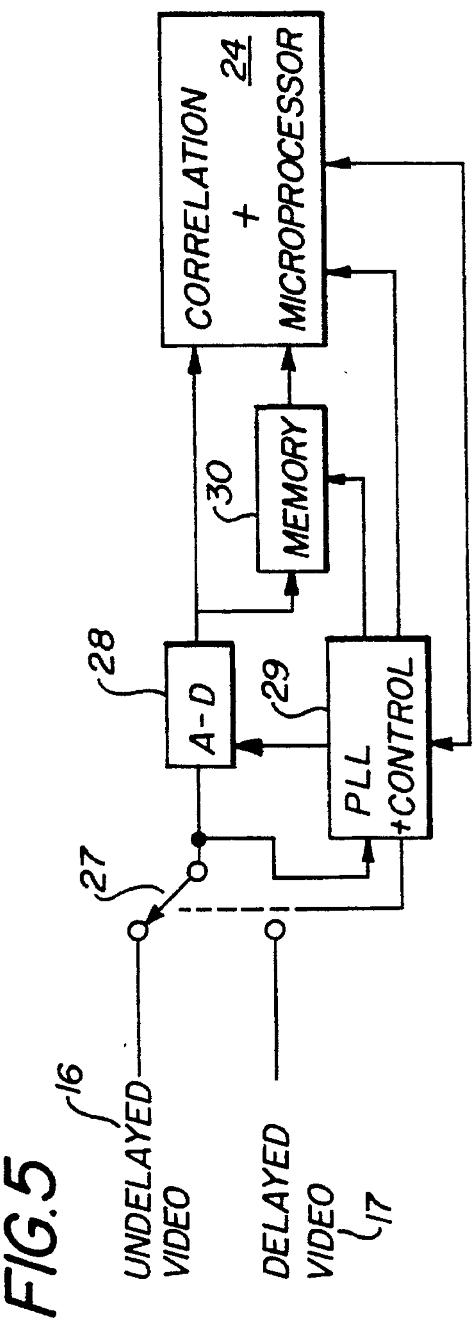
FIG. 5 is a drawing showing a second embodiment of the invention.

With respect to FIG. 5, it will be appreciated that the operation of the A–D, PLL and memory for each channel is the same, and may very well be performed by a single circuit which switches between undelayed video 16 and delayed video 17 with a switch 27. This switch will be understood to also represent the selection.of given images one at a time under operator or other control such as by placing physical images on a scanner. The A–D 28 then operates to sample the selected signal under control of 29 and store the sample in memory 30, or alternatively to couple the sample directly to 24.

FIGS. 6A through 9B comprise a schematic diagram for the preferred embodiment of the invention, which schematic diagram which will serve to illustrate the preferred embodiment of the invention and which may also be copied directly and used with the programmable device programs given herein to allow one of ordinary skill in the art to practice the invention without any further invention or undue experimentation. For the sake of completeness, a brief description of the schematic figures is given below. It will be appreciated that the preferred embodiment given in these schematics is for use with analog video signals, however the invention may also be practiced with other types of images conveyed in other forms. In particular, the use of the invention with digital video data streams is believed to be of particular value, especially in conjunction with the transmission or delivery of compressed video, such as compression by MPEG-2 compression standards as is contemplated for future consumer video program distribution. The modifications necessary to the preferred embodiment for use in such applications will be readily apparent to one of ordinary skill in the art and one of such skill will be able to practice the invention without additional invention or undue experimentation from the teachings provided herein.

Figure 6:
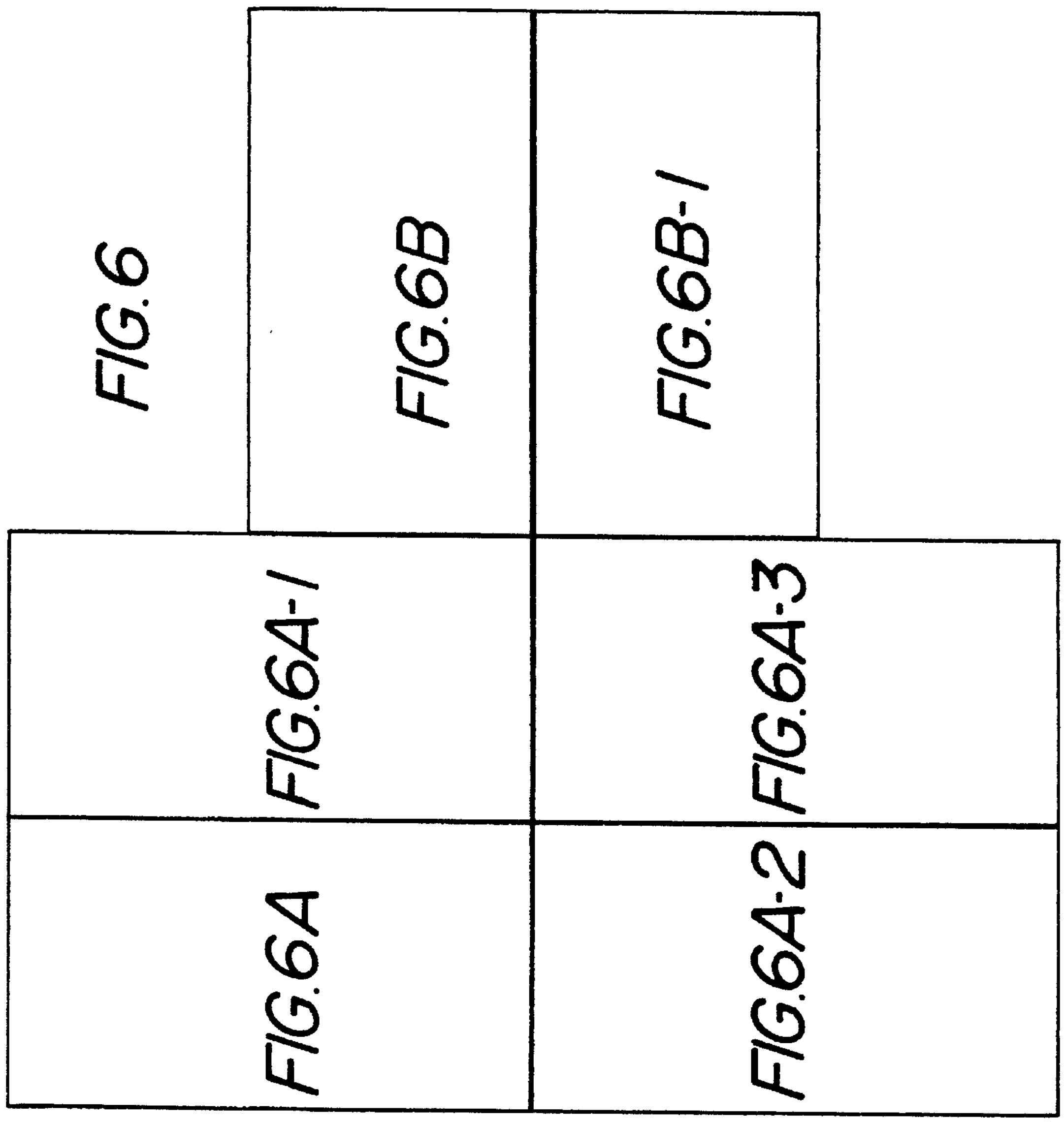
FIG. 6A is a first schematic drawing of the preferred embodiment of the invention.
FIG. 6B is a second schematic drawing of the preferred embodiment of the invention.
Figure 6A:
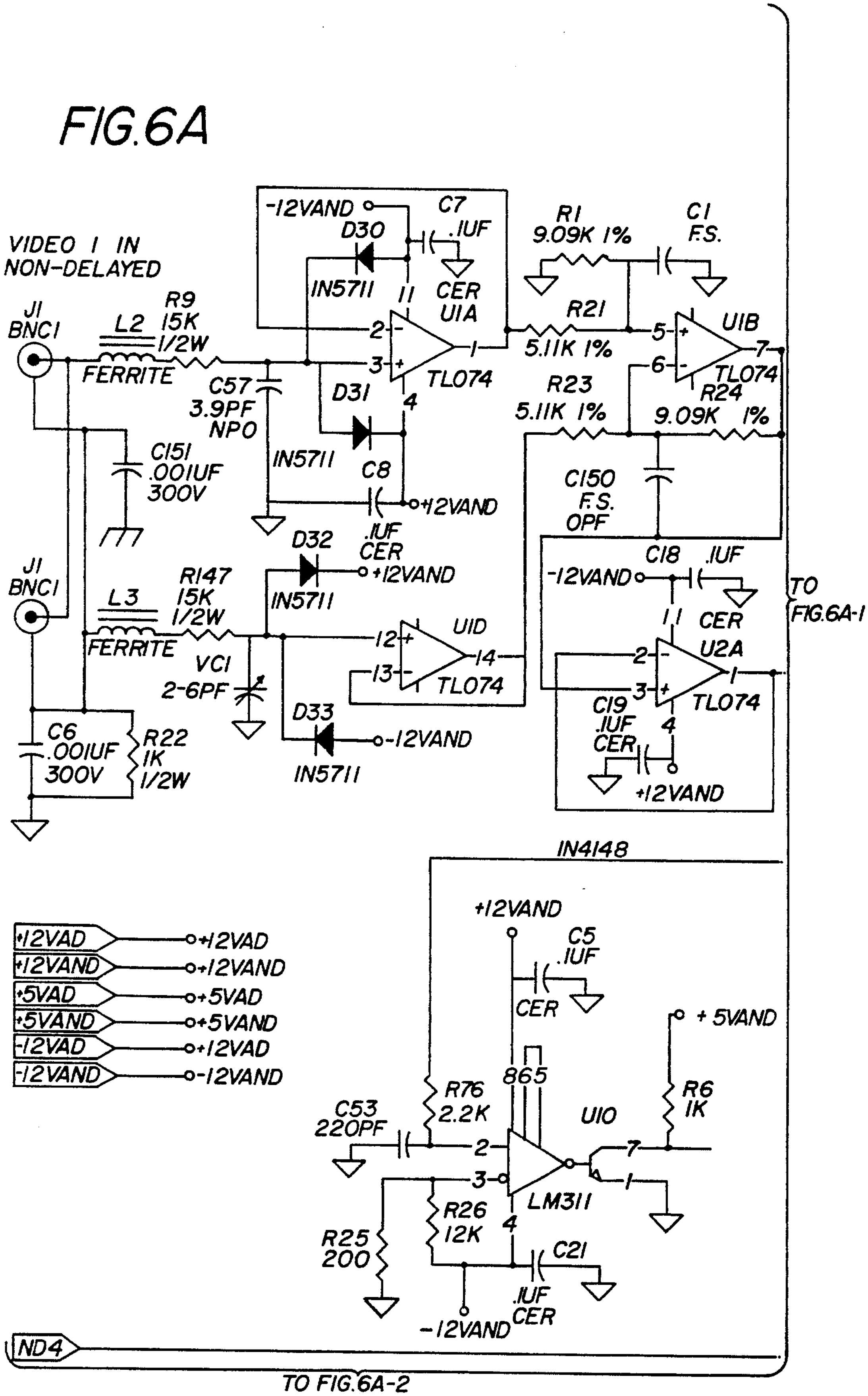
Figures 1, 6A:
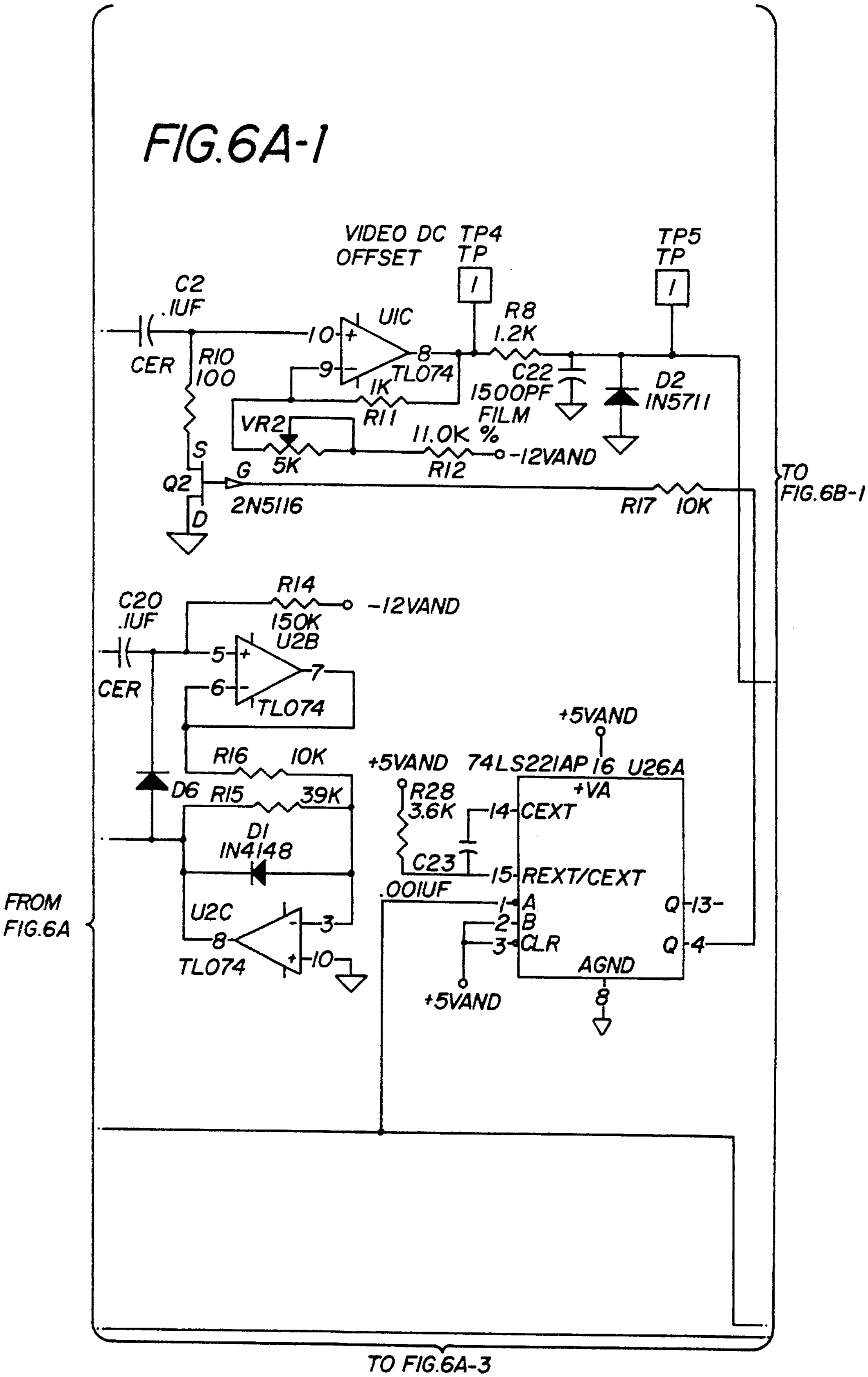
Figures 2, 6A:
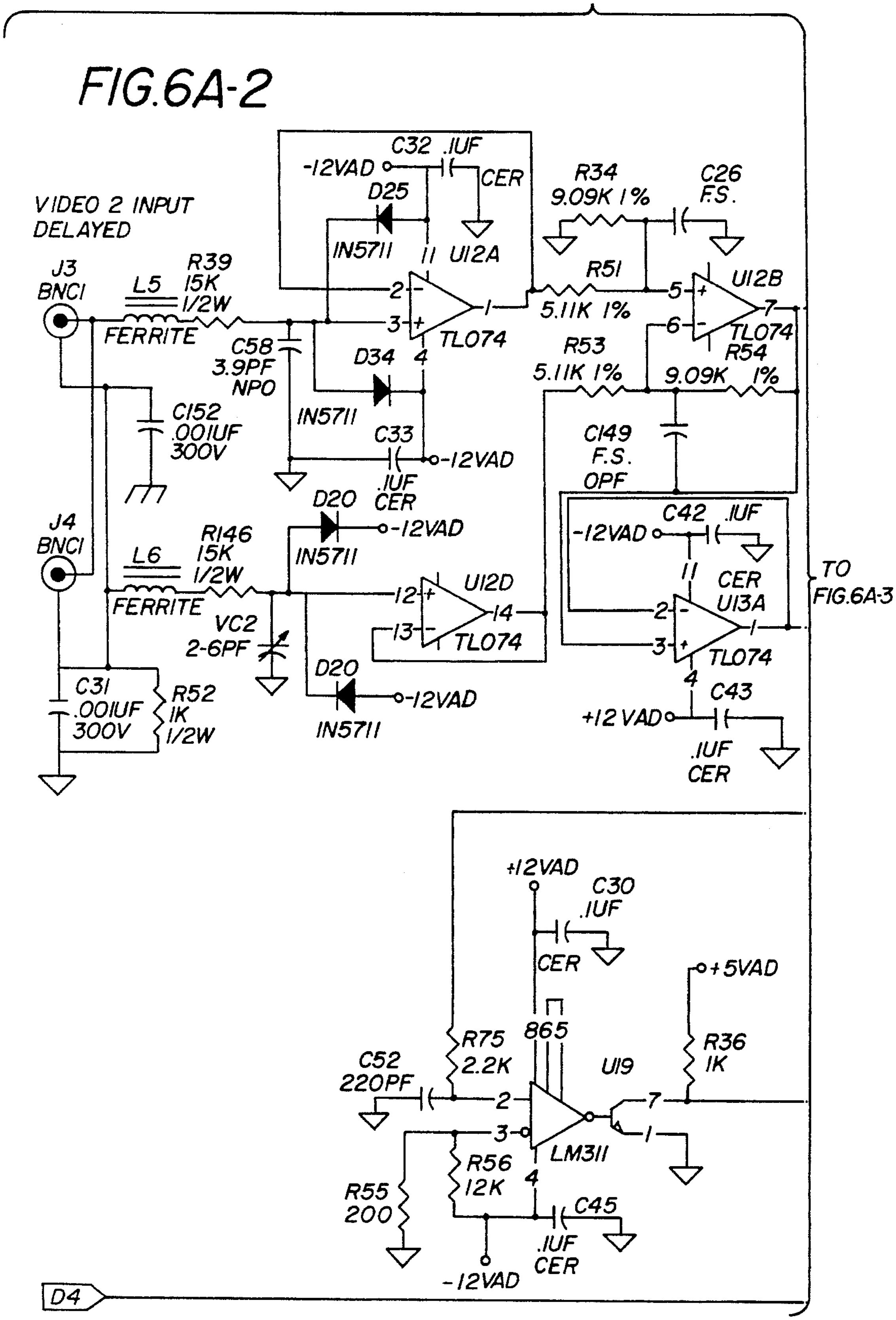
Figures 3, 6A:
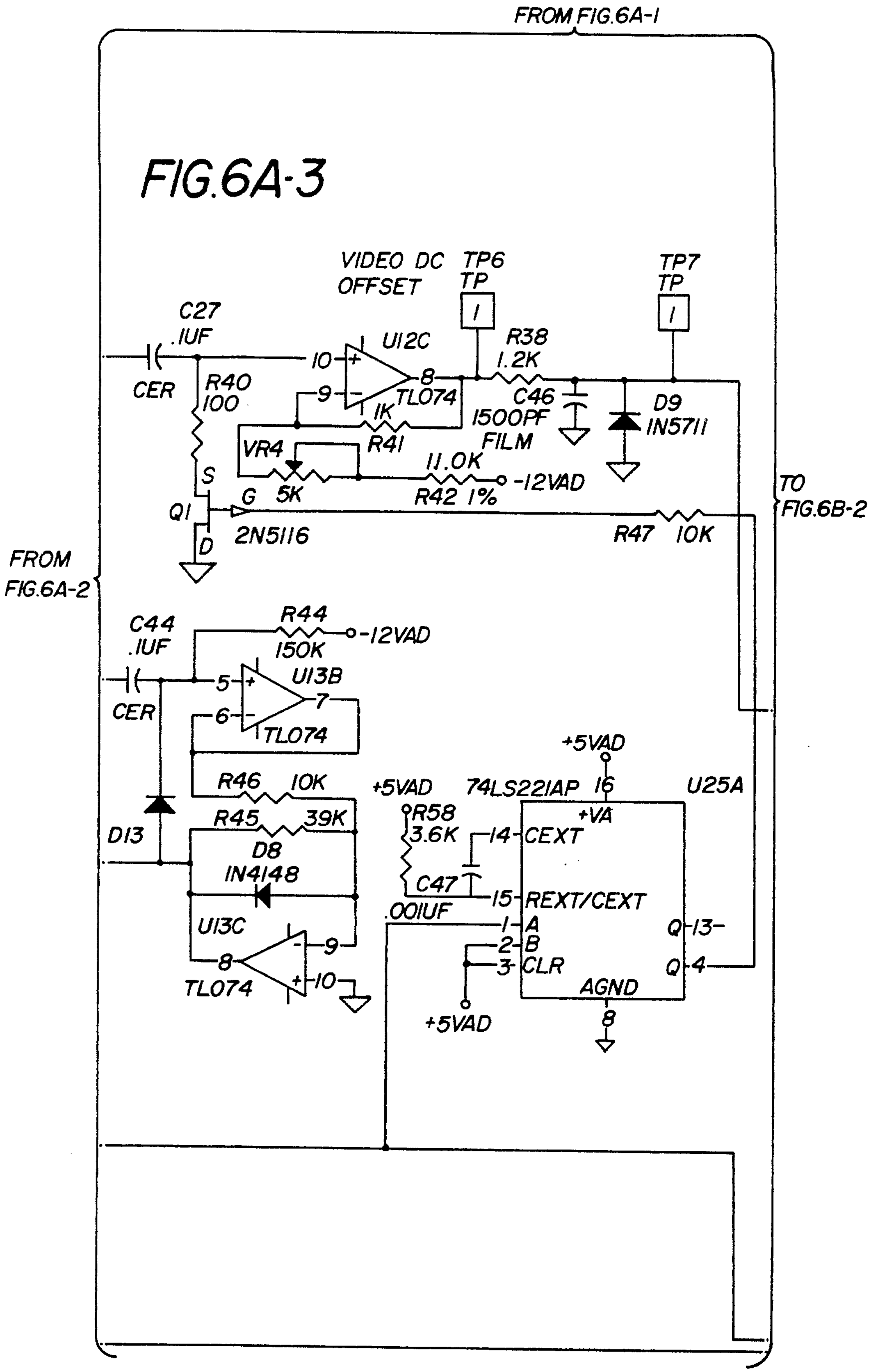
Figure 6B:
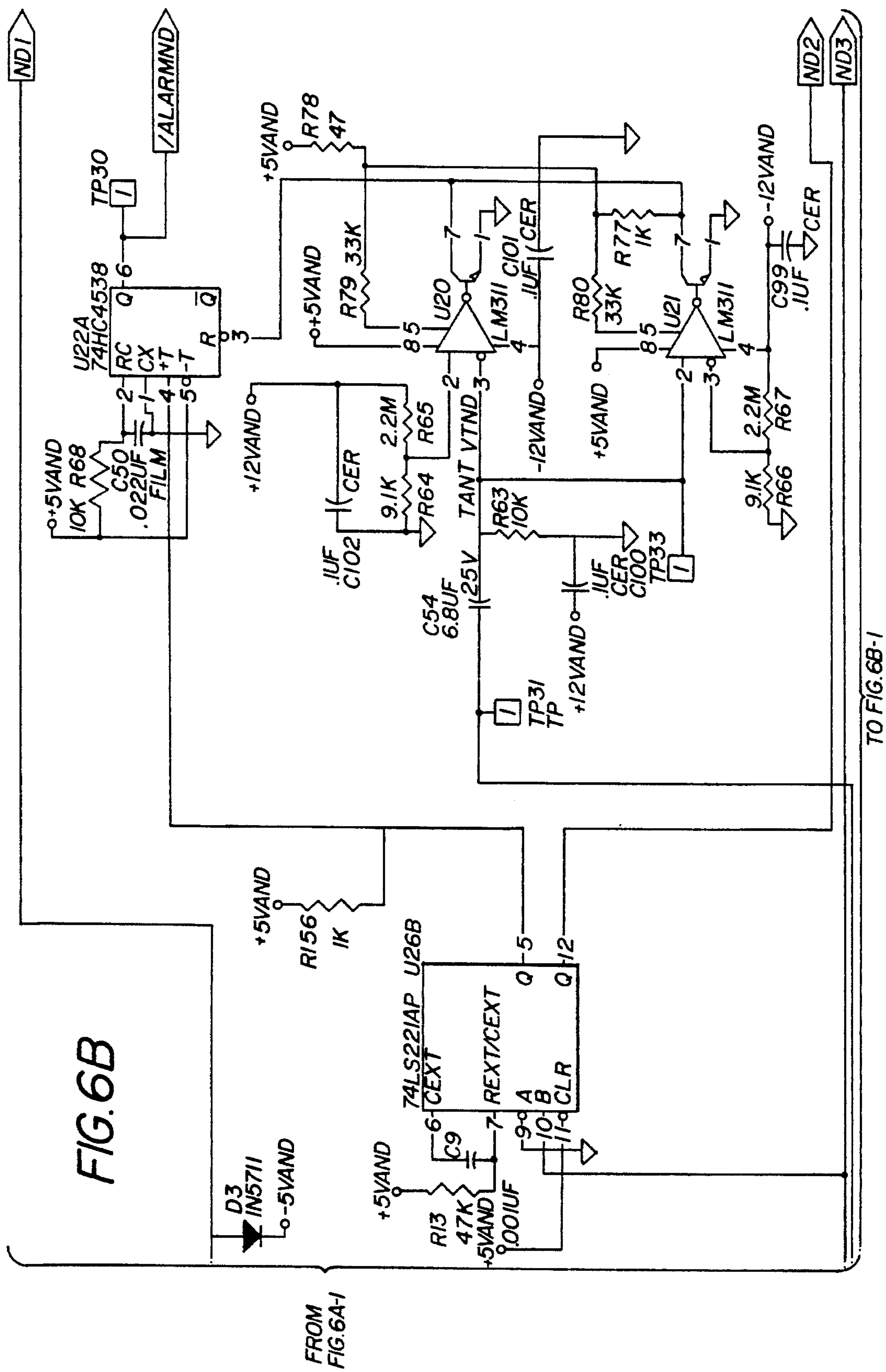
Figures 1, 6B:
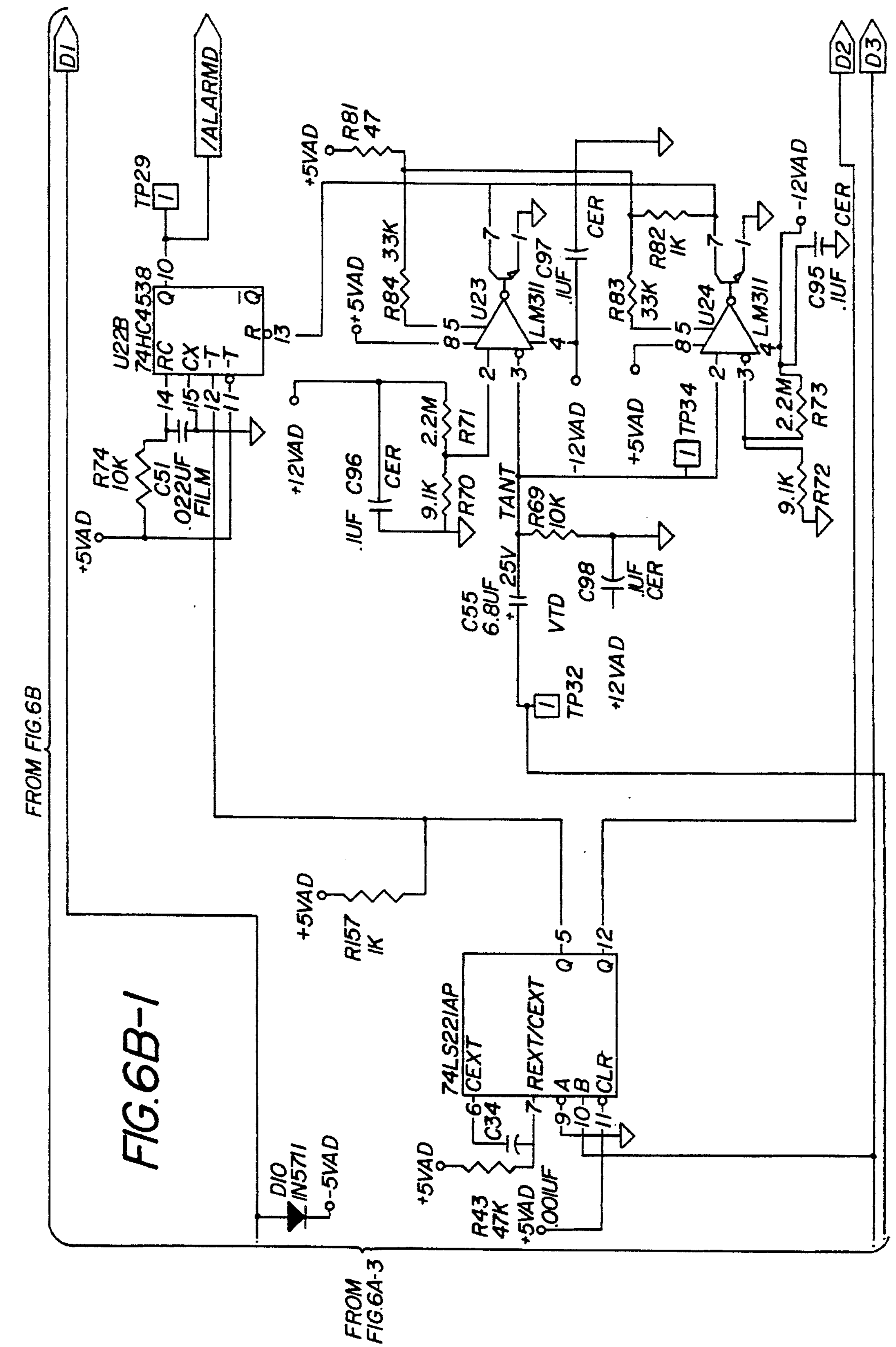

FIG. 6A and 6B comprise left and right hand portions of the first sheet of schematic drawings of the preferred embodiment of the invention. There are two very similar analog video input circuits occupying the upper and lower portions of this sheet of schematics. The upper portion will be described and one skilled in the art will understand the lower portion from the description thereof.

On the left it will be noted that there are several power supplies coupled to the circuit, there being separate supplies for the delayed (D) and non-delayed (ND) channels, as well as separate analog and digital voltage supplies, as is customary in the art. Input video is coupled to a looping input provided by J1 and J2 with high frequency isolation being provided by L2 and L3. Operational amplifier sections U1A, U1D and U1B comprise a balanced input amplifier having good common mode noise rejection with diodes D30-33 providing high voltage protection to the inputs. CMRR may be optimized by adjustment of VC1. The buffered video signal from U1 pin 7 is coupled to a sync tip clamp and sync stripper comprised of U2A-C and U10 which provides composite sync at U10 pin 7. Comp sync is coupled to one shot U26A which provides a back porch clamp pulse for FET Q2. In addition, comp sync is coupled to H sync separator one shot U26B which generates H rate pulses from comp sync with comp sync and the H pulses being coupled to other parts of the circuit on FIG. 8A as indicated by ND2 and ND3.

Video from U1B pin 7 is buffered by U2A and AC coupled by C20. The AC coupled video is again buffered by U2B and applied to amplifier U2C, which operates as a comparator. When any part of video (primarily sync tip) from U2B pin 7 goes below the reference on U2C pin 10 (ground) the output of U2C goes positive, charging C20 positive through D6, thus counteracting the tendency for video at U2B to go below the reference. A current source R14 charges C20 low during active video, so at each sync tip a small amount of current is needed through D6 to keep the video signal at the proper level. This action causes video to be sync tip clamped at C20 and thus the sync tip of the video signal at U2C pin 8 normally extends the diode drop of D6 (approximately 0.6 V) above ground. The video signal from U2C pin 8 is applied to comparator U10 where sync is converted to TTL level at pin 7. The diode D1 in the feedback path of U2C is used to change the gain of that stage from R15/R16 (≈-4) for negative portions of the signal (sync tip) to a gain of RD/R16 which is much less than one for positive portions of the signal (active video), thus providing excellent immunity to noise and APL level changes during active video. The addition of D1 thus creates an amplifier having nonequal gains for video above and below the threshold set on U2C pin 10.

The operation of this novel sync tip clamp and sync stripping circuit is described in more detail in U.S. patent application Ser. No. 837,323 filed Feb. 18, 1992.

The H pulse from U26B pin 5 is also coupled to a retriggerable oneshot alarm circuit U22 which will time out generating /ALARMND if incoming sync is missing. The alarm oneshot may also be triggered via reset, thus generating the alarm in the absence thereof, by the U20 and 21 circuit in response to ND4 from FIG. 8B. ND4 is responsive to the error voltage of the horizontal PLL in sync generator IC U3 and operates to generate an unlocked PLL originated alarm via U22A when the PLL unlocks due to any fault such as missing input signal.

The video signal from U1B pin 7 is clamped to ground by clamp circuit Q2, C2, U1C as is known in the art, and a known DC offset is added by U1C in response to VR2. The video with the offset (ND1) is coupled to the A–D convertor U4 on FIG. 8A, which convertor digitizes the entire active video portion of the video waveform. Diodes D2 and D3 provide protection for the A–D in case of transients present on the input. Low pass filtering is provided by R8/C22 to minimize correlation errors due to horizontal displacement of active video which may occur in some delay devices such as video synchronizers, as well as removing chroma.

Figure 7:
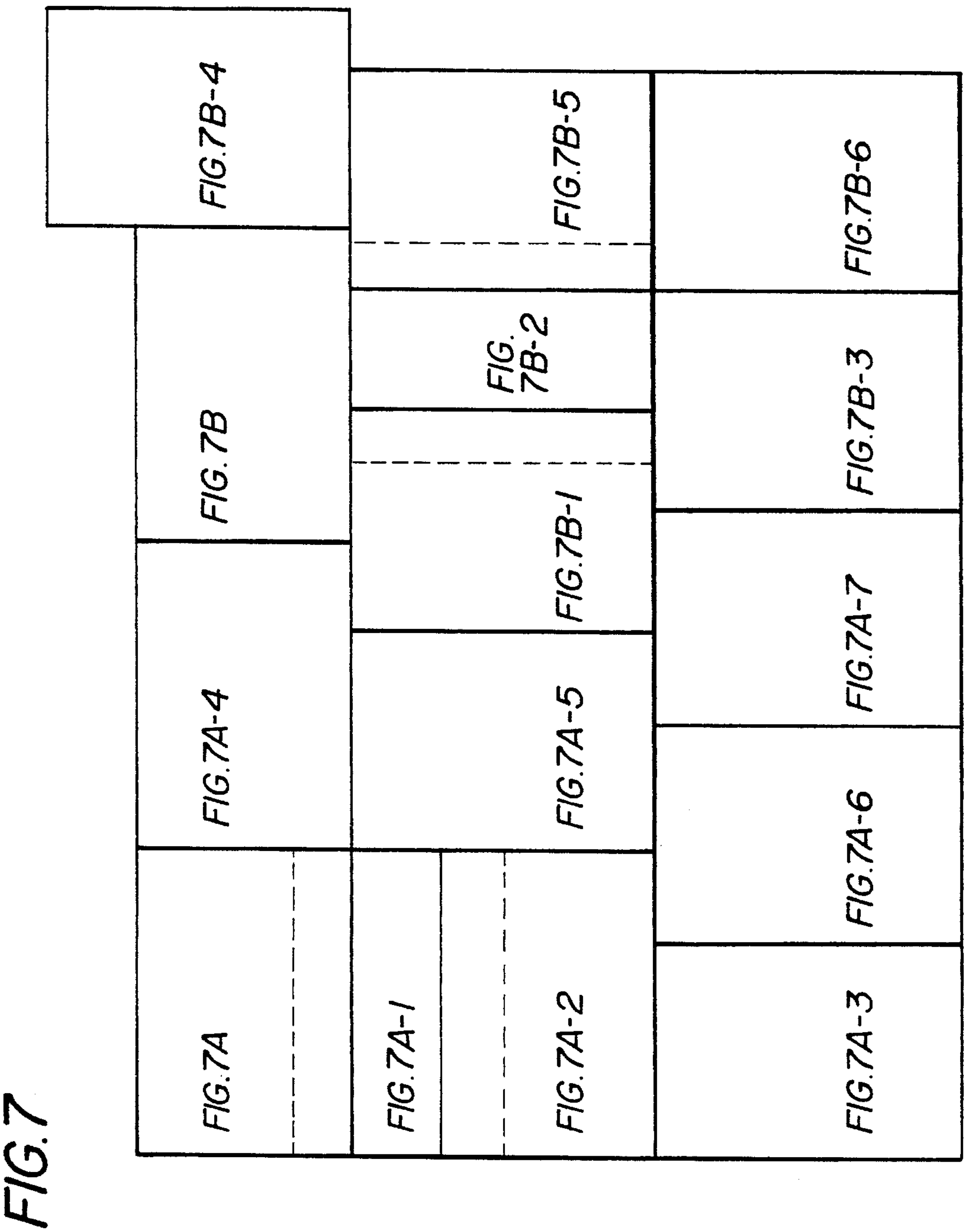
FIG. 7A is a third schematic drawing of the preferred embodiment of the invention.
FIG. 7B is a fourth schematic drawing of the preferred embodiment of the invention.
Figure 7A:
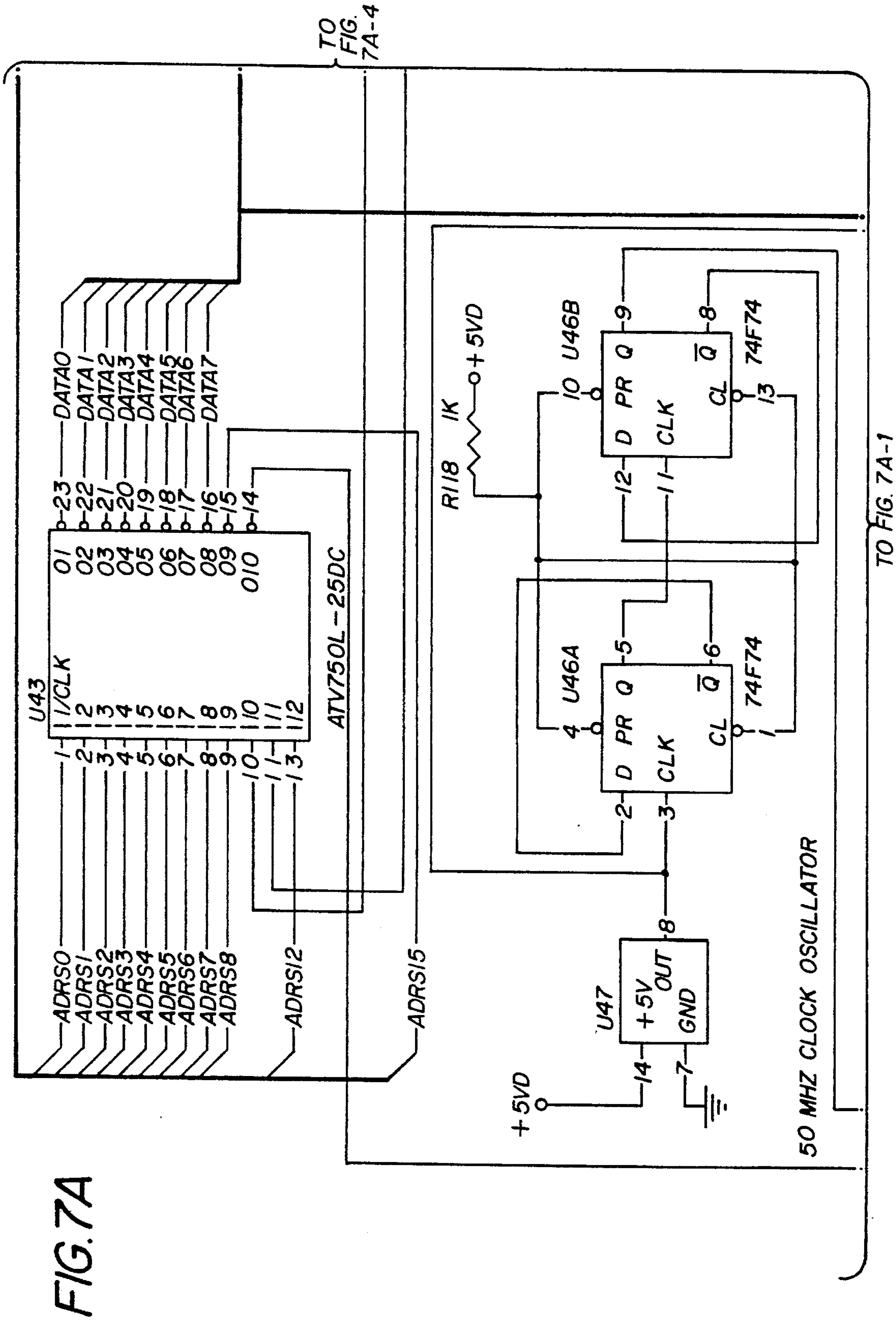
Figures 1, 7A:
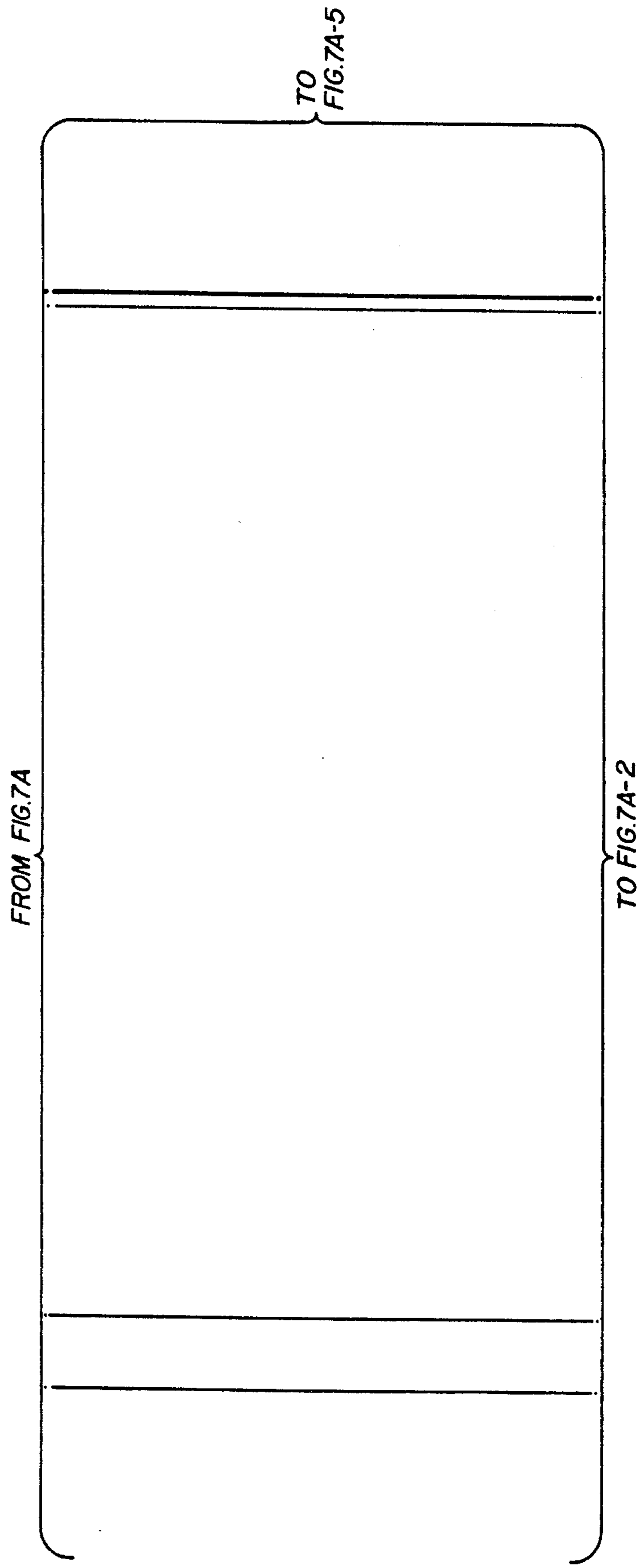
Figures 2, 7A:
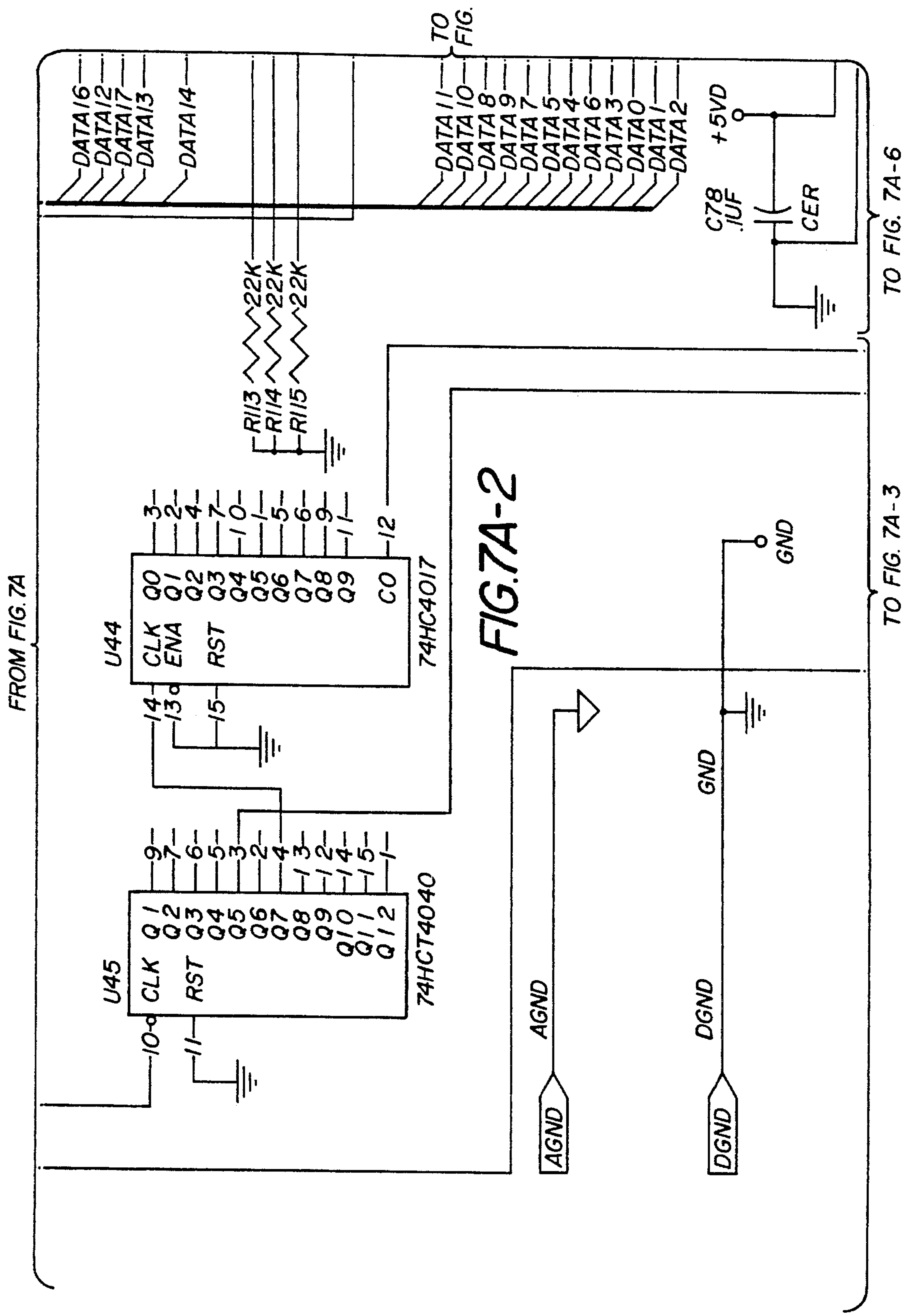
Figures 3, 7A:
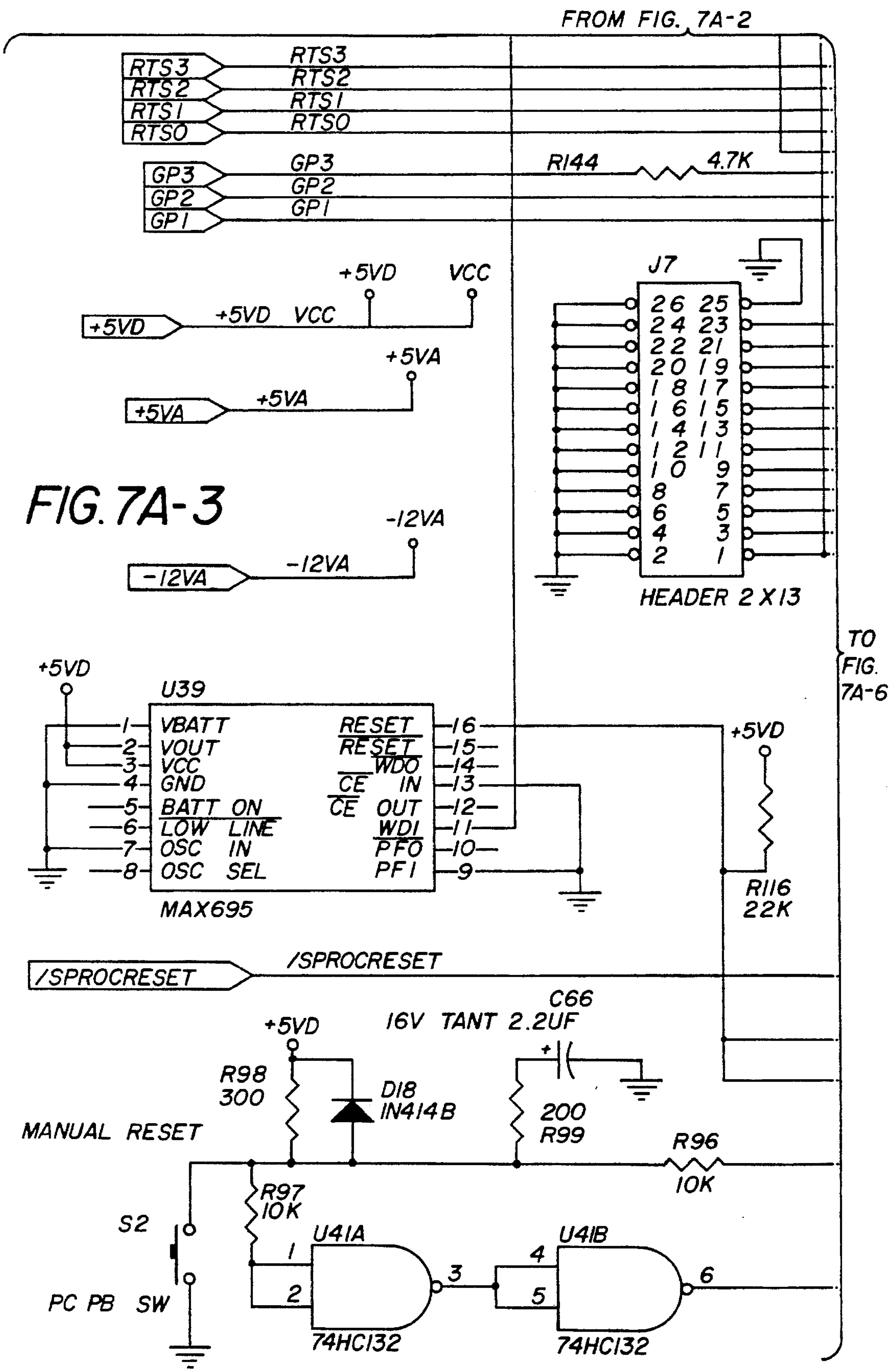
Figures 4, 7A:
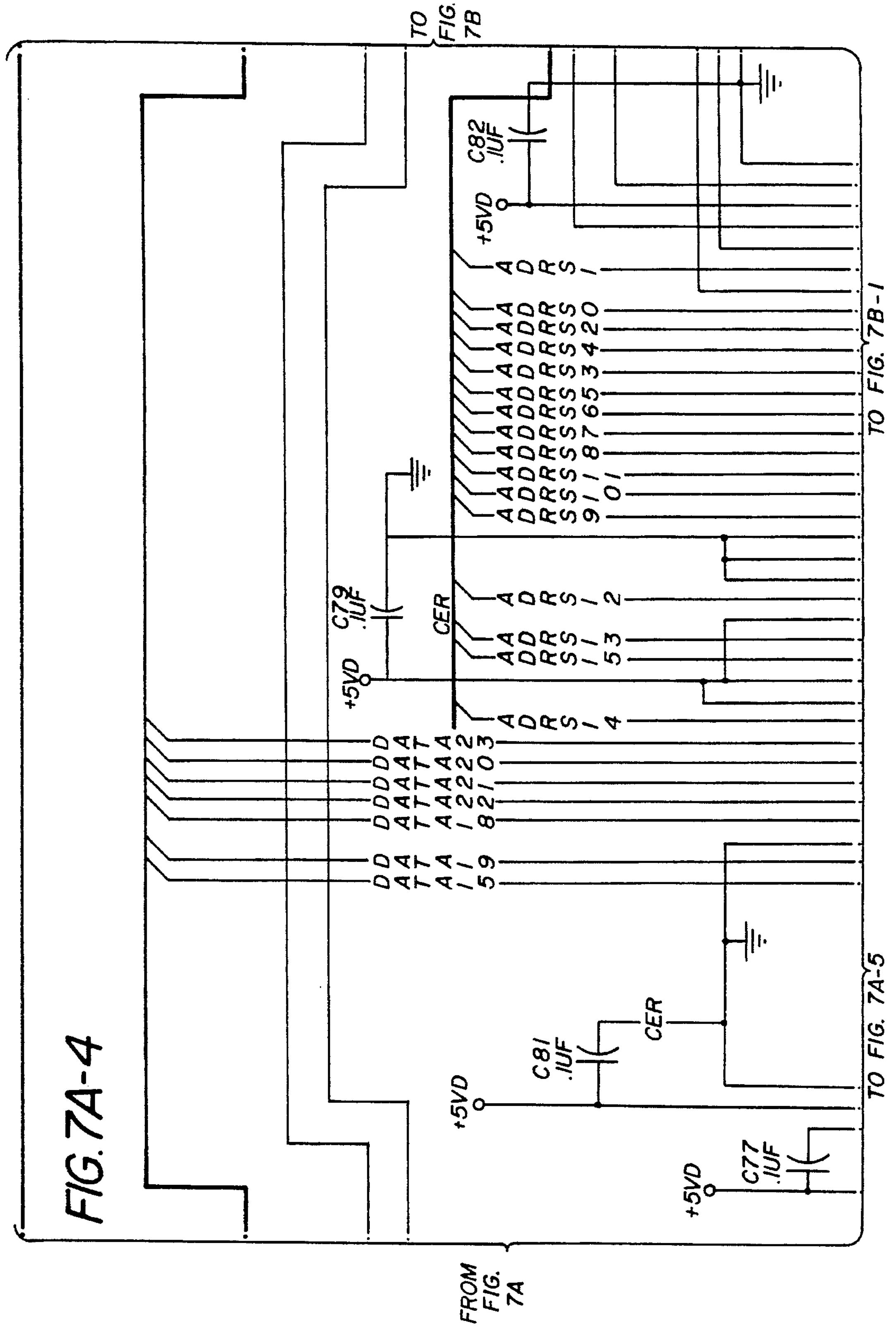
Figures 5, 7A:
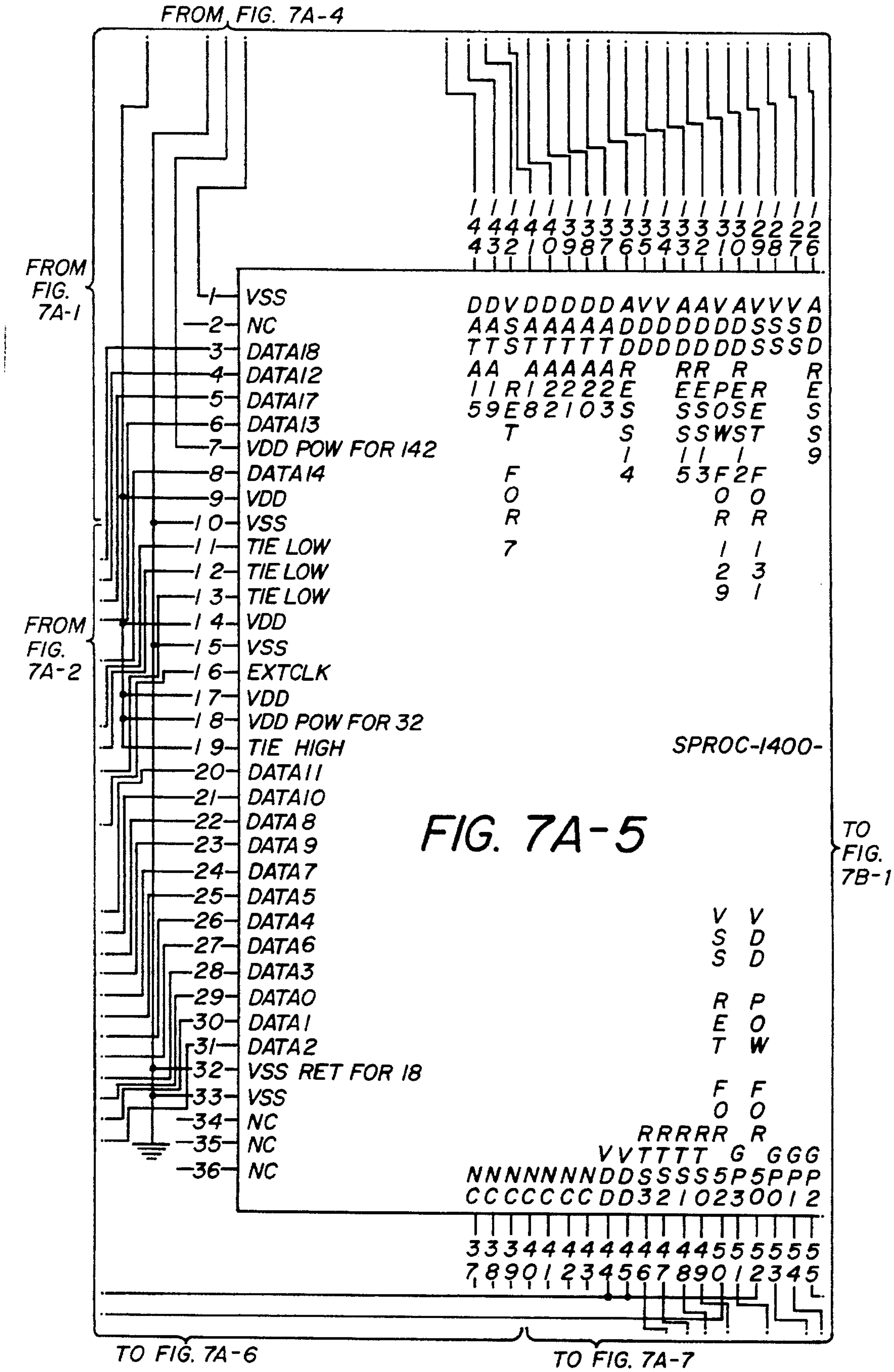
Figures 6, 7A:
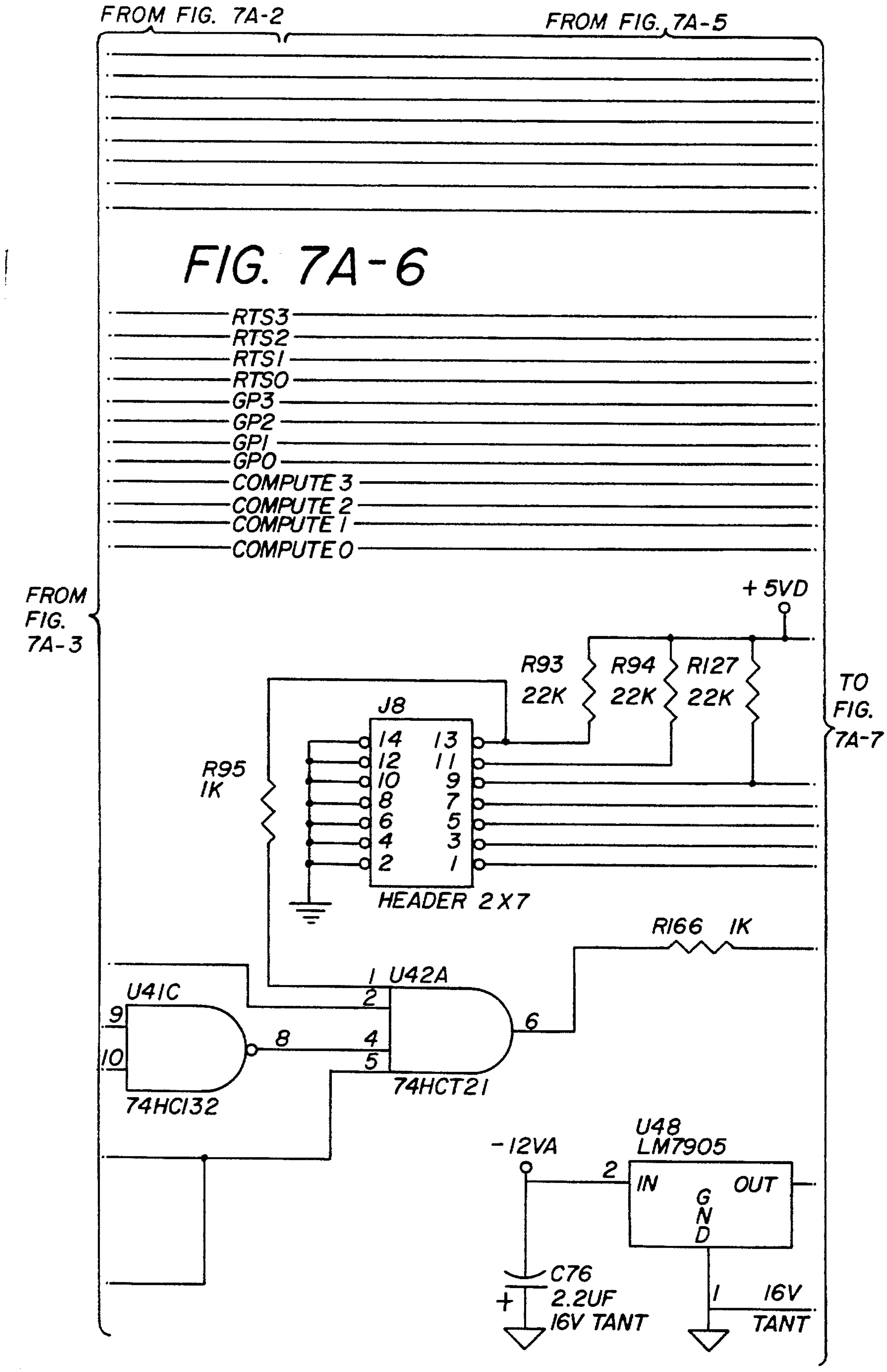
Figures 7, 7A:
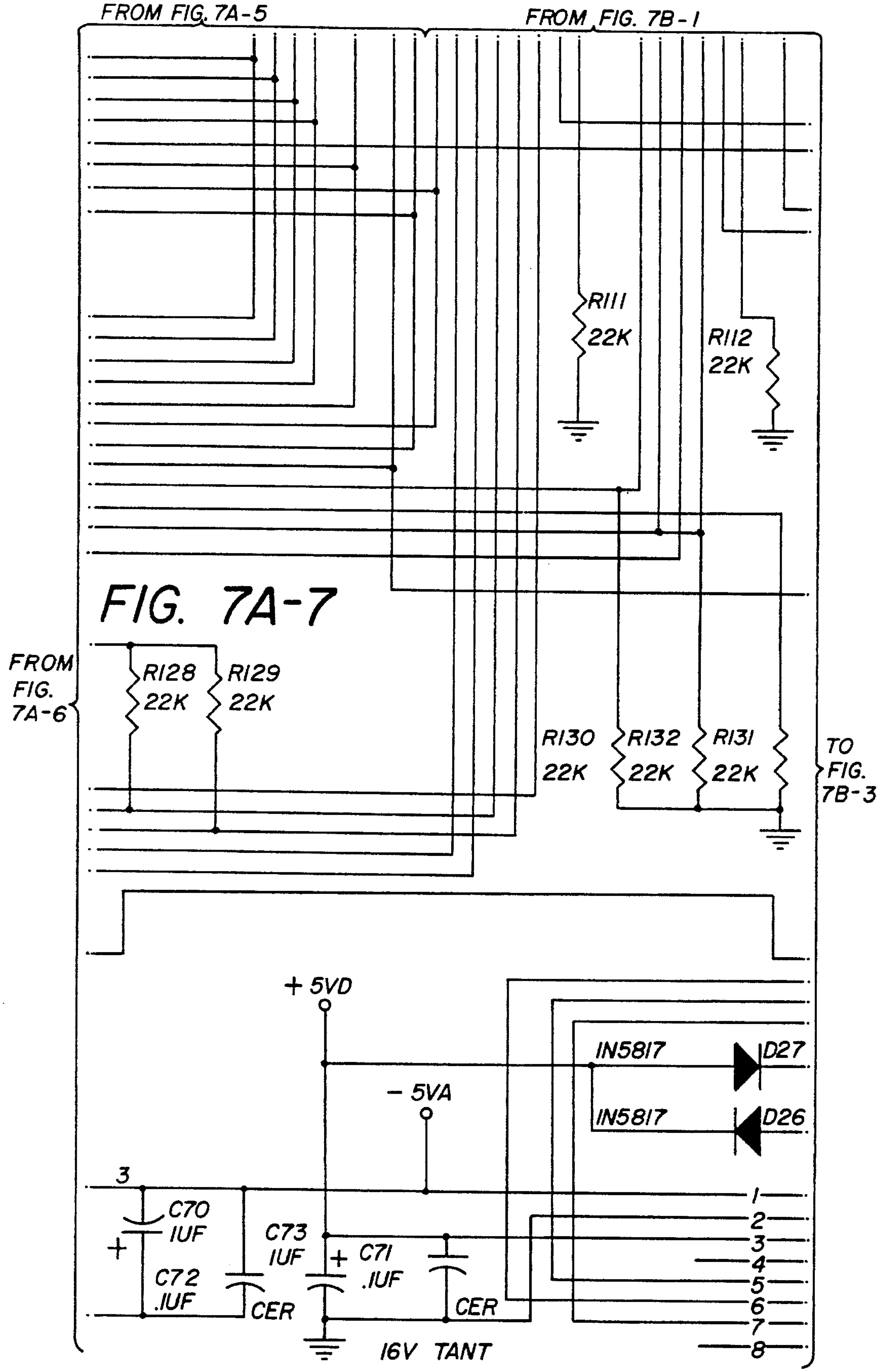
Figure 7B:
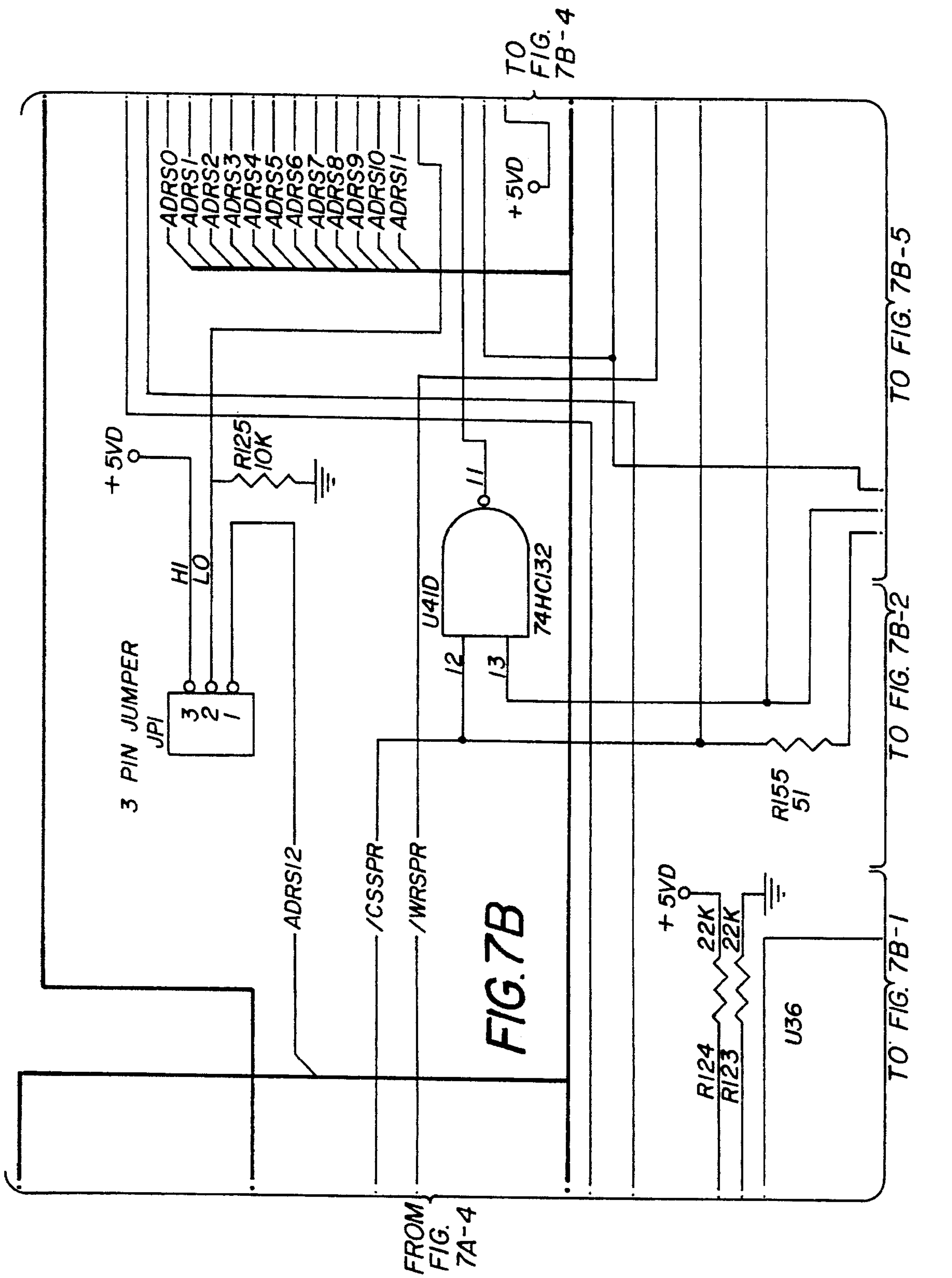
Figures 1, 7B:
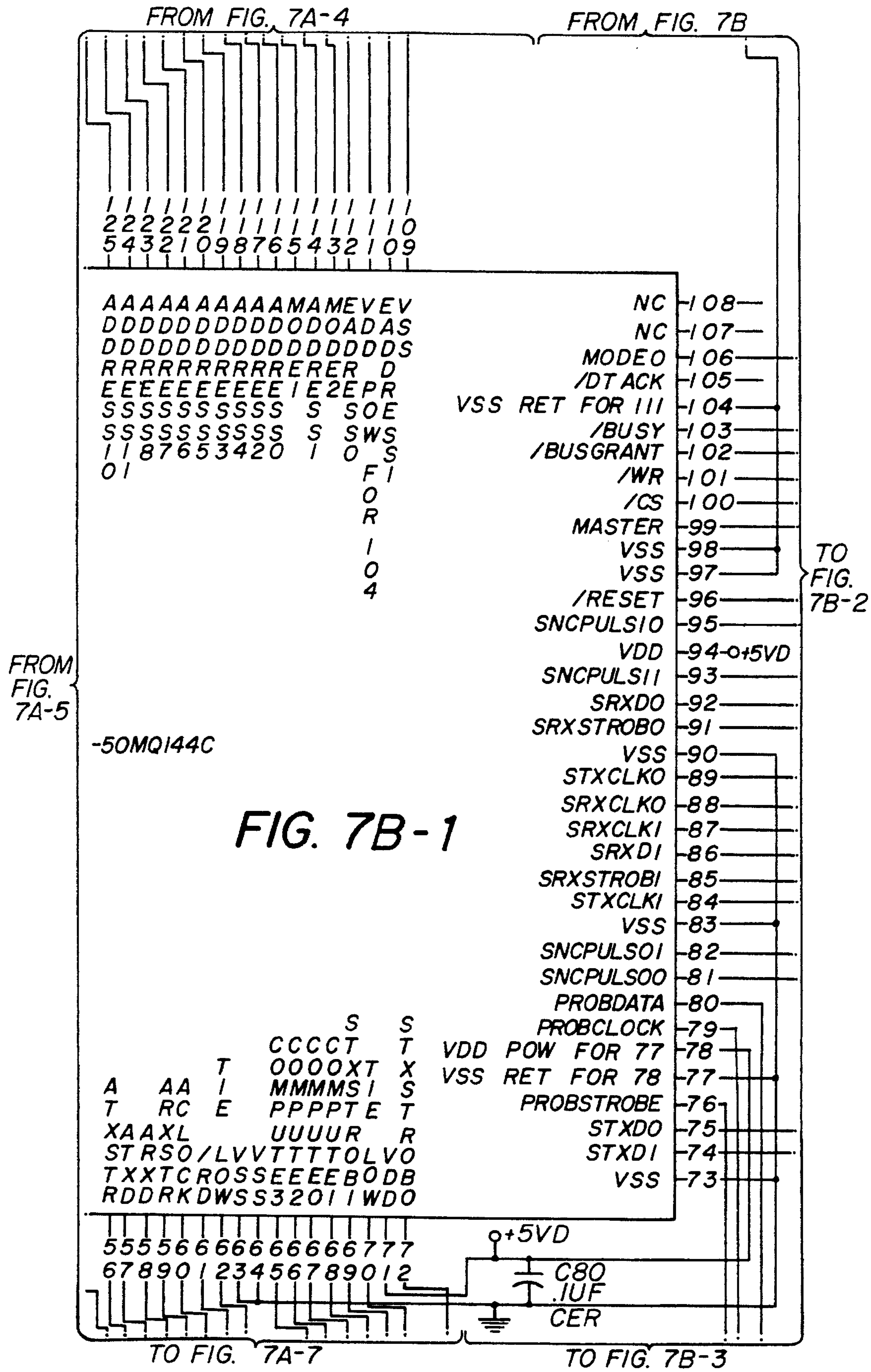
Figures 2, 7B:
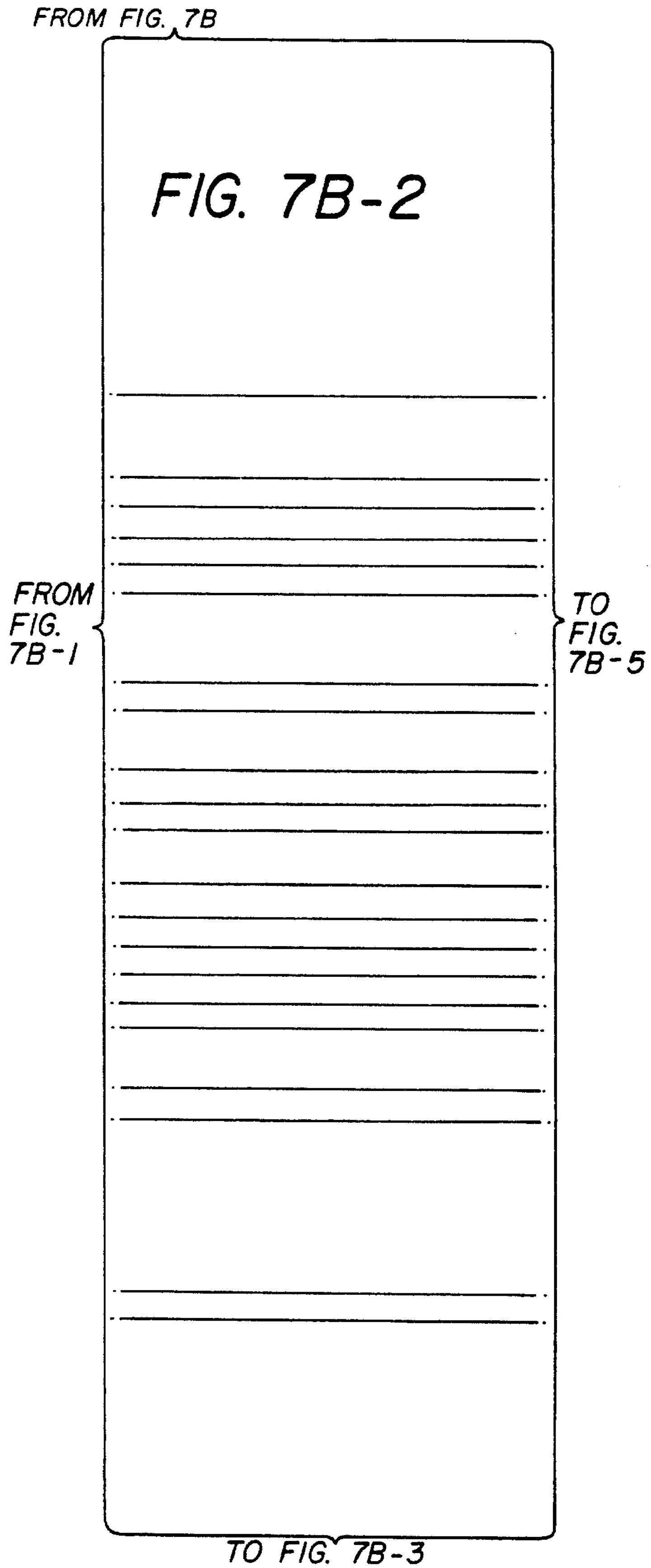
Figures 3, 7B:
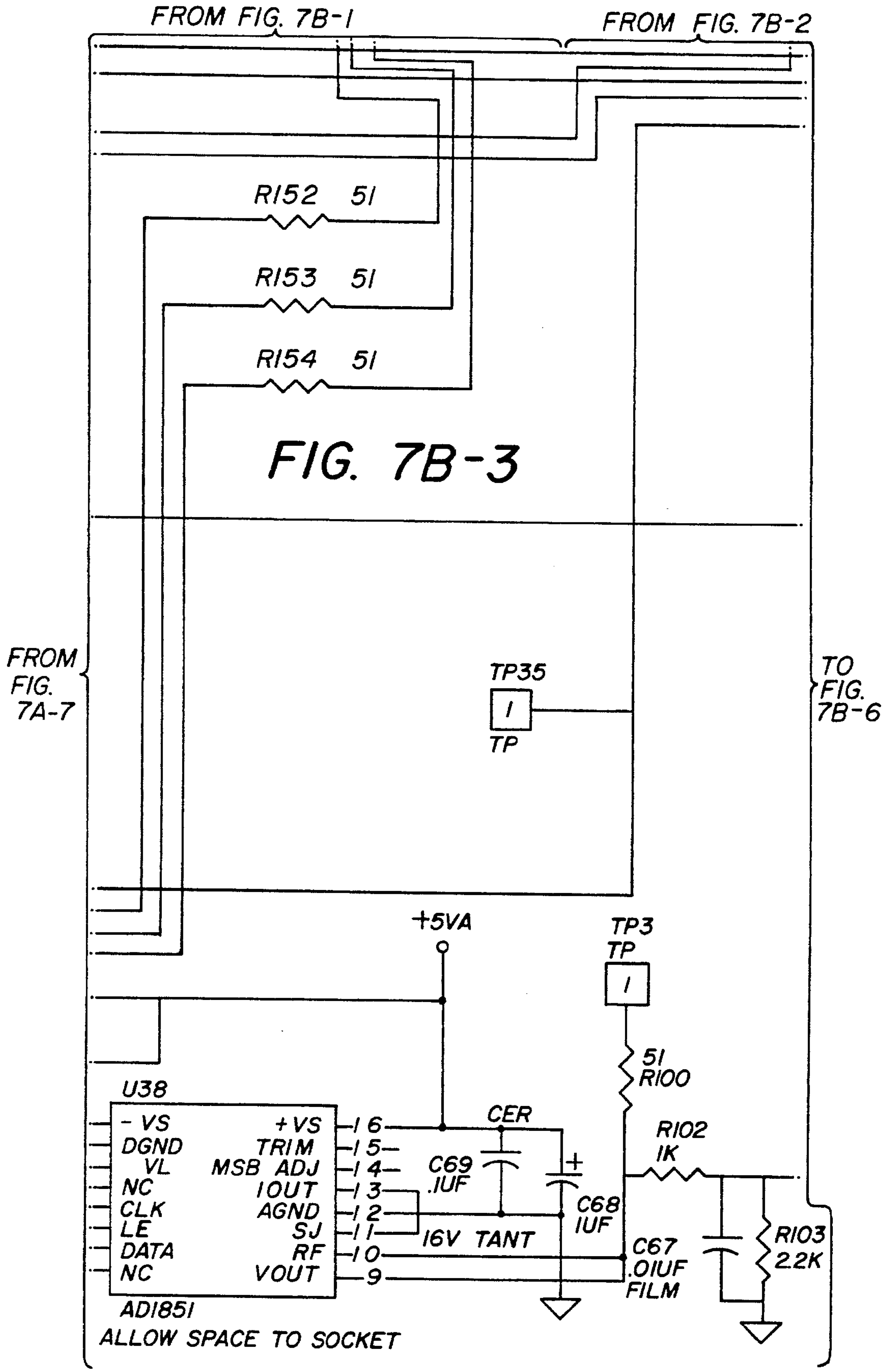
Figures 4, 7B:
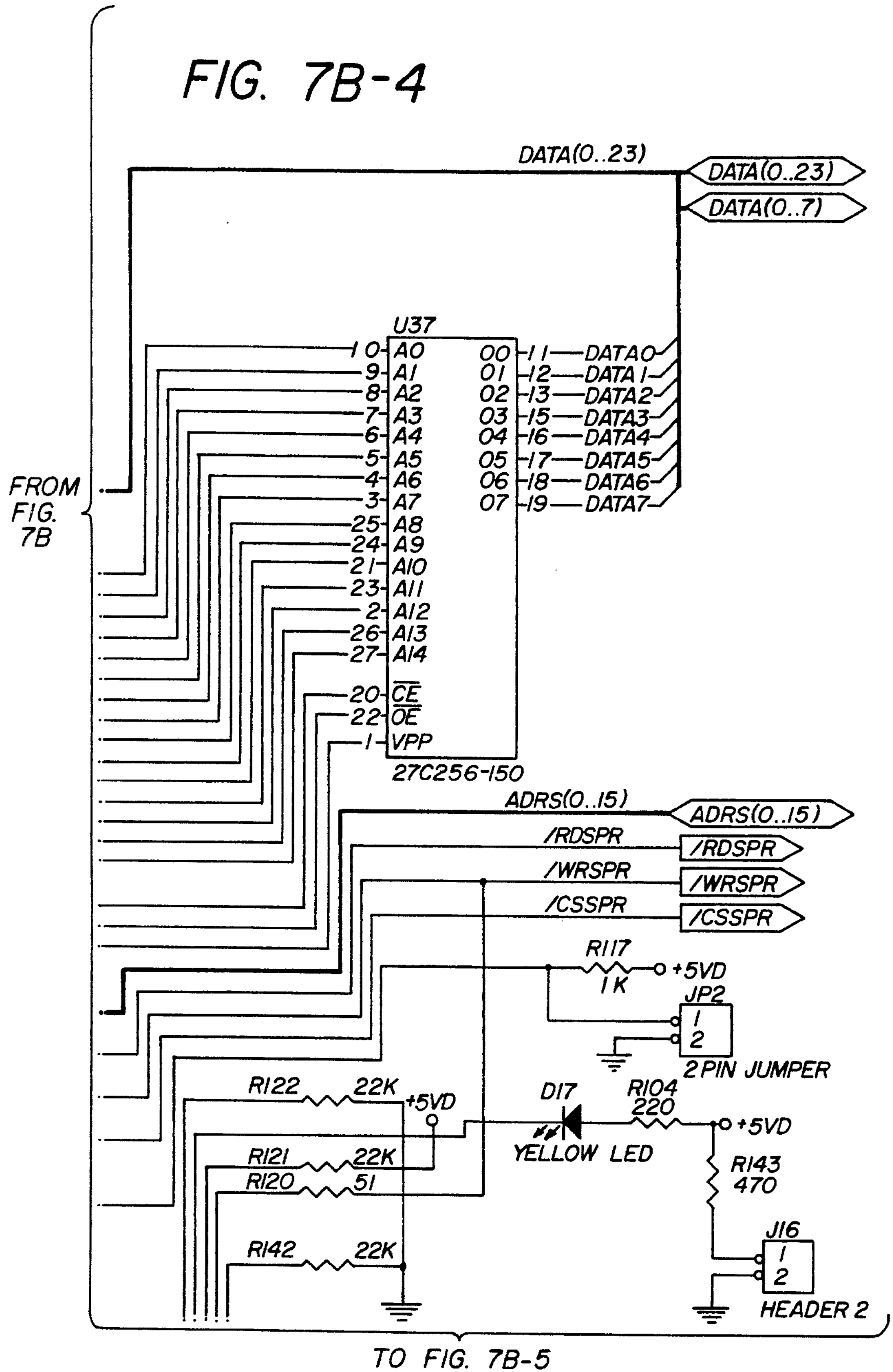
Figures 5, 7B:
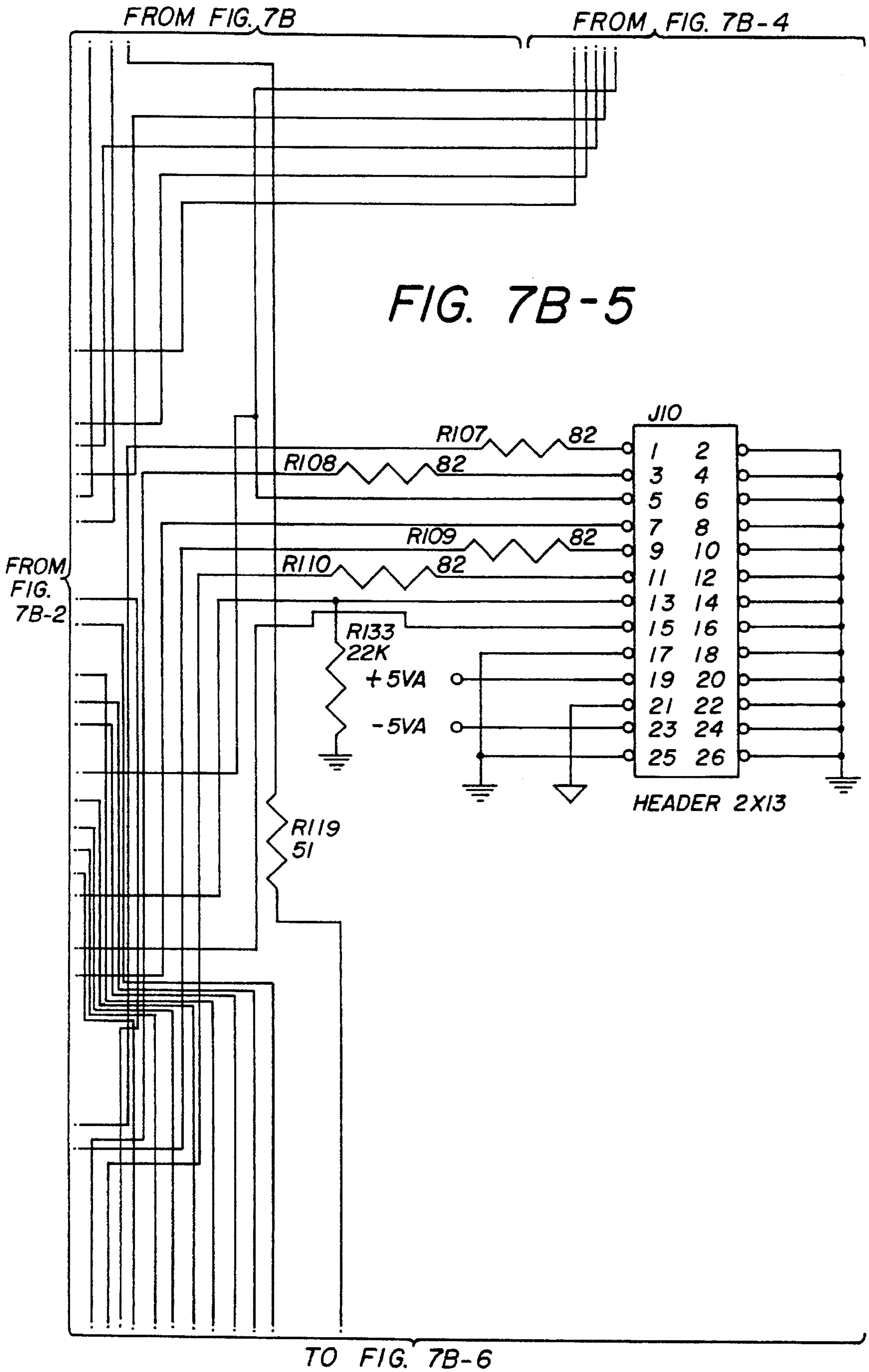
Figures 6, 7B:
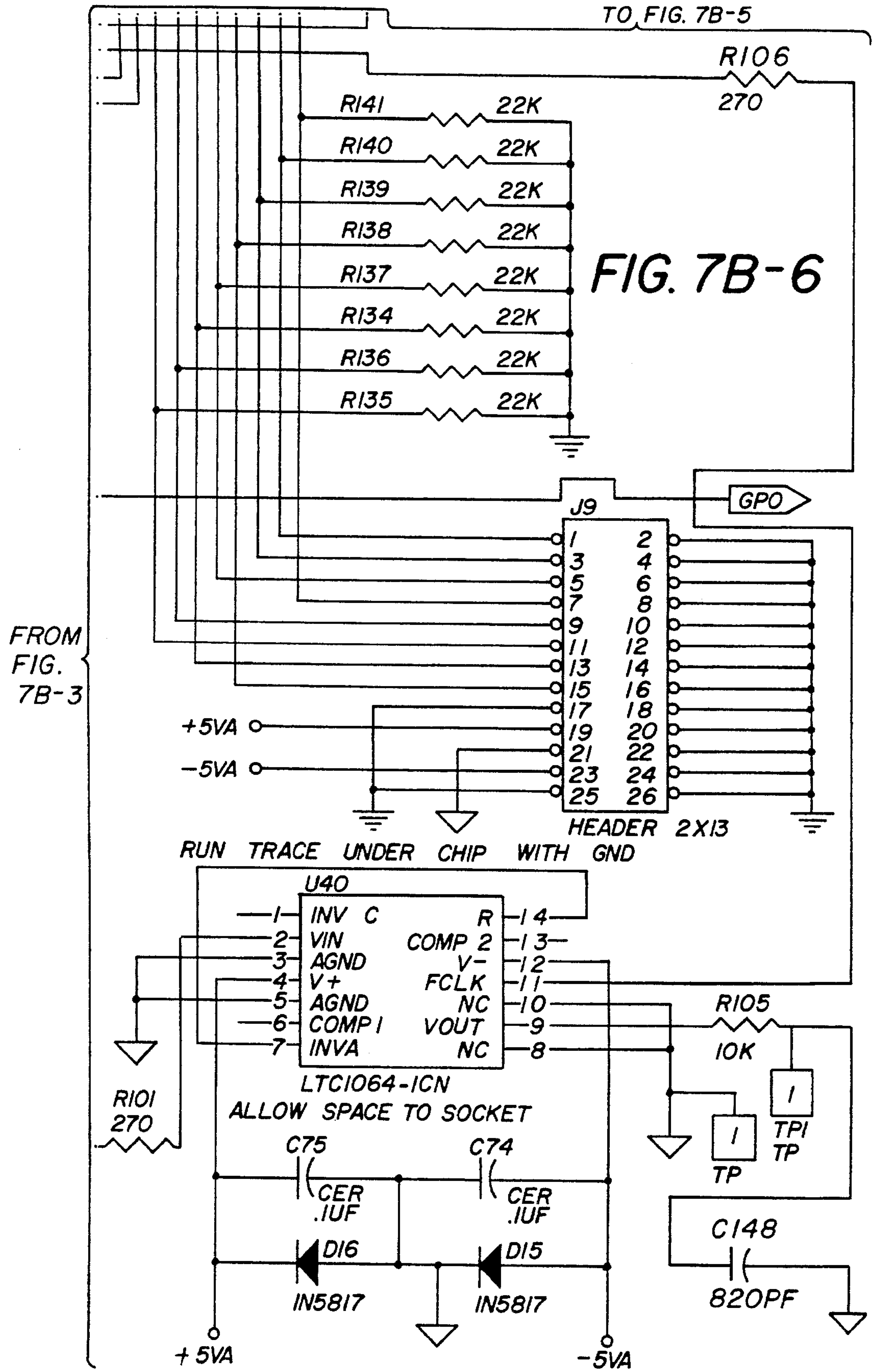

FIG. 7A and 7B comprise left and right hand portions of the second sheet of schematic drawings of the preferred embodiment of the invention. This sheet shows the SPROC™-1400 DSP processor manufactured by Star Semiconductor of San Jose, Calif. which may be purchased from distributors of Star Semiconductor products, or from Pixel Instruments Corporation of Los Gatos, Calif. SPROC is a trademark of Star Semiconductor. The SPROC chip performs the bulk of the actual processing of the sampled video to determine the delay of the delayed video at BNC connectors J3 and J4 and the non-delayed video at BNC connectors J1 and J2. The circuit operates to measure the time delay from one vertical sync to the other (fine delay), and to determine a coarse delay by matching the undelayed fields to the delayed fields. The coarse delay, determines the delay in field delay units and then adds to it the fine delay from one sync to the other.

This circuit shown in FIGS. 7A and 7B is virtually identical to the SPROC evaluation board circuit which is manufactured by Star Semiconductor, and will operate in this mode as well as in the preferred embodiment. These boards are available from distributors of Star Semiconductor Products, and for a more thorough description of the circuit, one may refer to the various literature available from Star distributors.

The functions of various key components include U36 in the middle, the SPROC IC, U39 and U41 in the lower left, the reset circuit for generating reset commands upon power up or after leaving a failure mode, U38 and U40 at the bottom of FIG. 7B, a D-A and Low pass filter ICs which may be used for troubleshooting and further development, but not necessary to the basic operation, Headers J7 & J8 at the bottom of FIG. 7A, and J9 and J10 on the right of FIG. 7B, also used for troubleshooting and further development. U47 at the upper left of FIG. 7A provides 50 MHz clocks for the SPROC and other system components, U44, 45 and 46 count the 50 MHz clock down to other frequencies needed by the system. Jumper JP2 selects master or slave mode for U36, and this jumper is always omitted since the SPROC always operates in the master mode. Communications between U36 and peripheral devices takes place via the SPROC parallel port. This port consists of 16 bit address bus ADRS[0 . . . 15], and 24 bit data bus DATA[0 . . . 23], chip select/CSSPR, write assert/WRSPR, and read assert/RDSPR. These signals allow bidirectional 24; 16 or 8 bit parallel data transfer. RTS0 thru RTS3 are one bit input lines. GP0 through GP3 are one bit input or output lines.

Upon power-up, watchdog timer U39 resets U36. When U36 comes out of reset, an internal bootstrap routine loads the SPROC program from EPROM U37 into internal RAM. Two programs may be stored in U37, selected by JP1. Normally, the "LO" position is used. When program loading is complete, execution begins. Execution is triggered by a 9765.625 Hz (10 MHz/1024) square wave applied to U36 pin 67 (COMPUTE0). This forms the effective DSP "sample rate". This trigger signal is generated from the 50 MHz clock. While one of ordinary skill in the art will be able from the teachings herein to generate the program for U37 by use of Star's SPROC development system, The program in Motorola S-Record code for the preferred embodiment as stored in U37 is given below:

S12300000003FE0000000000C583C300C583D500C583E100C583E200300ABD00F5800400F0

S1230020318001009000ABD00300ABC00E5800C0019800100900ABC0049080000F9800D0085

S12300403004FC0021002000E580120031200000900A88003004FC0021004000E580170034

S123006031200000900A82003004FC0021800400E5801C0031200000900AB200300AB20030
S12300804C800E002C0AD800900A9B00AC0AD8003004FC0021800800E580260031200000FC
S12300A0900A96003004FC0021000800E5802B00312000000900A8C003004FC00210010004B
S12300C0E580300031200000900A8300300A8C00280A8800900A84004D200000300ADA00FA
S12300E011800100900ADA00ED803B00700AD900E9803F00300A8300F5803F004D80000015
S1230100AC0ADA00AC0A8B004D200000300ADC0011800100900ADC00ED804700700ADB0076
S1230120E9804B00300A8200F5804B004D800000AC0ADC00AC0A8900300AE100E580550018
S1230140300AE20071800100E9805C0019800100900AE200300ADF00C5806700300AE200D1
S123016071800100E980620019800100900AE200300AE000C580670031800000900AE100B6
S1230180300ADE00900AE200300AE000C580670031800100900AE100300ADD00900AE20041
S12301A0300ADF00900A95004D810000300A950071100000F1806D004D000800AC04FE00F4
S12301C0300B2500F1807100318000004C800E005C0AE400300AE3007400000018800400D7
S12301E04C800E005C0AE500300AE3007400000010800100900AE300900AA900300B330086
S1230200F1808000318000004C800E005C0AE700300AE60074000000188004004C800E0007
S12302205C0AE800300AE6007400000010800100900AE600900AA800300AE900900AEF00D9
S1230240318000000900AF000440AEB003D800100300AF000280AEF004C800E005C0AA80035
S1230260300AEF0004000000900AEF0030800100180AA900F1809D00AC0AF000FD80920085
S12302804C0AF0005D8200007400000074000000A40B35004D800000300AF500700AF10002
S12302A0F180A8004D200000AC0AB800300AF200900A9300300AF300900A9200300AC30097
S12302C0200AB000200AB200200AC900200ABF00200AC000900AAD004D800000300AF5005B
S12302E0700AF400F180BB0011800100900AF500C580BF00300AAD00E580BF00AC0AF50085
S12303004D200000AC0AB400300AB200200AC900200AB000200AC700200AC500900AB70018
S1230320300AB800200AB700900AB9004D820000300AB90071100000F180CE004D001000B4
S1230340AC04FE00300AC400200AB400900AB600300AC4002D200000200AB400900AB30049
S1230360300AC200700A9300E980DB00300AF600C580DC00300AF700900AAB00300A920099
S1230380700AC100E980E200300AF800C580E300300AF900900AAA00313FFF0035800900D5
S12303A092881800928A6C00300AA30071100000F180F000300AA20071100000ED810B00EA
S12303C0340AFC00C580F100340AFA00458009003D8001004E000000AC0AA600AC0ABA00CB
S12303E0FD80F70032000000700AA600F58100008C0AA700300AA600900ABA00320000001A
S1230400900AA600C5810300700ABA00F5810300900ABA00FD80F700300AA700900AA400BB
S1230420100AFB00900AA50034800E0032800000900AA7004C0ABA005C0AFD0074000000C8
S123044074000000A40ABB00300ABA00180AA600900A9400300A9400700ABB00E98118004C

S1230460300AFE00C5811900300AFF00900AAC00300AB600E5811F00300AA700900B000071

S1230480C5812000300B0000900A8600300AA400700ACD00F5812600300B0100C58127002D

S12304A0300B0200900AB500300A8600180AC600900A9700300A9700F1812E00240000003E

S12304C0900A9C00300AC900F5813300300B0400C5813400300B03004D800000700A9C005C

S12304E0ED8138004D200000AC0AAE00300AAE00180B0500900A9D00300AAE00900B0500B2

S12305004D200000300AB600E5814B00300B0A00900B0B00300B0900900B0A00300B0800B2

S1230520900B0900300B0700900B0800300AA500900B0700300A9D0071600000D181500063

S1230540900B0800C5815B00300B0700700B0800D1815B00700B0900D1815B00700B0A002B

S1230560D1815B00700B0B00D1815B00900B0600C5815C004D800000300B060034800E0084

S123058032800000900A8500AC0AAF00300AAF00D1816500300AB600D1816C00300B0F0089

S12305A019800100E9817100900B0F0031200000900A9000C5817300300B0E00900B0F00F1

S12305C031200000900A9000C58173003180000090OA9000300AB700E5817800300A85007A

S12305E0900B1000C5817900300B1000900ADD00300ADD00180B1100900AA000300ADD002F

S1230600900B1100300AA000F18182002400000900A9800300A9800700B1300F5818D00A3

S1230620300B14001980010OE9819200900B140031200000900A9E00C5819400300B120072

S1230640900B140031200000900A9E00C58194003180000090OA9E00300A9E00180B15008B

S1230660900A9F00300A9E00900B1500300A9E00280A9000900A8700300A9B00280ACA0029

S1230680900A9100300A9100D181A800300B170019800100E981AD00900B17003180000000

S12306A0900AB100C581AF00300B1600900B17003180000090OAB100C581AF0031200000B1

S12306C0900AB100300A8400200A99002D200000200ACE002D200000900A9900300A9900B2

S12306E04C800E002C0B1800900A9A00AC0B1800300A9900D181BE00300A8C00C581BF001C

S1230700300A8800900A8A00340B2B004D805A00AE80000031847400700B2200F181C80030

S123072031800100900B220031801400700085A00F181CD003180000090085A003180140008

S123074070085B00F181D20031800000900085B0031200000900A8E00300A8C0071800000AA

S1230760E581F800C58212003008 5A00E5827200300A8A0071800000E5825D00300A890017

S1230780718000000D181E2003180000090OB2000318009007 00B2000E981F400340B2900A9

S12307A046800000318001001 00B2000900B20003004FD002180FF0019801E004C800E0065

S12307C05C0B3500900B330074000000B00A55003180000090OA8E0031800100100B210061

S12307E0900B2100C5827200300B3100900B300031800000900B3100340B290092800000052

S1230800740000007400000031801200700085B00E98207003180010010085A0090085A00CE

S1230820C5821200300B1E00900B1F0031800000900B210031800000900B1E0031800100BF

S1230840900B2200318000090085A00C5820300300A8B0071800000D18217003180000019

S1230860900B240031800900700B2400E981D800340B2A0046800000031800100100B2400FA

S1230880900B24003004FD002180FF004C800E00900B26005C0B1D0019801E00900B25002E

S12308A030800100100B1E00900B1E0030085A0071800600F5823900300B2200ED82590033

S12308C071818F00F5825900340B220032885C002180FF00900B270032885C00180B27008A

S12308E0280B260092885C00C582590071800C00F5824A005D810000300B2200180B370032

S1230900ED82590071818F00F582590034800E0032885C00200B2E00900B270032885C00B1

S1230920180B27002880040092885C00C58259005C0B3400300B2200180B3700180B3700FB

S1230940ED82590071818F00F582590034800E0032885C00200B2D00900B270030800400D4

S12309600800000280B270092885C0031800100100B2200900B2200C581D800340B2A0068

S12309809280000030085B0071801400F1826500300B210034085B009288440031800100CE

S12309A070085A00D1826E0070085B00E5826E0090085B00300B2100900844000C581DD00AA

S12309C031800100100085B0090085B00C581DD00340B2F004680000300AB300E5827800D8

S12309E0300B1A00900B36003004FD0021800F00900A8F00300A9600D1828F00300ADD00FA

S1230A002187FF00280B36004C800E00300A9E00E58286003080030028 0B1B004C800E0048

S1230A20300A8700E5828B0030800300280B1C004C800E0031800000900B360030800300EE

S1230A40928000004D200000300A88007180000D182A200340B2A0092800000300B310084

S1230A60900B3200458000008C0B31007180020 0ED82A200300B30007180020 0ED82A200A5

S1230A80100B320071812C00F582A2004D800000340B2C003180A50092800000AC0A8D00EB

S1230AA031800100100B3100900B3100300ABE00F582A900318001009 00ABE00300AAB0061

S1230AC0900ABF00300AAA00900AC000300AA600900AC100300A9400900AC200300AAC0030

S1230AE0900AC300300AB500900AC400300AAE00900AC500300A8500900AC600300AAF00F9

S1230B00900AC700300A9F00900AC800300AB100900AC900300A9A00900ACA00300A8A00EB

S1230B20900ACB00300A8E00900ACC00300A8F00900ACD00300A8D00900ACE00300ABD00C8

S1230B40E582D1001980010090 0ABD0031800000900B3A0031800100900B3900300ACB0057

S1230B6071800000E5830D00300ACC0071800000D1832200300B3B00900B3800300B3900E1

S1230B8071800B00F1831F003180010010085B00180B3900E9831F0071800A00F183060041

S1230BA0300B3900 71800600F582F000340B380032885C002180FF004C800E005C0B3F00B2

S1230BC0300B4200C582F900300B3800180B3E0034800E0032885C00200B40004C800E0063

S1230BE05C0B4100740000000300B4200188004001 00A55004C800E005C800E0030085B00F6

S1230C00180B3900ED83060071800E00F183060034800E0030800100128 82E0092882E0002

S1230C2031800100100B3900900B390031803F00100B3800900B3800C582DD0031800100EA

S1230C40900B3B0030085B0071800100E5831300C582D80031200000900B3A00340B3C00FA

```
S1230C60600B3D003D80010045800800 4D8000003200000093000000AE000000FD831A0063
S1230C80C583220031800100100B3B00900B3B00300B3A00900AA300300ACF00F5832400B1
S1230CA031800100900ACF00300AC800900AD000300ACB00900AD100300ACC00900AD200C7
S1230CC0300AA300900AD300300ABE00E58334001980010 0900ABE0031800000900B4600AE
S1230CE031800A00900B4500300AD1007180000 0E5839A00300AD2007180000 0D183AF0057
S1230D0031823700100B4700900B440030085B0071800A00ED834600900B4300C5834800F2
S1230D2011801200900B4300300B45007180020 0E583AC0031800100100B4300180B45002F
S1230D40E983AC00198001007180120 0ED83540030085B00900B4300300B4300180B4500BF
S1230D6071800900F1838900300B45007180060 0F5836400340B440032885C002180FF00EC
S1230D804C800E005C0B4C00300B4F007400000018800400C5837D0071800C00F58371007D
S1230DA0300B4400180B4A0034800E0032885C00200B4B004C800E005C0B4D00300B4F00DD
S1230DC0740000001880040 0C5837D00300B4400180B4A00180B4A0034800E0032885C0009
S1230DE00C000000213FC0004C800E005C0B4E00300B4F00740000001880010 0100A55002E
S1230E004C800E005C800E00300B4300180B4500ED83890071800E00F183890034800E006D
S1230E2030800100128A5600928A5600300B45007180120 0E58390003180010 0100B45000C
S1230E40900B4500C583920031800100900B45001980010 04D803F005C800E00740000003E
S1230E60300B4700108004 00900B4400C5834800318001009 00B470030085B0071800A00C7
S1230E80E583A000C5833B0031200000900B4600340B4800600B49003D800100458008 00CB
S1230EA04D8000003200000093000000AE000000FD83A700C583AF0031800100100B4700BC
S1230EC0900B4700300B4600900AA200300AA2002C0AD300900AA100300B5100900AB00079
S1230EE0300B5000900B5100300AA100900B5000300ABC00F583BA0031800100900ABC0081
S1230F00300ACF00E583C200198001009 00ACF00C58004003180020 0900ABC0031800000094
S1230F20900ABD0031800000900ABE0031800000900ACF0031920900900 4FF00300B0D008C
S1230F40900B0600900B0700900B0800900B0900900B0A00900B0B00C5800400318002 00BC
S1230F60900ABC0031800000900ABD0031800000900ABE0031800000900ACF00300ABC00F6
S1230F8071800100F583DD00C5800400C583E100C583E200440BFF00D583E300440BCA00C8
S1230FA07400000074000000740000 00C583E300440BFF00D583EA00440BD800740000007B
S1230FC0740000007400000 0C583EA00440BFF00D583F100440BE60074000000740000003F
S1230FE0740000 00C583F100440BFF00D583F800440BF400740000007400000 0C583F80037
S12310000000004000000410000000FF000000FF000000FF000000FF000000E40000041900B7
S12310200000000000000000000000000000000000000000000000000000000000000000AC
S1231040000000000000000000000000000000000000000000000000000000000000000 08C
```

```
S1231060000000000000000000000000000000000000000000000000000000000000000006C
S1231080000000000000000000000000000000000000000000000000000000000000000004C
S12310A0000000000000000000000000000000000000000000000000000000000000000002C
S12310C0000000000000000000000000000000000000000000000000000000000000000000C
S12310E00000000000000000000000000000000000000000000000000000000000000000EC
S12311000000000000000000000000000000000000000000000000000000000000000000CB
S12311200000000000000000000000000000000000000000000000000000000000000000AB
S123114000000000000000000000000000000000000000000000000000000000000000008B
S123116000000000000000000000000000000000000000000000000000000000000000006B
S123118000000000000000000000000000000000000000000000000000000000000000004B
S12311A000000000000000000000000000000000000000000000000000000000000000002B
S12311C000000000000000000000000000000000000000000000000000000000000000000B
S12311E00000000000000000000000000000000000000000000000000000000000000000EB
S12312000000000000000000000000000000000000000000000000000000000000000000CA
S12312200000000000000000000000000000000000000000000000000000000000000000AA
S123124000000000000000000000000000000000000000000000000000000000000000008A
S123126000000000000000000000000000000000000000000000000000000000000000006A
S123128000000000000000000000000000000000000000000000000000000000000000004A
S12312A000000000000000000000000000000000000000000000000000000000000000002A
S12312C000000000000000000000000000000000000000000000000000000000000000000A
S12312E00000000000000000000000000000000000000000000000000000000000000000EA
S12313000000000000000000000000000000000000000000000000000000000000000000C9
S12313200000000000000000000000000000000000000000000000000000000000000000A9
S1231340000000000000000000000000000000000000000000000000000000000000000089
S1231360000000000000000000000000000000000000000000000000000000000000000069
S1231380000000000000000000000000000000000000000000000000000000000000000049
S12313A000000000000000000000000000000000000001000004FE000300000000033F00E1
S12313C0000814000000000000000000000000000000000000000000000000000000000000ED
S12313E00000000000000000000000000000000000000000000000000000000000000000E9
S12314000000000000000000000000000000000000000000000000000000000000000000C8
S12314200000000000000000000000000000000000000000000000000000000000000000A8
S1231440000000000000000000000000000000000000000000000000000000000000000088
```

```
S12314600000000000000000000000000000000000000000000000000000000000000068
S12314800000000000000000000000000000000000000000000000000000000000000048
S12314A00000000000000000000000000000000000000000000000000000000000000028
S12314C00000000000000000000000000000000000000000000000000000000000000008
S12314E000000000000000000000000000000000000000000000000000000000000000E8
S123150000000000000000000000000000000000000000000000000000000000000000C7
S123152000000000000000000000000000000000000000000000000000000000000000A7
S12315400000000000000000000000000000000000000000000000000000000000000087
S12315600000000000000000000000000000000000000000000000000000000000000067
S12315800000000000000000000000000000000000000000000000000000000000000047
S12315A00000000000000000000000000000000000000000000000000000000000000027
S12315C00000000000000000000000000000000000000000000000000000000000000007
S12315E000000000000000000000000000000000000000000000000000000000000000E7
S123160000000000000000000000000000000000000000000000000000000000000000C6
S123162000000000000000000000000000000000000000000000000000000000000000A6
S12316400000000000000000000000000000000000000000000000000000000000000086
S12316600000000000000000000000000000000000000000000000000000000000000066
S12316800000000000000000000000000000000000000000000000000000000000000046
S12316A00000000000000000000000000000000000000000000000000000000000000026
S12316C00000000000000000000000000000000000000000000000000000000000000006
S12316E000000000000000000000000000000000000000000000000000000000000000E6
S123170000000000000000000000000000000000000000000000000000000000000000C5
S123172000000000000000000000000000000000000000000000000000000000000000A5
S12317400000000000000000000000000000000000000000000000000000000000000085
S12317600000000000000000000000000000000000000000000000000000000000000065
S12317800000000000000000000000000000000000000000000000000000000000000045
S12317A00000000000000000000000000000000000000000000000000000000000000025
S12317C00000000000000000000000000000000000000000000000000000000000000005
S12317E000000000000000000000000000000000000000000000000000000000000000E5
S123180000000000000000000000000000000000000000000000000000000000000000C4
S123182000000000000000000000000000000000000000000000000000000000000000A4
S12318400000000000000000000000000000000000000000000000000000000000000084
```

```
S12318600000000000000000000000000000000000000000000000000000000000000000064
S12318800000000000000000000000000000000000000000000000000000000000000000044
S12318A00000000000000000000000000000000000000000000000000000000000000000024
S12318C00000000000000000000000000000000000000000000000000000000000000000004
S12318E000000000000000000000000000000000000000000000000000000000000000000E4
S123190000000000000000000000000000000000000000000000000000000000000000000C3
S123192000000000000000000000000000000000000000000000000000000000000000000A3
S12319400000000000000000000000000000000000000000000000000000000000000000083
S12319600000000000000000000000000000000000000000000000000000000000000000063
S12319800000000000000000000000000000000000000000000000000000000000000000043
S12319A00000000000000000000000000000000000000000000000000000000000000000023
S12319C00000000000000000000000000000000000000000000000000000000000000000003
S12319E000000000000000000000000000000000000000000000000000000000000000000E3
S1231A0000000000000000000000000000000000000000000000000000000000000000000C2
S1231A2000000000000000000000000000000000000000000000000000000000000000000A2
S1231A400000000000000000000000000000000000000000000000000000000000000000082
S1231A600000000000000000000000000000000000000000000000000000000000000000062
S1231A800000000000000000000000000000000000000000000000000000000000000000042
S1231AA00000000000000000000000000000000000000000000000000000000000000000022
S1231AC00000000000000000000000000000000000000000000000000000000000000000002
S1231AE000000000000000000000000000000000000000000000000000000000000000000E2
S1231B0000000000000000000000000000000000000000000000000000000000000000000C1
S1231B2000000000000000000000000000000000000000000000000000000000000000000A1
S1231B400000000000000000000000000000000000000000000000000000000000000000081
S1231B600000000000000000000000000000000000000000000000000000000000000000061
S1231B800000000000000000000000000000000000000000000000000000000000000000041
S1231BA00000000000000000000000000000000000000000000000000000000000000000021
S1231BC00000000000000000000000000000000000000000000000000000000000000000001
S1231BE000000000000000000000000000000000000000000000000000000000000000000E1
S1231C0000000000000000000000000000000000000000000000000000000000000000000C0
S1231C2000000000000000000000000000000000000000000000000000000000000000000A0
S1231C400000000000000000000000000000000000000000000000000000000000000000080
```

S1231C600000000000000000000000000000000000000000000000000000000000000000060

S1231C800000000000000000000000000000000000000000000000000000000000000000040

S1231CA00000000000000000000000000000000000000000000000000000000000000000020

S1231CC00000000000000000000000000000000000000000000000000000000000000000000

S1231CE000000000000000000000000000000000000000000000000000000000000000000E0

S1231D000000000000000000000000000000000000000000000000000000000000000000BF

S1231D2000000000000000000000000000000000000000000000000000000000000000009F

S1231D4000000000000000000000000000000000000000000000000000000000000000007F

S1231D6000000000000000000000000000000000000000000000000000000000000000005F

S1231D8000000000000000000000000000000000000000000000000000000000000000003F

S1231DA000000000000000000000000000000000000000000000000000000000000000001F

S1231DC00000000000000000000000000000000000000000000000000000000000000000FF

S1231DE00000000000000000000000000000000000000000000000000000000000000000DF

S1231E000000000000000000000000000000000000000000000000000000000000000000BE

S1231E2000000000000000000000000000000000000000000000000000000000000000009E

S1231E4000000000000000000000000000000000000000000000000000000000000000007E

S1231E6000000000000000000000000000000000000000000000000000000000000000005E

S1231E8000000000000000000000000000000000000000000000000000000000000000003E

S1231EA000000000000000000000000000000000000000000000000000000000000000001E

S1231EC0000000000000000000000000000000000000000000000000000000008000000F6

S1231EE00000080000000000000001000020 0B000000000040000000000000000000000006A

S1231F00200000000040000 0FFFFC200200000000040000 0FFFFC200400000007FFFFF00C0

S1231F200000090000000000000000000000000000000000000000000008310000014F000B

S1231F407F5C28000059E20000000000400000000000000004000000000000000000818009F

S1231F600008440000000A6C0020000040000000000000000000000004000000000000000FB

S1231F8000004F0000000A00000000000000000000000000000000000000000000000000E4

S1231FA0000000000000000000B0C0000274B00000001000000000000000000000727200AF

S1231FC000004F00000000010000000001BD9000000010000000000000000000100000 0B7

S1231FE0002000000040000000051EB0000000000000000000000000900000000000001 0091

S12320000000000000090000000000000000000000000000000000008000000080010 0B2

S12320200010AB000011540000FFFF0000FF000000800200000000000000000000000000FD

S123204000000000080000000000200000000000000017A0000000100000001000000000 7D

S123206000000010000082E000008180000017A000002000000FF000000000200003C00004B

S1232080000000100000001000000010000000000000000100000A5600000A6C0000017A00E7

S12320A000FF0000000200000000020001000000003C00000000000000000000000000000DC

S12320C000000000FFFFFFFFFFFFFFFFFFFFFFFFFFFFFFFFFFFFFFFFFFFFFFFFFFFFFFFF18

S12320E0FFFFFFFFFFFFFFFFFFFFFFFFFFFFFFFFFFFFFFFFFFFFFFFFFFFFFFFFFFFFFFFFFC

S1232100FFFFFFFFFFFFFFFFFFFFFFFFFFFFFFFFFFFFFFFFFFFFFFFFFFFFFFFFFFFFFFFFDB

S1232120FFFFFFFFFFFFFFFFFFFFFFFFFFFFFFFFFFFFFFFFFFFFFFFFFFFFFFFFFFFFFFFFBB

S1232140FFFFFFFFFFFFFFFFFFFFFFFFFFFFFFFFFFFFFFFFFFFFFFFFFFFFFFFFFFFFFFFF9B

S1232160FFFFFFFFFFFFFFFFFFFFFFFFFFFFFFFFFFFFFFFFFFFFFFFFFFFFFFFFFFFFFFFF7B

S1232180FFFFFFFFFFFFFFFFFFFFFFFFFFFFFFFFFFFFFFFFFFFFFFFFFFFFFFFFFFFFFFFF5B

S12321A0FFFFFFFFFFFFFFFFFFFFFFFFFFFFFFFFFFFFFFFFFFFFFFFFFFFFFFFFFFFFFFFF3B

S12321C0FFFFFFFFFFFFFFFFFFFFFFFFFFFFFFFFFFFFFFFFFFFFFFFFFFFFFFFFFFFFFFFF1B

S12321E0FFFFFFFFFFFFFFFFFFFFFFFFFFFFFFFFFFFFFFFFFFFFFFFFFFFFFFFFFFFFFFFFFB

S1232200FFFFFFFFFFFFFFFFFFFFFFFFFFFFFFFFFFFFFFFFFFFFFFFFFFFFFFFFFFFFFFFFDA

S1232220FFFFFFFFFFFFFFFFFFFFFFFFFFFFFFFFFFFFFFFFFFFFFFFFFFFFFFFFFFFFFFFFBA

S1232240FFFFFFFFFFFFFFFFFFFFFFFFFFFFFFFFFFFFFFFFFFFFFFFFFFFFFFFFFFFFFFFF9A

S1232260FFFFFFFFFFFFFFFFFFFFFFFFFFFFFFFFFFFFFFFFFFFFFFFFFFFFFFFFFFFFFFFF7A

S1232280FFFFFFFFFFFFFFFFFFFFFFFFFFFFFFFFFFFFFFFFFFFFFFFFFFFFFFFFFFFFFFFF5A

S12322A0FFFFFFFFFFFFFFFFFFFFFFFFFFFFFFFFFFFFFFFFFFFFFFFFFFFFFFFFFFFFFFFF3A

S12322C0FFFFFFFFFFFFFFFFFFFFFFFFFFFFFFFFFFFFFFFFFFFFFFFFFFFFFFFFFFFFFFFF1A

S12322E0FFFFFFFFFFFFFFFFFFFFFFFFFFFFFFFFFFFFFFFFFFFFFFFFFFFFFFFFFFFFFFFFFA

S1232300FFFFFFFFFFFFFFFFFFFFFFFFFFFFFFFFFFFFFFFFFFFFFFFFFFFFFFFFFFFFFFFFD9

S1232320FFFFFFFFFFFFFFFFFFFFFFFFFFFFFFFFFFFFFFFFFFFFFFFFFFFFFFFFFFFFFFFFB9

S1232340FFFFFFFFFFFFFFFFFFFFFFFFFFFFFFFFFFFFFFFFFFFFFFFFFFFFFFFFFFFFFFFF99

S1232360FFFFFFFFFFFFFFFFFFFFFFFFFFFFFFFFFFFFFFFFFFFFFFFFFFFFFFFFFFFFFFFF79

S1232380FFFFFFFFFFFFFFFFFFFFFFFFFFFFFFFFFFFFFFFFFFFFFFFFFFFFFFFFFFFFFFFF59

S12323A0FFFFFFFFFFFFFFFFFFFFFFFFFFFFFFFFFFFFFFFFFFFFFFFFFFFFFFFFFFFFFFFF39

S12323C0FFFFFFFFFFFFFFFFFFFFFFFFFFFFFFFFFFFFFFFFFFFFFFFFFFFFFFFFFFFFFFFF19

S12323E0FFFFFFFFFFFFFFFFFFFFFFFFFFFFFFFFFFFFFFFFFFFFFFFFFFFFFFFFFFFFFFFFF9

S1232400FFFFFFFFFFFFFFFFFFFFFFFFFFFFFFFFFFFFFFFFFFFFFFFFFFFFFFFFFFFFFFFFD8

S1232420FFFFFFFFFFFFFFFFFFFFFFFFFFFFFFFFFFFFFFFFFFFFFFFFFFFFFFFFFFFFFFFFB8

S1232440FFFFFFFFFFFFFFFFFFFFFFFFFFFFFFFFFFFFFFFFFFFFFFFFFFFFFFFFFFFFFFFF98

S1232460FFFFFFFFFFFFFFFFFFFFFFFFFFFFFFFFFFFFFFFFFFFFFFFFFFFFFFFFFFFFFFFF78
S1232480FFFFFFFFFFFFFFFFFFFFFFFFFFFFFFFFFFFFFFFFFFFFFFFFFFFFFFFFFFFFFFFF58
S12324A0FFFFFFFFFFFFFFFFFFFFFFFFFFFFFFFFFFFFFFFFFFFFFFFFFFFFFFFFFFFFFFFF38
S12324C0FFFFFFFFFFFFFFFFFFFFFFFFFFFFFFFFFFFFFFFFFFFFFFFFFFFFFFFFFFFFFFFF18
S12324E0FFFFFFFFFFFFFFFFFFFFFFFFFFFFFFFFFFFFFFFFFFFFFFFFFFFFFFFFFFFFFFFFF8
S1232500FFFFFFFFFFFFFFFFFFFFFFFFFFFFFFFFFFFFFFFFFFFFFFFFFFFFFFFFFFFFFFFFD7
S1232520FFFFFFFFFFFFFFFFFFFFFFFFFFFFFFFFFFFFFFFFFFFFFFFFFFFFFFFFFFFFFFFFB7
S1232540FFFFFFFFFFFFFFFFFFFFFFFFFFFFFFFFFFFFFFFFFFFFFFFFFFFFFFFFFFFFFFFF97
S1232560FFFFFFFFFFFFFFFFFFFFFFFFFFFFFFFFFFFFFFFFFFFFFFFFFFFFFFFFFFFFFFFF77
S1232580FFFFFFFFFFFFFFFFFFFFFFFFFFFFFFFFFFFFFFFFFFFFFFFFFFFFFFFFFFFFFFFF57
S12325A0FFFFFFFFFFFFFFFFFFFFFFFFFFFFFFFFFFFFFFFFFFFFFFFFFFFFFFFFFFFFFFFF37
S12325C0FFFFFFFFFFFFFFFFFFFFFFFFFFFFFFFFFFFFFFFFFFFFFFFFFFFFFFFFFFFFFFFF17
S12325E0FFFFFFFFFFFFFFFFFFFFFFFFFFFFFFFFFFFFFFFFFFFFFFFFFFFFFFFFFFFFFFFFF7
S1232600FFFFFFFFFFFFFFFFFFFFFFFFFFFFFFFFFFFFFFFFFFFFFFFFFFFFFFFFFFFFFFFFD6
S1232620FFFFFFFFFFFFFFFFFFFFFFFFFFFFFFFFFFFFFFFFFFFFFFFFFFFFFFFFFFFFFFFFB6
S1232640FFFFFFFFFFFFFFFFFFFFFFFFFFFFFFFFFFFFFFFFFFFFFFFFFFFFFFFFFFFFFFFF96
S1232660FFFFFFFFFFFFFFFFFFFFFFFFFFFFFFFFFFFFFFFFFFFFFFFFFFFFFFFFFFFFFFFF76
S1232680FFFFFFFFFFFFFFFFFFFFFFFFFFFFFFFFFFFFFFFFFFFFFFFFFFFFFFFFFFFFFFFF56
S12326A0FFFFFFFFFFFFFFFFFFFFFFFFFFFFFFFFFFFFFFFFFFFFFFFFFFFFFFFFFFFFFFFF36
S12326C0FFFFFFFFFFFFFFFFFFFFFFFFFFFFFFFFFFFFFFFFFFFFFFFFFFFFFFFFFFFFFFFF16
S12326E0FFFFFFFFFFFFFFFFFFFFFFFFFFFFFFFFFFFFFFFFFFFFFFFFFFFFFFFFFFFFFFFFF6
S1232700FFFFFFFFFFFFFFFFFFFFFFFFFFFFFFFFFFFFFFFFFFFFFFFFFFFFFFFFFFFFFFFFD5
S1232720FFFFFFFFFFFFFFFFFFFFFFFFFFFFFFFFFFFFFFFFFFFFFFFFFFFFFFFFFFFFFFFFB5
S1232740FFFFFFFFFFFFFFFFFFFFFFFFFFFFFFFFFFFFFFFFFFFFFFFFFFFFFFFFFFFFFFFF95
S1232760FFFFFFFFFFFFFFFFFFFFFFFFFFFFFFFFFFFFFFFFFFFFFFFFFFFFFFFFFFFFFFFF75
S1232780FFFFFFFFFFFFFFFFFFFFFFFFFFFFFFFFFFFFFFFFFFFFFFFFFFFFFFFFFFFFFFFF55
S12327A0FFFFFFFFFFFFFFFFFFFFFFFFFFFFFFFFFFFFFFFFFFFFFFFFFFFFFFFFFFFFFFFF35
S12327C0FFFFFFFFFFFFFFFFFFFFFFFFFFFFFFFFFFFFFFFFFFFFFFFFFFFFFFFFFFFFFFFF15
S12327E0FFFFFFFFFFFFFFFFFFFFFFFFFFFFFFFFFFFFFFFFFFFFFFFFFFFFFFFFFFFFFFFFF5
S1232800FFFFFFFFFFFFFFFFFFFFFFFFFFFFFFFFFFFFFFFFFFFFFFFFFFFFFFFFFFFFFFFFD4
S1232820FFFFFFFFFFFFFFFFFFFFFFFFFFFFFFFFFFFFFFFFFFFFFFFFFFFFFFFFFFFFFFFFB4
S1232840FFFFFFFFFFFFFFFFFFFFFFFFFFFFFFFFFFFFFFFFFFFFFFFFFFFFFFFFFFFFFFFF94

S1232860FFFFFFFFFFFFFFFFFFFFFFFFFFFFFFFFFFFFFFFFFFFFFFFFFFFFFFFFFFFFFFFF74

S1232880FFFFFFFFFFFFFFFFFFFFFFFFFFFFFFFFFFFFFFFFFFFFFFFFFFFFFFFFFFFFFFFF54

S12328A0FFFFFFFFFFFFFFFFFFFFFFFFFFFFFFFFFFFFFFFFFFFFFFFFFFFFFFFFFFFFFFFF34

S12328C0FFFFFFFFFFFFFFFFFFFFFFFFFFFFFFFFFFFFFFFFFFFFFFFFFFFFFFFFFFFFFFFF14

S12328E0FFFFFFFFFFFFFFFFFFFFFFFFFFFFFFFFFFFFFFFFFFFFFFFFFFFFFFFFFFFFFFFFF4

S1232900FFFFFFFFFFFFFFFFFFFFFFFFFFFFFFFFFFFFFFFFFFFFFFFFFFFFFFFFFFFFFFFFD3

S1232920FFFFFFFFFFFFFFFFFFFFFFFFFFFFFFFFFFFFFFFFFFFFFFFFFFFFFFFFFFFFFFFFB3

S1232940FFFFFFFFFFFFFFFFFFFFFFFFFFFFFFFFFFFFFFFFFFFFFFFFFFFFFFFFFFFFFFFF93

S1232960FFFFFFFFFFFFFFFFFFFFFFFFFFFFFFFFFFFFFFFFFFFFFFFFFFFFFFFFFFFFFFFF73

S1232980FFFFFFFFFFFFFFFFFFFFFFFFFFFFFFFFFFFFFFFFFFFFFFFFFFFFFFFFFFFFFFFF53

S12329A0FFFFFFFFFFFFFFFFFFFFFFFFFFFFFFFFFFFFFFFFFFFFFFFFFFFFFFFFFFFFFFFF33

S12329C0FFFFFFFFFFFFFFFFFFFFFFFFFFFFFFFFFFFFFFFFFFFFFFFFFFFFFFFFFFFFFFFF13

S12329E0FFFFFFFFFFFFFFFFFFFFFFFFFFFFFFFFFFFFFFFFFFFFFFFFFFFFFFFFFFFFFFFFF3

S1232A00FFFFFFFFFFFFFFFFFFFFFFFFFFFFFFFFFFFFFFFFFFFFFFFFFFFFFFFFFFFFFFFFD2

S1232A20FFFFFFFFFFFFFFFFFFFFFFFFFFFFFFFFFFFFFFFFFFFFFFFFFFFFFFFFFFFFFFFFB2

S1232A40FFFFFFFFFFFFFFFFFFFFFFFFFFFFFFFFFFFFFFFFFFFFFFFFFFFFFFFFFFFFFFFF92

S1232A60FFFFFFFFFFFFFFFFFFFFFFFFFFFFFFFFFFFFFFFFFFFFFFFFFFFFFFFFFFFFFFFF72

S1232A80FFFFFFFFFFFFFFFFFFFFFFFFFFFFFFFFFFFFFFFFFFFFFFFFFFFFFFFFFFFFFFFF52

S1232AA0FFFFFFFFFFFFFFFFFFFFFFFFFFFFFFFFFFFFFFFFFFFFFFFFFFFFFFFFFFFFFFFF32

S1232AC0FFFFFFFFFFFFFFFFFFFFFFFFFFFFFFFFFFFFFFFFFFFFFFFFFFFFFFFFFFFFFFFF12

S1232AE0FFFFFFFFFFFFFFFFFFFFFFFFFFFFFFFFFFFFFFFFFFFFFFFFFFFFFFFFFFFFFFFFF2

S1232B00FFFFFFFFFFFFFFFFFFFFFFFFFFFFFFFFFFFFFFFFFFFFFFFFFFFFFFFFFFFFFFFFD1

S1232B20FFFFFFFFFFFFFFFFFFFFFFFFFFFFFFFFFFFFFFFFFFFFFFFFFFFFFFFFFFFFFFFFB1

S1232B40FFFFFFFFFFFFFFFFFFFFFFFFFFFFFFFFFFFFFFFFFFFFFFFFFFFFFFFFFFFFFFFF91

S1232B60FFFFFFFFFFFFFFFFFFFFFFFFFFFFFFFFFFFFFFFFFFFFFFFFFFFFFFFFFFFFFFFF71

S1232B80FFFFFFFFFFFFFFFFFFFFFFFFFFFFFFFFFFFFFFFFFFFFFFFFFFFFFFFFFFFFFFFF51

S1232BA0FFFFFFFFFFFFFFFFFFFFFFFFFFFFFFFFFFFFFFFFFFFFFFFFFFFFFFFFFFFFFFFF31

S1232BC0FFFFFFFFFFFFFFFFFFFFFFFFFFFFFFFFFFFFFFFFFFFFFFFFFFFFFFFFFFFFFFFF11

S1232BE0FFFFFFFFFFFFFFFFFFFFFFFFFFFFFFFFFFFFFFFFFFFFFFFFFFFFFFFFFFFFFFFFF1

S1232C00FFFFFFFFFFFFFFFFFFFFFFFFFFFFFFFFFFFFFFFFFFFFFFFFFFFFFFFFFFFFFFFFD0

S1232C20FFFFFFFFFFFFFFFFFFFFFFFFFFFFFFFFFFFFFFFFFFFFFFFFFFFFFFFFFFFFFFFFB0

S1232C40FFFFFFFFFFFFFFFFFFFFFFFFFFFFFFFFFFFFFFFFFFFFFFFFFFFFFFFFFFFFFFFF90

S1232C60FFFFFFFFFFFFFFFFFFFFFFFFFFFFFFFFFFFFFFFFFFFFFFFFFFFFFFFFFFFFFFFF70

S1232C80FFFFFFFFFFFFFFFFFFFFFFFFFFFFFFFFFFFFFFFFFFFFFFFFFFFFFFFFFFFFFFFF50

S1232CA0FFFFFFFFFFFFFFFFFFFFFFFFFFFFFFFFFFFFFFFFFFFFFFFFFFFFFFFFFFFFFFFF30

S1232CC0FFFFFFFFFFFFFFFFFFFFFFFFFFFFFFFFFFFFFFFFFFFFFFFFFFFFFFFFFFFFFFFF10

S1232CE0FFFFFFFFFFFFFFFFFFFFFFFFFFFFFFFFFFFFFFFFFFFFFFFFFFFFFFFFFFFFFFFFF0

S1232D00FFFFFFFFFFFFFFFFFFFFFFFFFFFFFFFFFFFFFFFFFFFFFFFFFFFFFFFFFFFFFFFFCF

S1232D20FFFFFFFFFFFFFFFFFFFFFFFFFFFFFFFFFFFFFFFFFFFFFFFFFFFFFFFFFFFFFFFFAF

S1232D40FFFFFFFFFFFFFFFFFFFFFFFFFFFFFFFFFFFFFFFFFFFFFFFFFFFFFFFFFFFFFFFF8F

S1232D60FFFFFFFFFFFFFFFFFFFFFFFFFFFFFFFFFFFFFFFFFFFFFFFFFFFFFFFFFFFFFFFF6F

S1232D80FFFFFFFFFFFFFFFFFFFFFFFFFFFFFFFFFFFFFFFFFFFFFFFFFFFFFFFFFFFFFFFF4F

S1232DA0FFFFFFFFFFFFFFFFFFFFFFFFFFFFFFFFFFFFFFFFFFFFFFFFFFFFFFFFFFFFFFFF2F

S1232DC0FFFFFFFFFFFFFFFFFFFFFFFFFFFFFFFFFFFFFFFFFFFFFFFFFFFFFFFFFFFFFFFF0F

S1232DE0FFFFFFFFFFFFFFFFFFFFFFFFFFFFFFFFFFFFFFFFFFFFFFFFFFFFFFFFFFFFFFFFEF

S1232E00FFFFFFFFFFFFFFFFFFFFFFFFFFFFFFFFFFFFFFFFFFFFFFFFFFFFFFFFFFFFFFFFCE

S1232E20FFFFFFFFFFFFFFFFFFFFFFFFFFFFFFFFFFFFFFFFFFFFFFFFFFFFFFFFFFFFFFFFAE

S1232E40FFFFFFFFFFFFFFFFFFFFFFFFFFFFFFFFFFFFFFFFFFFFFFFFFFFFFFFFFFFFFFFF8E

S1232E60FFFFFFFFFFFFFFFFFFFFFFFFFFFFFFFFFFFFFFFFFFFFFFFFFFFFFFFFFFFFFFFF6E

S1232E80FFFFFFFFFFFFFFFFFFFFFFFFFFFFFFFFFFFFFFFFFFFFFFFFFFFFFFFFFFFFFFFF4E

S1232EA0FFFFFFFFFFFFFFFFFFFFFFFFFFFFFFFFFFFFFFFFFFFFFFFFFFFFFFFFFFFFFFFF2E

S1232EC0FFFFFFFFFFFFFFFFFFFFFFFFFFFFFFFFFFFFFFFFFFFFFFFFFFFFFFFFFFFFFFFF0E

S1232EE0FFFFFFFFFFFFFFFFFFFFFFFFFFFFFFFFFFFFFFFFFFFFFFFFFFFFFFFFFFFFFFFFEE

S1232F00FFFFFFFFFFFFFFFFFFFFFFFFFFFFFFFFFFFFFFFFFFFFFFFFFFFFFFFFFFFFFFFFCD

S1232F20FFFFFFFFFFFFFFFFFFFFFFFFFFFFFFFFFFFFFFFFFFFFFFFFFFFFFFFFFFFFFFFFAD

S1232F40FFFFFFFFFFFFFFFFFFFFFFFFFFFFFFFFFFFFFFFFFFFFFFFFFFFFFFFFFFFFFFFF8D

S1232F60FFFFFFFFFFFFFFFFFFFFFFFFFFFFFFFFFFFFFFFFFFFFFFFFFFFFFFFFFFFFFFFF6D

S1232F80FFFFFFFFFFFFFFFFFFFFFFFFFFFFFFFFFFFFFFFFFFFFFFFFFFFFFFFFFFFFFFFF4D

S1232FA0FFFFFFFFFFFFFFFFFFFFFFFFFFFFFFFFFFFFFFFFFFFFFFFFFFFFFFFFFFFFFFFF2D

S1232FC0FFFFFFFFFFFFFFFFFFFFFFFFFFFFFFFFFFFFFFFFFFFFFFFFFFFFFFFFFFFFFFFF0D

S1232FE0FFFFFFFFFFFFFFFFFFFFFFFFFFFFFFFFFFFFFFFFFFFFFFFFFFFFFFFFFFFFFFFFED

S1233000FFFFFFFFFFFFFFFFFFFFFFFFFFFFFFFFFFFFFFFFFFFFFFFFFFFFFFFFFFFFFFFFCC

S1233020FFFFFFFFFFFFFFFFFFFFFFFFFFFFFFFFFFFFFFFFFFFFFFFFFFFFFFFFFFFFFFFFAC

S1233040FFFFFFFFFFFFFFFFFFFFFFFFFFFFFFFFFFFFFFFFFFFFFFFFFFFFFFFFFFFFFFFF8C

S1233060FFFFFFFFFFFFFFFFFFFFFFFFFFFFFFFFFFFFFFFFFFFFFFFFFFFFFFFFFFFFFFFF6C
S1233080FFFFFFFFFFFFFFFFFFFFFFFFFFFFFFFFFFFFFFFFFFFFFFFFFFFFFFFFFFFFFFFF4C
S12330A0FFFFFFFFFFFFFFFFFFFFFFFFFFFFFFFFFFFFFFFFFFFFFFFFFFFFFFFFFFFFFFFF2C
S12330C0FFFFFFFFFFFFFFFFFFFFFFFFFFFFFFFFFFFFFFFFFFFFFFFFFFFFFFFFFFFFFFFF0C
S12330E0FFFFFFFFFFFFFFFFFFFFFFFFFFFFFFFFFFFFFFFFFFFFFFFFFFFFFFFFFFFFFFFFEC
S1233100FFFFFFFFFFFFFFFFFFFFFFFFFFFFFFFFFFFFFFFFFFFFFFFFFFFFFFFFFFFFFFFFCB
S1233120FFFFFFFFFFFFFFFFFFFFFFFFFFFFFFFFFFFFFFFFFFFFFFFFFFFFFFFFFFFFFFFFAB
S1233140FFFFFFFFFFFFFFFFFFFFFFFFFFFFFFFFFFFFFFFFFFFFFFFFFFFFFFFFFFFFFFFF8B
S1233160FFFFFFFFFFFFFFFFFFFFFFFFFFFFFFFFFFFFFFFFFFFFFFFFFFFFFFFFFFFFFFFF6B
S1233180FFFFFFFFFFFFFFFFFFFFFFFFFFFFFFFFFFFFFFFFFFFFFFFFFFFFFFFFFFFFFFFF4B
S12331A0FFFFFFFFFFFFFFFFFFFFFFFFFFFFFFFFFFFFFFFFFFFFFFFFFFFFFFFFFFFFFFFF2B
S12331C0FFFFFFFFFFFFFFFFFFFFFFFFFFFFFFFFFFFFFFFFFFFFFFFFFFFFFFFFFFFFFFFF0B
S12331E0FFFFFFFFFFFFFFFFFFFFFFFFFFFFFFFFFFFFFFFFFFFFFFFFFFFFFFFFFFFFFFFFEB
S1233200FFFFFFFFFFFFFFFFFFFFFFFFFFFFFFFFFFFFFFFFFFFFFFFFFFFFFFFFFFFFFFFFCA
S1233220FFFFFFFFFFFFFFFFFFFFFFFFFFFFFFFFFFFFFFFFFFFFFFFFFFFFFFFFFFFFFFFFAA
S1233240FFFFFFFFFFFFFFFFFFFFFFFFFFFFFFFFFFFFFFFFFFFFFFFFFFFFFFFFFFFFFFFF8A
S1233260FFFFFFFFFFFFFFFFFFFFFFFFFFFFFFFFFFFFFFFFFFFFFFFFFFFFFFFFFFFFFFFF6A
S1233280FFFFFFFFFFFFFFFFFFFFFFFFFFFFFFFFFFFFFFFFFFFFFFFFFFFFFFFFFFFFFFFF4A
S12332A0FFFFFFFFFFFFFFFFFFFFFFFFFFFFFFFFFFFFFFFFFFFFFFFFFFFFFFFFFFFFFFFF2A
S12332C0FFFFFFFFFFFFFFFFFFFFFFFFFFFFFFFFFFFFFFFFFFFFFFFFFFFFFFFFFFFFFFFF0A
S12332E0FFFFFFFFFFFFFFFFFFFFFFFFFFFFFFFFFFFFFFFFFFFFFFFFFFFFFFFFFFFFFFFFEA
S1233300FFFFFFFFFFFFFFFFFFFFFFFFFFFFFFFFFFFFFFFFFFFFFFFFFFFFFFFFFFFFFFFFC9
S1233320FFFFFFFFFFFFFFFFFFFFFFFFFFFFFFFFFFFFFFFFFFFFFFFFFFFFFFFFFFFFFFFFA9
S1233340FFFFFFFFFFFFFFFFFFFFFFFFFFFFFFFFFFFFFFFFFFFFFFFFFFFFFFFFFFFFFFFF89
S1233360FFFFFFFFFFFFFFFFFFFFFFFFFFFFFFFFFFFFFFFFFFFFFFFFFFFFFFFFFFFFFFFF69
S1233380FFFFFFFFFFFFFFFFFFFFFFFFFFFFFFFFFFFFFFFFFFFFFFFFFFFFFFFFFFFFFFFF49
S12333A0FFFFFFFFFFFFFFFFFFFFFFFFFFFFFFFFFFFFFFFFFFFFFFFFFFFFFFFFFFFFFFFF29
S12333C0FFFFFFFFFFFFFFFFFFFFFFFFFFFFFFFFFFFFFFFFFFFFFFFFFFFFFFFFFFFFFFFF09
S12333E0FFFFFFFFFFFFFFFFFFFFFFFFFFFFFFFFFFFFFFFFFFFFFFFFFFFFFFFFFFFFFFFFE9
S1233400FFFFFFFFFFFFFFFFFFFFFFFFFFFFFFFFFFFFFFFFFFFFFFFFFFFFFFFFFFFFFFFFC8
S1233420FFFFFFFFFFFFFFFFFFFFFFFFFFFFFFFFFFFFFFFFFFFFFFFFFFFFFFFFFFFFFFFFA8
S1233440FFFFFFFFFFFFFFFFFFFFFFFFFFFFFFFFFFFFFFFFFFFFFFFFFFFFFFFFFFFFFFFF88

```
S1233460FFFFFFFFFFFFFFFFFFFFFFFFFFFFFFFFFFFFFFFFFFFFFFFFFFFFFFFFFFFFFFFF68
S1233480FFFFFFFFFFFFFFFFFFFFFFFFFFFFFFFFFFFFFFFFFFFFFFFFFFFFFFFFFFFFFFFF48
S12334A0FFFFFFFFFFFFFFFFFFFFFFFFFFFFFFFFFFFFFFFFFFFFFFFFFFFFFFFFFFFFFFFF28
S12334C0FFFFFFFFFFFFFFFFFFFFFFFFFFFFFFFFFFFFFFFFFFFFFFFFFFFFFFFFFFFFFFFF08
S12334E0FFFFFFFFFFFFFFFFFFFFFFFFFFFFFFFFFFFFFFFFFFFFFFFFFFFFFFFFFFFFFFFFE8
S1233500FFFFFFFFFFFFFFFFFFFFFFFFFFFFFFFFFFFFFFFFFFFFFFFFFFFFFFFFFFFFFFFFC7
S1233520FFFFFFFFFFFFFFFFFFFFFFFFFFFFFFFFFFFFFFFFFFFFFFFFFFFFFFFFFFFFFFFFA7
S1233540FFFFFFFFFFFFFFFFFFFFFFFFFFFFFFFFFFFFFFFFFFFFFFFFFFFFFFFFFFFFFFFF87
S1233560FFFFFFFFFFFFFFFFFFFFFFFFFFFFFFFFFFFFFFFFFFFFFFFFFFFFFFFFFFFFFFFF67
S1233580FFFFFFFFFFFFFFFFFFFFFFFFFFFFFFFFFFFFFFFFFFFFFFFFFFFFFFFFFFFFFFFF47
S12335A0FFFFFFFFFFFFFFFFFFFFFFFFFFFFFFFFFFFFFFFFFFFFFFFFFFFFFFFFFFFFFFFF27
S12335C0FFFFFFFFFFFFFFFFFFFFFFFFFFFFFFFFFFFFFFFFFFFFFFFFFFFFFFFFFFFFFFFF07
S12335E0FFFFFFFFFFFFFFFFFFFFFFFFFFFFFFFFFFFFFFFFFFFFFFFFFFFFFFFFFFFFFFFFE7
S1233600FFFFFFFFFFFFFFFFFFFFFFFFFFFFFFFFFFFFFFFFFFFFFFFFFFFFFFFFFFFFFFFFC6
S1233620FFFFFFFFFFFFFFFFFFFFFFFFFFFFFFFFFFFFFFFFFFFFFFFFFFFFFFFFFFFFFFFFA6
S1233640FFFFFFFFFFFFFFFFFFFFFFFFFFFFFFFFFFFFFFFFFFFFFFFFFFFFFFFFFFFFFFFF86
S1233660FFFFFFFFFFFFFFFFFFFFFFFFFFFFFFFFFFFFFFFFFFFFFFFFFFFFFFFFFFFFFFFF66
S1233680FFFFFFFFFFFFFFFFFFFFFFFFFFFFFFFFFFFFFFFFFFFFFFFFFFFFFFFFFFFFFFFF46
S12336A0FFFFFFFFFFFFFFFFFFFFFFFFFFFFFFFFFFFFFFFFFFFFFFFFFFFFFFFFFFFFFFFF26
S12336C0FFFFFFFFFFFFFFFFFFFFFFFFFFFFFFFFFFFFFFFFFFFFFFFFFFFFFFFFFFFFFFFF06
S12336E0FFFFFFFFFFFFFFFFFFFFFFFFFFFFFFFFFFFFFFFFFFFFFFFFFFFFFFFFFFFFFFFFE6
S1233700FFFFFFFFFFFFFFFFFFFFFFFFFFFFFFFFFFFFFFFFFFFFFFFFFFFFFFFFFFFFFFFFC5
S1233720FFFFFFFFFFFFFFFFFFFFFFFFFFFFFFFFFFFFFFFFFFFFFFFFFFFFFFFFFFFFFFFFA5
S1233740FFFFFFFFFFFFFFFFFFFFFFFFFFFFFFFFFFFFFFFFFFFFFFFFFFFFFFFFFFFFFFFF85
S1233760FFFFFFFFFFFFFFFFFFFFFFFFFFFFFFFFFFFFFFFFFFFFFFFFFFFFFFFFFFFFFFFF65
S1233780FFFFFFFFFFFFFFFFFFFFFFFFFFFFFFFFFFFFFFFFFFFFFFFFFFFFFFFFFFFFFFFF45
S12337A0FFFFFFFFFFFFFFFFFFFFFFFFFFFFFFFFFFFFFFFFFFFFFFFFFFFFFFFFFFFFFFFF25
S12337C0FFFFFFFFFFFFFFFFFFFFFFFFFFFFFFFFFFFFFFFFFFFFFFFFFFFFFFFFFFFFFFFF05
S12337E0FFFFFFFFFFFFFFFFFFFFFFFFFFFFFFFFFFFFFFFFFFFFFFFFFFFFFFFFFFFFFFFFE5
S1233800FFFFFFFFFFFFFFFFFFFFFFFFFFFFFFFFFFFFFFFFFFFFFFFFFFFFFFFFFFFFFFFFC4
S1233820FFFFFFFFFFFFFFFFFFFFFFFFFFFFFFFFFFFFFFFFFFFFFFFFFFFFFFFFFFFFFFFFA4
S1233840FFFFFFFFFFFFFFFFFFFFFFFFFFFFFFFFFFFFFFFFFFFFFFFFFFFFFFFFFFFFFFFF84
```

```
S1233860FFFFFFFFFFFFFFFFFFFFFFFFFFFFFFFFFFFFFFFFFFFFFFFFFFFFFFFFFFFFFFFF64
S1233880FFFFFFFFFFFFFFFFFFFFFFFFFFFFFFFFFFFFFFFFFFFFFFFFFFFFFFFFFFFFFFFF44
S12338A0FFFFFFFFFFFFFFFFFFFFFFFFFFFFFFFFFFFFFFFFFFFFFFFFFFFFFFFFFFFFFFFF24
S12338C0FFFFFFFFFFFFFFFFFFFFFFFFFFFFFFFFFFFFFFFFFFFFFFFFFFFFFFFFFFFFFFFF04
S12338E0FFFFFFFFFFFFFFFFFFFFFFFFFFFFFFFFFFFFFFFFFFFFFFFFFFFFFFFFFFFFFFFFE4
S1233900FFFFFFFFFFFFFFFFFFFFFFFFFFFFFFFFFFFFFFFFFFFFFFFFFFFFFFFFFFFFFFFFC3
S1233920FFFFFFFFFFFFFFFFFFFFFFFFFFFFFFFFFFFFFFFFFFFFFFFFFFFFFFFFFFFFFFFFA3
S1233940FFFFFFFFFFFFFFFFFFFFFFFFFFFFFFFFFFFFFFFFFFFFFFFFFFFFFFFFFFFFFFFF83
S1233960FFFFFFFFFFFFFFFFFFFFFFFFFFFFFFFFFFFFFFFFFFFFFFFFFFFFFFFFFFFFFFFF63
S1233980FFFFFFFFFFFFFFFFFFFFFFFFFFFFFFFFFFFFFFFFFFFFFFFFFFFFFFFFFFFFFFFF43
S12339A0FFFFFFFFFFFFFFFFFFFFFFFFFFFFFFFFFFFFFFFFFFFFFFFFFFFFFFFFFFFFFFFF23
S12339C0FFFFFFFFFFFFFFFFFFFFFFFFFFFFFFFFFFFFFFFFFFFFFFFFFFFFFFFFFFFFFFFF03
S12339E0FFFFFFFFFFFFFFFFFFFFFFFFFFFFFFFFFFFFFFFFFFFFFFFFFFFFFFFFFFFFFFFFE3
S1233A00FFFFFFFFFFFFFFFFFFFFFFFFFFFFFFFFFFFFFFFFFFFFFFFFFFFFFFFFFFFFFFFFC2
S1233A20FFFFFFFFFFFFFFFFFFFFFFFFFFFFFFFFFFFFFFFFFFFFFFFFFFFFFFFFFFFFFFFFA2
S1233A40FFFFFFFFFFFFFFFFFFFFFFFFFFFFFFFFFFFFFFFFFFFFFFFFFFFFFFFFFFFFFFFF82
S1233A60FFFFFFFFFFFFFFFFFFFFFFFFFFFFFFFFFFFFFFFFFFFFFFFFFFFFFFFFFFFFFFFF62
S1233A80FFFFFFFFFFFFFFFFFFFFFFFFFFFFFFFFFFFFFFFFFFFFFFFFFFFFFFFFFFFFFFFF42
S1233AA0FFFFFFFFFFFFFFFFFFFFFFFFFFFFFFFFFFFFFFFFFFFFFFFFFFFFFFFFFFFFFFFF22
S1233AC0FFFFFFFFFFFFFFFFFFFFFFFFFFFFFFFFFFFFFFFFFFFFFFFFFFFFFFFFFFFFFFFF02
S1233AE0FFFFFFFFFFFFFFFFFFFFFFFFFFFFFFFFFFFFFFFFFFFFFFFFFFFFFFFFFFFFFFFFE2
S1233B00FFFFFFFFFFFFFFFFFFFFFFFFFFFFFFFFFFFFFFFFFFFFFFFFFFFFFFFFFFFFFFFFC1
S1233B20FFFFFFFFFFFFFFFFFFFFFFFFFFFFFFFFFFFFFFFFFFFFFFFFFFFFFFFFFFFFFFFFA1
S1233B40FFFFFFFFFFFFFFFFFFFFFFFFFFFFFFFFFFFFFFFFFFFFFFFFFFFFFFFFFFFFFFFF81
S1233B60FFFFFFFFFFFFFFFFFFFFFFFFFFFFFFFFFFFFFFFFFFFFFFFFFFFFFFFFFFFFFFFF61
S1233B80FFFFFFFFFFFFFFFFFFFFFFFFFFFFFFFFFFFFFFFFFFFFFFFFFFFFFFFFFFFFFFFF41
S1233BA0FFFFFFFFFFFFFFFFFFFFFFFFFFFFFFFFFFFFFFFFFFFFFFFFFFFFFFFFFFFFFFFF21
S1233BC0FFFFFFFFFFFFFFFFFFFFFFFFFFFFFFFFFFFFFFFFFFFFFFFFFFFFFFFFFFFFFFFF01
S1233BE0FFFFFFFFFFFFFFFFFFFFFFFFFFFFFFFFFFFFFFFFFFFFFFFFFFFFFFFFFFFFFFFFE1
S1233C00FFFFFFFFFFFFFFFFFFFFFFFFFFFFFFFFFFFFFFFFFFFFFFFFFFFFFFFFFFFFFFFFC0
S1233C20FFFFFFFFFFFFFFFFFFFFFFFFFFFFFFFFFFFFFFFFFFFFFFFFFFFFFFFFFFFFFFFFA0
S1233C40FFFFFFFFFFFFFFFFFFFFFFFFFFFFFFFFFFFFFFFFFFFFFFFFFFFFFFFFFFFFFFFF80
```

```
S1233C60FFFFFFFFFFFFFFFFFFFFFFFFFFFFFFFFFFFFFFFFFFFFFFFFFFFFFFFFFFFFFFFF60
S1233C80FFFFFFFFFFFFFFFFFFFFFFFFFFFFFFFFFFFFFFFFFFFFFFFFFFFFFFFFFFFFFFFF40
S1233CA0FFFFFFFFFFFFFFFFFFFFFFFFFFFFFFFFFFFFFFFFFFFFFFFFFFFFFFFFFFFFFFFF20
S1233CC0FFFFFFFFFFFFFFFFFFFFFFFFFFFFFFFFFFFFFFFFFFFFFFFFFFFFFFFFFFFFFFFF00
S1233CE0FFFFFFFFFFFFFFFFFFFFFFFFFFFFFFFFFFFFFFFFFFFFFFFFFFFFFFFFFFFFFFFFE0
S1233D00FFFFFFFFFFFFFFFFFFFFFFFFFFFFFFFFFFFFFFFFFFFFFFFFFFFFFFFFFFFFFFFFBF
S1233D20FFFFFFFFFFFFFFFFFFFFFFFFFFFFFFFFFFFFFFFFFFFFFFFFFFFFFFFFFFFFFFFF9F
S1233D40FFFFFFFFFFFFFFFFFFFFFFFFFFFFFFFFFFFFFFFFFFFFFFFFFFFFFFFFFFFFFFFF7F
S1233D60FFFFFFFFFFFFFFFFFFFFFFFFFFFFFFFFFFFFFFFFFFFFFFFFFFFFFFFFFFFFFFFF5F
S1233D80FFFFFFFFFFFFFFFFFFFFFFFFFFFFFFFFFFFFFFFFFFFFFFFFFFFFFFFFFFFFFFFF3F
S1233DA0FFFFFFFFFFFFFFFFFFFFFFFFFFFFFFFFFFFFFFFFFFFFFFFFFFFFFFFFFFFFFFFF1F
S1233DC0FFFFFFFFFFFFFFFFFFFFFFFFFFFFFFFFFFFFFFFFFFFFFFFFFFFFFFFFFFFFFFFFFF
S1233DE0FFFFFFFFFFFFFFFFFFFFFFFFFFFFFFFFFFFFFFFFFFFFFFFFFFFFFFFFFFFFFFFFDF
S1233E00FFFFFFFFFFFFFFFFFFFFFFFFFFFFFFFFFFFFFFFFFFFFFFFFFFFFFFFFFFFFFFFFBE
S1233E20FFFFFFFFFFFFFFFFFFFFFFFFFFFFFFFFFFFFFFFFFFFFFFFFFFFFFFFFFFFFFFFF9E
S1233E40FFFFFFFFFFFFFFFFFFFFFFFFFFFFFFFFFFFFFFFFFFFFFFFFFFFFFFFFFFFFFFFF7E
S1233E60FFFFFFFFFFFFFFFFFFFFFFFFFFFFFFFFFFFFFFFFFFFFFFFFFFFFFFFFFFFFFFFF5E
S1233E80FFFFFFFFFFFFFFFFFFFFFFFFFFFFFFFFFFFFFFFFFFFFFFFFFFFFFFFFFFFFFFFF3E
S1233EA0FFFFFFFFFFFFFFFFFFFFFFFFFFFFFFFFFFFFFFFFFFFFFFFFFFFFFFFFFFFFFFFF1E
S1233EC0FFFFFFFFFFFFFFFFFFFFFFFFFFFFFFFFFFFFFFFFFFFFFFFFFFFFFFFFFFFFFFFFFE
S1233EE0FFFFFFFFFFFFFFFFFFFFFFFFFFFFFFFFFFFFFFFFFFFFFFFFFFFFFFFFFFFFFFFFDE
S1233F00FFFFFFFFFFFFFFFFFFFFFFFFFFFFFFFFFFFFFFFFFFFFFFFFFFFFFFFFFFFFFFFFBD
S1233F20FFFFFFFFFFFFFFFFFFFFFFFFFFFFFFFFFFFFFFFFFFFFFFFFFFFFFFFFFFFFFFFF9D
S1233F40FFFFFFFFFFFFFFFFFFFFFFFFFFFFFFFFFFFFFFFFFFFFFFFFFFFFFFFFFFFFFFFF7D
S1233F60FFFFFFFFFFFFFFFFFFFFFFFFFFFFFFFFFFFFFFFFFFFFFFFFFFFFFFFFFFFFFFFF5D
S1233F80FFFFFFFFFFFFFFFFFFFFFFFFFFFFFFFFFFFFFFFFFFFFFFFFFFFFFFFFFFFFFFFF3D
S1233FA0FFFFFFFFFFFFFFFFFFFFFFFFFFFFFFFFFFFFFFFFFFFFFFFFFFFFFFFFFFFFFFFF1D
S1233FC0FFFFFFFFFFFFFFFFFFFFFFFFFFFFFFFFFFFFFFFFFFFFFFFFFFFFFFFFFFFFFFFFFD
S1233FE0FFFFFFFFFFFFFFFFFFFFFFFFFFFFFFFFFFFFFFFFFFFFFFFFFFFFFFFFFFFFFFFFDD
S12340000003FE0000000000C583C300C583D500C583E100C583E200300ABD00F5800400B0
S123402031800100900ABD00300ABC00E5800C0019800100900ABC0049080000F9800D0045
S12340403004FC0021002000E580120031200000900A88003004FC0021004000E5801700F4
```

S12340603120000090OA82003004FC0021800400E5801C003120000090OAB200300AB200F0
S12340804C800E002C0AD800900A9B00AC0AD8003004FC0021800800E580260031200000BC
S12340A0900A96003004FC0021000800E5802B003120000090OA8C003004FC00210010000B
S12340C0E58030003120000090OA8300300A8C00280A8800900A84004D200000300ADA00BA
S12340E011800100900ADA00ED803B00700AD900E9803F00300A8300F5803F004D800000D5
S1234100AC0ADA00AC0A8B004D200000300ADC0011800100900ADC00ED804700700ADB0036
S1234120E9804B00300A8200F5804B004D800000AC0ADC00AC0A8900300AE100E5805500D8
S1234140300AE20071800100E9805C0019800100900AE200300ADF00C5806700300AE20091
S123416071800100E98062001980010090OAE200300AE000C58067003180000090OAE10076
S1234180300ADE00900AE200300AE000C5806700318001009OOAE100300ADD00900AE20001
S12341A0300ADF00900A95004D810000300A950071100000F1806D004D000800AC04FE00B4
S12341C0300B2500F1807100318000004C800E005C0AE400300AE30074000000188004OO97
S12341E04C800E005C0AE500300AE30074000000108001009OOAE300900AA900300B330046
S1234200F1808000318000004C800E005C0AE700300AE600740000001880040O4C800E00C7
S12342205C0AE800300AE60074000000108001009OOAE600900AA800300AE900900AEF0099
S12342403180000090OAF000440AEB003D800100300AF000280AEF004C800E005C0AA800F5
S1234260300AEF000400000090OAEF0030800100180AA900F1809D00AC0AF000FD80920045
S12342804C0AF0005D820000740000007400000A40B35004D800000300AF500700AF100C2
S12342A0F180A8004D200000AC0AB800300AF200900A9300300AF300900A9200300AC30057
S12342C0200AB000200AB200200AC900200ABF00200AC000900AAD004D800000300AF5001B
S12342E0700AF400F180BB0011800100900AF500C580BF00300AAD00E580BF00AC0AF50045
S12343004D200000AC0AB400300AB200200AC900200AB000200AC700200AC500900AB700D8
S1234320300AB800200AB700900AB9004D820000300AB90071100000F180CE004D00100074
S1234340AC04FE00300AC400200AB400900AB600300AC4002D200000200AB400900AB30009
S1234360300AC200700A9300E980DB00300AF600C580DC00300AF700900AAB00300A920059
S1234380700AC100E980E200300AF800C580E300300AF900900AAA00313FFF0035800900095
S12343A092881800928A6C00300AA30071100000F180F000300AA20071100000ED810B00AA
S12343C0340AFC00C580F100340AFA0045800900 3D8001004E000000AC0AA600AC0ABA008B
S12343E0FD80F7003200000070OAA600F58100008C0AA700300AA600900ABA0032000000DA
S1234400900AA600C5810300700ABA00F5810300900ABA00FD80F700300AA700900AA4007B
S1234420100AFB00900AA50034800E0032800000900AA7004C0ABA005C0AFD0074000000 88
S1234440740000 00A40ABB00300ABA00180AA600900A9400300A9400700ABB00E98118000C

```
S1234460300AFE00C5811900300AFF00900AAC00300AB600E5811F00300AA700900B000031
S1234480C5812000300B0000900A8600300AA400700ACD00F5812600300B0100C5812700ED
S12344A0300B0200900AB500300A8600180AC600900A9700300A9700F1812E0024000000FE
S12344C0900A9C00300AC900F5813300300B0400C5813400300B03004D800000700A9C001C
S12344E0ED8138004D200000AC0AAE00300AAE00180B0500900A9D00300AAE00900B050072
S12345004D200000300AB600E5814B00300B0A00900B0B00300B0900900B0A00300B080072
S1234520900B0900300B0700900B0800300AA500900B0700300A9D0071600000D181500023
S1234540900B0800C5815B00300B0700700B0800D1815B00700B0900D1815B00700B0A00EB
S1234560D1815B00700B0B00D1815B00900B0600C5815C004D800000300B060034800E0044
S123458032800000900A8500AC0AAF00300AAF00D1816500300AB600D1816C00300B0F0049
S12345A019800100E9817100900B0F0031200000900A9000C5817300300B0E00900B0F00B1
S12345C031200000900A9000C58173003180000900A9000300AB700E5817800300A85003A
S12345E0900B1000C5817900300B1000900ADD00300ADD00180B1100900AA000300ADD00EF
S1234600900B1100300AA000F1818200240000000900A9800300A9800700B1300F5818D0063
S1234620300B140019800100E9819200900B140031200000900A9E00C5819400300B120032
S1234640900B140031200000900A9E00C58194003180000900A9E00300A9E00180B15004B
S1234660900A9F00300A9E00900B1500300A9E00280A9000900A8700300A9B00280ACA00E9
S1234680900A9100300A9100D181A800300B170019800100E981AD00900B170031800000C0
S12346A0900AB100C581AF00300B1600900B170031800000900AB100C581AF0031200000071
S12346C0900AB100300A8400200A99002D200000200ACE002D200000900A9900300A990072
S12346E04C800E002C0B1800900A9A00AC0B1800300A9900D181BE00300A8C00C581BF00DC
S1234700300A8800900A8A00340B2B004D805A00AE80000031847400700B2200F181C800F0
S123472031800100900B220031801400700085A00F181CD0031800000900085A0031801400C8
S123474070085B00F181D20031800000900085B0031200000900A8E00300A8C00718000006A
S1234760E581F800C58212003008 5A00E5827200300A8A0071800000E5825D00300A8900D7
S123478071800000D181E20031800000900B200031800900700B2000E981F400340B290069
S12347A0468000003180010 0100B2000900B20003004FD002180FF0019801E004C800E0025
S12347C05C0B3500900B330074000000B00A55003180000900A8E0031800100100B210021
S12347E0900B2100C5827200300B3100900B300031800000900B3100340B29009280000012
S12348007400000074000000318012007008 5B00E98207003180010010085A0090085A008E
S1234820C5821200300B1E00900B1F0031800000900B210031800000900B1E0031800 1007F
S1234840900B220031800000900085A00C5820300300A8B0071800000D182170031800000D9
```

S1234860900B24003180090070OB2400E981D800340B2A00468000003180010010OB2400BA
S1234880900B24003004FD002180FF004C800E00900B26005C0B1D0019801E00900B2500EE
S12348A030800100100B1E00900B1E0030085A0071800600F5823900300B2200ED825900F3
S12348C071818F00F5825900340B220032885C002180FF00900B270032885C00180B27004A
S12348E0280B260092885C00C58259007180OC00F5824A005D810000300B2200180B3700F2
S1234900ED82590071818F00F582590034800E0032885C00200B2E00900B270032885C0071
S1234920180B27002880040092885C00C58259005C0B3400300B2200180B3700180B3700BB
S1234940ED82590071818F00F582590034800E0032885C00200B2D00900B27003080040094
S12349600800000280B270092885C0031800100100B2200900B2200C581D800340B2A0028
S1234980928000030085B0071801400F1826500300B210034085B0092884400318001008E
S12349A070085A00D1826E0070085B00E5826E0090085B00300B210090084400C581DD006A
S12349C031800100100085B0090085B00C581DD00340B2F0046800000300AB300E582780098
S12349E0300B1A00900B36003004FD0021800F00900A8F00300A9600D1828F00300ADD00BA
S1234A002187FF00280B36004C800E00300A9E00E58286003080030028OB1B004C800E0008
S1234A20300A8700E5828B003080030028OB1C004C800E0031800000900B36003080030OAE
S1234A40928000004D200000300A880071800000D182A200340B2A0092800000300B310044
S1234A60900B3200458000008C0B3100718002 00ED82A200300B30007180020OED82A20065
S1234A80100B320071812C00F582A2004D800000340B2C003180A5009280000OAC0A8D00AB
S1234AA031800100100B3100900B3100300ABE00F582A900318001009000ABE00300AAB0021
S1234AC0900ABF00300AAA00900AC000300AA600900AC100300A9400900AC200300AAC00F0
S1234AE0900AC300300AB500900AC400300AAE00900AC500300A8500900AC600300AAF00B9
S1234B00900AC700300A9F00900AC800300AB100900AC900300A9A00900ACA00300A8A00AB
S1234B20900ACB00300A8E00900ACC00300A8F00900ACD00300A8D00900ACE00300ABD0088
S1234B40E582D10019800100900ABD0031800000900B3A0031800100900B3900300ACB0017
S1234B60718000000E5830D00300ACC0071800000D1832200300B3B00900B3800300B3900A1
S1234B8071800B00F1831F00318001001008 5B00180B3900E9831F0071800A00F183060001
S1234BA0300B3900718006 00F582F000340B380032885C002180FF004C800E005C0B3F0072
S1234BC0300B4200C582F900300B3800180B3E0034800E0032885C00200B40004C800E0023
S1234BE05C0B4100740000000300B420018800400100A55004C800E005C800E0030085B00B6
S1234C00180B3900ED83060071800E00F183060034800E0030800100128 82E0092882E00C2
S1234C2031800100100B3900900B390031803F00100B3800900B3800C582DD0031800100AA
S1234C40900B3B0030085B0071800100E5831300C582D800312000 00900B3A00340B3C00BA

S1234C60600B3D003D800100458008004D80000032000000093000000AE000000FD831A0023

S1234C80C583220031800100100B3B00900B3B00300B3A00900AA300300ACF00F583240071

S1234CA031800100900ACF00300AC800900AD000300ACB00900AD100300ACC00900AD20087

S1234CC0300AA300900AD300300ABE00E583340019800100900ABE003180000900B46006E

S1234CE031800A00900B4500300AD1007180000E5839A00300AD2007180000D183AF0017

S1234D0031823700100B4700900B440030085B0071800A00ED834600900B4300C5834800B2

S1234D2011801200900B4300300B450071800200E583AC0031800100100B4300180B4500EF

S1234D40E983AC0019800100718012 00ED83540030085B00900B4300300B4300180B45007F

S1234D6071800900F1838900300B450071800600F5836400340B440032885C002180FF00AC

S1234D804C800E005C0B4C00300B4F0074000000018800400C5837D0071800C00F58371003D

S1234DA0300B4400180B4A0034800E0032885C00200B4B004C800E005C0B4D00300B4F009D

S1234DC07400000018800400C5837D00300B4400180B4A00180B4A0034800E0032885C00C9

S1234DE00C000000213FC0004C800E005C0B4E00300B4F007400000018800100100A5500EE

S1234E004C800E005C800E00300B4300180B4500ED83890071800E00F183890034800E002D

S1234E2030800100128A5600928A5600300B450071801200E5839000318001001 00B4500CC

S1234E40900B4500C58392003180010090 0B4500198001004D803F005C800E0074000000FE

S1234E60300B47001080040090 0B4400C583480031800100900B470030085B0071800A0087

S1234E80E583A000C5833B0031200000900B4600340B4800600B49003D800100458008008B

S1234EA04D80000032000000093000000AE000000FD83A700C583AF0031800100100B47007C

S1234EC0900B4700300B4600900AA200300AA2002C0AD300900AA100300B5100900AB00039

S1234EE0300B5000900B5100300AA100900B5000300ABC00F583BA0031800100900ABC0041

S1234F00300ACF00E583C20019800100900ACF00C58004003180020090 0ABC003180000054

S1234F20900ABD003180000900ABE003180000900ACF00319209009004FF00300B0D004C

S1234F40900B0600900B0700900B0800900B0900900B0A00900B0B00C5800400318002007C

S1234F60900ABC003180000900ABD003180000900ABE003180000900ACF00300ABC00B6

S1234F8071800100F583DD00C5800400C583E100C583E200440BFF00D583E300440BCA0088

S1234FA074000000740000007400000 0C583E300440BFF00D583EA00440BD80074000003B

S1234FC07400000074000000C583EA00440BFF00D583F100440BE600740000007400000 0FF

S1234FE0740000000C583F100440BFF00D583F800440BF4007400000074000000C583F800F7

S1235000000000400000410000000FF000000FF000000FF000000FF000000E4000004190077

S123502000000000000000000000000000000000000000000000000000000000000000006C

S123504000000000000000000000000000000000000000000000000000000000000000004C

S12350600000000000000000000000000000000000000000000000000000000000000002C

S12350800000000000000000000000000000000000000000000000000000000000000000C

S12350A0000000000000000000000000000000000000000000000000000000000000000EC

S12350C0000000000000000000000000000000000000000000000000000000000000000CC

S12350E0000000000000000000000000000000000000000000000000000000000000000AC

S12351000000000000000000000000000000000000000000000000000000000000000008B

S12351200000000000000000000000000000000000000000000000000000000000000006B

S12351400000000000000000000000000000000000000000000000000000000000000004B

S12351600000000000000000000000000000000000000000000000000000000000000002B

S12351800000000000000000000000000000000000000000000000000000000000000000B

S12351A0000000000000000000000000000000000000000000000000000000000000000EB

S12351C0000000000000000000000000000000000000000000000000000000000000000CB

S12351E0000000000000000000000000000000000000000000000000000000000000000AB

S12352000000000000000000000000000000000000000000000000000000000000000008A

S12352200000000000000000000000000000000000000000000000000000000000000006A

S12352400000000000000000000000000000000000000000000000000000000000000004A

S12352600000000000000000000000000000000000000000000000000000000000000002A

S12352800000000000000000000000000000000000000000000000000000000000000000A

S12352A0000000000000000000000000000000000000000000000000000000000000000EA

S12352C0000000000000000000000000000000000000000000000000000000000000000CA

S12352E0000000000000000000000000000000000000000000000000000000000000000AA

S123530000000000000000000000000000000000000000000000000000000000000000089

S123532000000000000000000000000000000000000000000000000000000000000000069

S123534000000000000000000000000000000000000000000000000000000000000000049

S123536000000000000000000000000000000000000000000000000000000000000000029

S123538000000000000000000000000000000000000000000000000000000000000000009

S12353A00000000000000000000000000000000001000004FE0003000000000000033F00A1

S12353C0000814000000000000000000000000000000000000000000000000000000000AD

S12353E0000000000000000000000000000000000000000000000000000000000000000A9

S123540000000000000000000000000000000000000000000000000000000000000000088

S123542000000000000000000000000000000000000000000000000000000000000000068

S123544000000000000000000000000000000000000000000000000000000000000000048

S12354600000000000000000000000000000000000000000000000000000000000000000028

S12354800000000000000000000000000000000000000000000000000000000000000000008

S12354A00000000000000000000000000000000000000000000000000000000000000000E8

S12354C00000000000000000000000000000000000000000000000000000000000000000C8

S12354E00000000000000000000000000000000000000000000000000000000000000000A8

S12355000000000000000000000000000000000000000000000000000000000000000000087

S12355200000000000000000000000000000000000000000000000000000000000000000067

S12355400000000000000000000000000000000000000000000000000000000000000000047

S12355600000000000000000000000000000000000000000000000000000000000000000027

S12355800000000000000000000000000000000000000000000000000000000000000000007

S12355A00000000000000000000000000000000000000000000000000000000000000000E7

S12355C00000000000000000000000000000000000000000000000000000000000000000C7

S12355E00000000000000000000000000000000000000000000000000000000000000000A7

S12356000000000000000000000000000000000000000000000000000000000000000000086

S12356200000000000000000000000000000000000000000000000000000000000000000066

S12356400000000000000000000000000000000000000000000000000000000000000000046

S12356600000000000000000000000000000000000000000000000000000000000000000026

S12356800000000000000000000000000000000000000000000000000000000000000000006

S12356A00000000000000000000000000000000000000000000000000000000000000000E6

S12356C00000000000000000000000000000000000000000000000000000000000000000C6

S12356E00000000000000000000000000000000000000000000000000000000000000000A6

S12357000000000000000000000000000000000000000000000000000000000000000000085

S12357200000000000000000000000000000000000000000000000000000000000000000065

S12357400000000000000000000000000000000000000000000000000000000000000000045

S12357600000000000000000000000000000000000000000000000000000000000000000025

S12357800000000000000000000000000000000000000000000000000000000000000000005

S12357A00000000000000000000000000000000000000000000000000000000000000000E5

S12357C00000000000000000000000000000000000000000000000000000000000000000C5

S12357E00000000000000000000000000000000000000000000000000000000000000000A5

S12358000000000000000000000000000000000000000000000000000000000000000000084

S12358200000000000000000000000000000000000000000000000000000000000000000064

S12358400000000000000000000000000000000000000000000000000000000000000000044

S12358600000000000000000000000000000000000000000000000000000000000000000024
S12358800000000000000000000000000000000000000000000000000000000000000000004
S12358A00000000000000000000000000000000000000000000000000000000000000000E4
S12358C00000000000000000000000000000000000000000000000000000000000000000C4
S12358E00000000000000000000000000000000000000000000000000000000000000000A4
S1235900000000000000000000000000000000000000000000000000000000000000000083
S1235920000000000000000000000000000000000000000000000000000000000000000063
S1235940000000000000000000000000000000000000000000000000000000000000000043
S1235960000000000000000000000000000000000000000000000000000000000000000023
S1235980000000000000000000000000000000000000000000000000000000000000000003
S12359A00000000000000000000000000000000000000000000000000000000000000000E3
S12359C00000000000000000000000000000000000000000000000000000000000000000C3
S12359E00000000000000000000000000000000000000000000000000000000000000000A3
S1235A00000000000000000000000000000000000000000000000000000000000000000082
S1235A20000000000000000000000000000000000000000000000000000000000000000062
S1235A40000000000000000000000000000000000000000000000000000000000000000042
S1235A60000000000000000000000000000000000000000000000000000000000000000022
S1235A80000000000000000000000000000000000000000000000000000000000000000002
S1235AA00000000000000000000000000000000000000000000000000000000000000000E2
S1235AC00000000000000000000000000000000000000000000000000000000000000000C2
S1235AE00000000000000000000000000000000000000000000000000000000000000000A2
S1235B00000000000000000000000000000000000000000000000000000000000000000081
S1235B20000000000000000000000000000000000000000000000000000000000000000061
S1235B40000000000000000000000000000000000000000000000000000000000000000041
S1235B60000000000000000000000000000000000000000000000000000000000000000021
S1235B80000000000000000000000000000000000000000000000000000000000000000001
S1235BA00000000000000000000000000000000000000000000000000000000000000000E1
S1235BC00000000000000000000000000000000000000000000000000000000000000000C1
S1235BE00000000000000000000000000000000000000000000000000000000000000000A1
S1235C00000000000000000000000000000000000000000000000000000000000000000080
S1235C20000000000000000000000000000000000000000000000000000000000000000060
S1235C40000000000000000000000000000000000000000000000000000000000000000040

```
S1235C60000000000000000000000000000000000000000000000000000000000000000020
S1235C80000000000000000000000000000000000000000000000000000000000000000000
S1235CA00000000000000000000000000000000000000000000000000000000000000000E0
S1235CC00000000000000000000000000000000000000000000000000000000000000000C0
S1235CE00000000000000000000000000000000000000000000000000000000000000000A0
S1235D0000000000000000000000000000000000000000000000000000000000000000007F
S1235D2000000000000000000000000000000000000000000000000000000000000000005F
S1235D4000000000000000000000000000000000000000000000000000000000000000003F
S1235D6000000000000000000000000000000000000000000000000000000000000000001F
S1235D800000000000000000000000000000000000000000000000000000000000000000FF
S1235DA00000000000000000000000000000000000000000000000000000000000000000DF
S1235DC00000000000000000000000000000000000000000000000000000000000000000BF
S1235DE000000000000000000000000000000000000000000000000000000000000000009F
S1235E0000000000000000000000000000000000000000000000000000000000000000007E
S1235E2000000000000000000000000000000000000000000000000000000000000000005E
S1235E4000000000000000000000000000000000000000000000000000000000000000003E
S1235E6000000000000000000000000000000000000000000000000000000000000000001E
S1235E800000000000000000000000000000000000000000000000000000000000000000FE
S1235EA00000000000000000000000000000000000000000000000000000000000000000DE
S1235EC00000000000000000000000000000000000000000000000080000000000000000B6
S1235EE00000080000000000000000000000010000200B000000000040000000000000000000000000002A
S1235F002000000000400000FFFFC2002000000000400000FFFFC200400000007FFFFF0080
S1235F2000000900000000000000000000000000000000000000000000083100000007D00044
S1235F407F5C280000E4CB000000000040000000000000004000000000000000000818000EB
S1235F6000084400000A6C0020000000400000000000000000000000004000000000000000BB
S1235F8000004F0000000A000000000000000000000000000000000000000000000000000A4
S1235FA00000000000000000000B0C0000274B000000010000000000000000000000007272006F
S1235FC000004F0000000100000000001BD900000001000000000000000000000000100000077
S1235FE0020000000400000000051EB0000000000000000000000900000000000000000010051
S12360000000000000000900000000000000000000000000000000000000800000008001000072
S12360200010AB000011540000FFFF0000FF0000008002000000000000000000000000000000BD
S12360400000000000008000000002000000000000000000017A000000010000000100000000003D
```

S12360600000010000082E000008180000017A000002000000FF000000000200003C00000B
S123608000000100000001000000010000000000000001000000A5600000A6C0000017A00A7
S12360A000FF00000002000000000002000100000000003C000000000000000000000000009C
S12360C000000000FFFFFFFFFFFFFFFFFFFFFFFFFFFFFFFFFFFFFFFFFFFFFFFFFFFFFFFFD8
S12360E0FFFFFFFFFFFFFFFFFFFFFFFFFFFFFFFFFFFFFFFFFFFFFFFFFFFFFFFFFFFFFFFFBC
S1236100FFFFFFFFFFFFFFFFFFFFFFFFFFFFFFFFFFFFFFFFFFFFFFFFFFFFFFFFFFFFFFFF9B
S1236120FFFFFFFFFFFFFFFFFFFFFFFFFFFFFFFFFFFFFFFFFFFFFFFFFFFFFFFFFFFFFFFF7B
S1236140FFFFFFFFFFFFFFFFFFFFFFFFFFFFFFFFFFFFFFFFFFFFFFFFFFFFFFFFFFFFFFFF5B
S1236160FFFFFFFFFFFFFFFFFFFFFFFFFFFFFFFFFFFFFFFFFFFFFFFFFFFFFFFFFFFFFFFF3B
S1236180FFFFFFFFFFFFFFFFFFFFFFFFFFFFFFFFFFFFFFFFFFFFFFFFFFFFFFFFFFFFFFFF1B
S12361A0FFFFFFFFFFFFFFFFFFFFFFFFFFFFFFFFFFFFFFFFFFFFFFFFFFFFFFFFFFFFFFFFFB
S12361C0FFFFFFFFFFFFFFFFFFFFFFFFFFFFFFFFFFFFFFFFFFFFFFFFFFFFFFFFFFFFFFFFDB
S12361E0FFFFFFFFFFFFFFFFFFFFFFFFFFFFFFFFFFFFFFFFFFFFFFFFFFFFFFFFFFFFFFFFBB
S1236200FFFFFFFFFFFFFFFFFFFFFFFFFFFFFFFFFFFFFFFFFFFFFFFFFFFFFFFFFFFFFFFF9A
S1236220FFFFFFFFFFFFFFFFFFFFFFFFFFFFFFFFFFFFFFFFFFFFFFFFFFFFFFFFFFFFFFFF7A
S1236240FFFFFFFFFFFFFFFFFFFFFFFFFFFFFFFFFFFFFFFFFFFFFFFFFFFFFFFFFFFFFFFF5A
S1236260FFFFFFFFFFFFFFFFFFFFFFFFFFFFFFFFFFFFFFFFFFFFFFFFFFFFFFFFFFFFFFFF3A
S1236280FFFFFFFFFFFFFFFFFFFFFFFFFFFFFFFFFFFFFFFFFFFFFFFFFFFFFFFFFFFFFFFF1A
S12362A0FFFFFFFFFFFFFFFFFFFFFFFFFFFFFFFFFFFFFFFFFFFFFFFFFFFFFFFFFFFFFFFFFA
S12362C0FFFFFFFFFFFFFFFFFFFFFFFFFFFFFFFFFFFFFFFFFFFFFFFFFFFFFFFFFFFFFFFFDA
S12362E0FFFFFFFFFFFFFFFFFFFFFFFFFFFFFFFFFFFFFFFFFFFFFFFFFFFFFFFFFFFFFFFFBA
S1236300FFFFFFFFFFFFFFFFFFFFFFFFFFFFFFFFFFFFFFFFFFFFFFFFFFFFFFFFFFFFFFFF99
S1236320FFFFFFFFFFFFFFFFFFFFFFFFFFFFFFFFFFFFFFFFFFFFFFFFFFFFFFFFFFFFFFFF79
S1236340FFFFFFFFFFFFFFFFFFFFFFFFFFFFFFFFFFFFFFFFFFFFFFFFFFFFFFFFFFFFFFFF59
S1236360FFFFFFFFFFFFFFFFFFFFFFFFFFFFFFFFFFFFFFFFFFFFFFFFFFFFFFFFFFFFFFFF39
S1236380FFFFFFFFFFFFFFFFFFFFFFFFFFFFFFFFFFFFFFFFFFFFFFFFFFFFFFFFFFFFFFFF19
S12363A0FFFFFFFFFFFFFFFFFFFFFFFFFFFFFFFFFFFFFFFFFFFFFFFFFFFFFFFFFFFFFFFFF9
S12363C0FFFFFFFFFFFFFFFFFFFFFFFFFFFFFFFFFFFFFFFFFFFFFFFFFFFFFFFFFFFFFFFFD9
S12363E0FFFFFFFFFFFFFFFFFFFFFFFFFFFFFFFFFFFFFFFFFFFFFFFFFFFFFFFFFFFFFFFFB9
S1236400FFFFFFFFFFFFFFFFFFFFFFFFFFFFFFFFFFFFFFFFFFFFFFFFFFFFFFFFFFFFFFFF98
S1236420FFFFFFFFFFFFFFFFFFFFFFFFFFFFFFFFFFFFFFFFFFFFFFFFFFFFFFFFFFFFFFFF78
S1236440FFFFFFFFFFFFFFFFFFFFFFFFFFFFFFFFFFFFFFFFFFFFFFFFFFFFFFFFFFFFFFFF58

S1236460FFFFFFFFFFFFFFFFFFFFFFFFFFFFFFFFFFFFFFFFFFFFFFFFFFFFFFFFFFFFFFFF38

S1236480FFFFFFFFFFFFFFFFFFFFFFFFFFFFFFFFFFFFFFFFFFFFFFFFFFFFFFFFFFFFFFFF18

S12364A0FFFFFFFFFFFFFFFFFFFFFFFFFFFFFFFFFFFFFFFFFFFFFFFFFFFFFFFFFFFFFFFFF8

S12364C0FFFFFFFFFFFFFFFFFFFFFFFFFFFFFFFFFFFFFFFFFFFFFFFFFFFFFFFFFFFFFFFFD8

S12364E0FFFFFFFFFFFFFFFFFFFFFFFFFFFFFFFFFFFFFFFFFFFFFFFFFFFFFFFFFFFFFFFFB8

S1236500FFFFFFFFFFFFFFFFFFFFFFFFFFFFFFFFFFFFFFFFFFFFFFFFFFFFFFFFFFFFFFFF97

S1236520FFFFFFFFFFFFFFFFFFFFFFFFFFFFFFFFFFFFFFFFFFFFFFFFFFFFFFFFFFFFFFFF77

S1236540FFFFFFFFFFFFFFFFFFFFFFFFFFFFFFFFFFFFFFFFFFFFFFFFFFFFFFFFFFFFFFFF57

S1236560FFFFFFFFFFFFFFFFFFFFFFFFFFFFFFFFFFFFFFFFFFFFFFFFFFFFFFFFFFFFFFFF37

S1236580FFFFFFFFFFFFFFFFFFFFFFFFFFFFFFFFFFFFFFFFFFFFFFFFFFFFFFFFFFFFFFFF17

S12365A0FFFFFFFFFFFFFFFFFFFFFFFFFFFFFFFFFFFFFFFFFFFFFFFFFFFFFFFFFFFFFFFFF7

S12365C0FFFFFFFFFFFFFFFFFFFFFFFFFFFFFFFFFFFFFFFFFFFFFFFFFFFFFFFFFFFFFFFFD7

S12365E0FFFFFFFFFFFFFFFFFFFFFFFFFFFFFFFFFFFFFFFFFFFFFFFFFFFFFFFFFFFFFFFFB7

S1236600FFFFFFFFFFFFFFFFFFFFFFFFFFFFFFFFFFFFFFFFFFFFFFFFFFFFFFFFFFFFFFFF96

S1236620FFFFFFFFFFFFFFFFFFFFFFFFFFFFFFFFFFFFFFFFFFFFFFFFFFFFFFFFFFFFFFFF76

S1236640FFFFFFFFFFFFFFFFFFFFFFFFFFFFFFFFFFFFFFFFFFFFFFFFFFFFFFFFFFFFFFFF56

S1236660FFFFFFFFFFFFFFFFFFFFFFFFFFFFFFFFFFFFFFFFFFFFFFFFFFFFFFFFFFFFFFFF36

S1236680FFFFFFFFFFFFFFFFFFFFFFFFFFFFFFFFFFFFFFFFFFFFFFFFFFFFFFFFFFFFFFFF16

S12366A0FFFFFFFFFFFFFFFFFFFFFFFFFFFFFFFFFFFFFFFFFFFFFFFFFFFFFFFFFFFFFFFFF6

S12366C0FFFFFFFFFFFFFFFFFFFFFFFFFFFFFFFFFFFFFFFFFFFFFFFFFFFFFFFFFFFFFFFFD6

S12366E0FFFFFFFFFFFFFFFFFFFFFFFFFFFFFFFFFFFFFFFFFFFFFFFFFFFFFFFFFFFFFFFFB6

S1236700FFFFFFFFFFFFFFFFFFFFFFFFFFFFFFFFFFFFFFFFFFFFFFFFFFFFFFFFFFFFFFFF95

S1236720FFFFFFFFFFFFFFFFFFFFFFFFFFFFFFFFFFFFFFFFFFFFFFFFFFFFFFFFFFFFFFFF75

S1236740FFFFFFFFFFFFFFFFFFFFFFFFFFFFFFFFFFFFFFFFFFFFFFFFFFFFFFFFFFFFFFFF55

S1236760FFFFFFFFFFFFFFFFFFFFFFFFFFFFFFFFFFFFFFFFFFFFFFFFFFFFFFFFFFFFFFFF35

S1236780FFFFFFFFFFFFFFFFFFFFFFFFFFFFFFFFFFFFFFFFFFFFFFFFFFFFFFFFFFFFFFFF15

S12367A0FFFFFFFFFFFFFFFFFFFFFFFFFFFFFFFFFFFFFFFFFFFFFFFFFFFFFFFFFFFFFFFFF5

S12367C0FFFFFFFFFFFFFFFFFFFFFFFFFFFFFFFFFFFFFFFFFFFFFFFFFFFFFFFFFFFFFFFFD5

S12367E0FFFFFFFFFFFFFFFFFFFFFFFFFFFFFFFFFFFFFFFFFFFFFFFFFFFFFFFFFFFFFFFFB5

S1236800FFFFFFFFFFFFFFFFFFFFFFFFFFFFFFFFFFFFFFFFFFFFFFFFFFFFFFFFFFFFFFFF94

S1236820FFFFFFFFFFFFFFFFFFFFFFFFFFFFFFFFFFFFFFFFFFFFFFFFFFFFFFFFFFFFFFFF74

S1236840FFFFFFFFFFFFFFFFFFFFFFFFFFFFFFFFFFFFFFFFFFFFFFFFFFFFFFFFFFFFFFFF54

S1236860FFFFFFFFFFFFFFFFFFFFFFFFFFFFFFFFFFFFFFFFFFFFFFFFFFFFFFFFFFFFFFFF34
S1236880FFFFFFFFFFFFFFFFFFFFFFFFFFFFFFFFFFFFFFFFFFFFFFFFFFFFFFFFFFFFFFFF14
S12368A0FFFFFFFFFFFFFFFFFFFFFFFFFFFFFFFFFFFFFFFFFFFFFFFFFFFFFFFFFFFFFFFFF4
S12368C0FFFFFFFFFFFFFFFFFFFFFFFFFFFFFFFFFFFFFFFFFFFFFFFFFFFFFFFFFFFFFFFFD4
S12368E0FFFFFFFFFFFFFFFFFFFFFFFFFFFFFFFFFFFFFFFFFFFFFFFFFFFFFFFFFFFFFFFFB4
S1236900FFFFFFFFFFFFFFFFFFFFFFFFFFFFFFFFFFFFFFFFFFFFFFFFFFFFFFFFFFFFFFFF93
S1236920FFFFFFFFFFFFFFFFFFFFFFFFFFFFFFFFFFFFFFFFFFFFFFFFFFFFFFFFFFFFFFFF73
S1236940FFFFFFFFFFFFFFFFFFFFFFFFFFFFFFFFFFFFFFFFFFFFFFFFFFFFFFFFFFFFFFFF53
S1236960FFFFFFFFFFFFFFFFFFFFFFFFFFFFFFFFFFFFFFFFFFFFFFFFFFFFFFFFFFFFFFFF33
S1236980FFFFFFFFFFFFFFFFFFFFFFFFFFFFFFFFFFFFFFFFFFFFFFFFFFFFFFFFFFFFFFFF13
S12369A0FFFFFFFFFFFFFFFFFFFFFFFFFFFFFFFFFFFFFFFFFFFFFFFFFFFFFFFFFFFFFFFFF3
S12369C0FFFFFFFFFFFFFFFFFFFFFFFFFFFFFFFFFFFFFFFFFFFFFFFFFFFFFFFFFFFFFFFFD3
S12369E0FFFFFFFFFFFFFFFFFFFFFFFFFFFFFFFFFFFFFFFFFFFFFFFFFFFFFFFFFFFFFFFFB3
S1236A00FFFFFFFFFFFFFFFFFFFFFFFFFFFFFFFFFFFFFFFFFFFFFFFFFFFFFFFFFFFFFFFF92
S1236A20FFFFFFFFFFFFFFFFFFFFFFFFFFFFFFFFFFFFFFFFFFFFFFFFFFFFFFFFFFFFFFFF72
S1236A40FFFFFFFFFFFFFFFFFFFFFFFFFFFFFFFFFFFFFFFFFFFFFFFFFFFFFFFFFFFFFFFF52
S1236A60FFFFFFFFFFFFFFFFFFFFFFFFFFFFFFFFFFFFFFFFFFFFFFFFFFFFFFFFFFFFFFFF32
S1236A80FFFFFFFFFFFFFFFFFFFFFFFFFFFFFFFFFFFFFFFFFFFFFFFFFFFFFFFFFFFFFFFF12
S1236AA0FFFFFFFFFFFFFFFFFFFFFFFFFFFFFFFFFFFFFFFFFFFFFFFFFFFFFFFFFFFFFFFFF2
S1236AC0FFFFFFFFFFFFFFFFFFFFFFFFFFFFFFFFFFFFFFFFFFFFFFFFFFFFFFFFFFFFFFFFD2
S1236AE0FFFFFFFFFFFFFFFFFFFFFFFFFFFFFFFFFFFFFFFFFFFFFFFFFFFFFFFFFFFFFFFFB2
S1236B00FFFFFFFFFFFFFFFFFFFFFFFFFFFFFFFFFFFFFFFFFFFFFFFFFFFFFFFFFFFFFFFF91
S1236B20FFFFFFFFFFFFFFFFFFFFFFFFFFFFFFFFFFFFFFFFFFFFFFFFFFFFFFFFFFFFFFFF71
S1236B40FFFFFFFFFFFFFFFFFFFFFFFFFFFFFFFFFFFFFFFFFFFFFFFFFFFFFFFFFFFFFFFF51
S1236B60FFFFFFFFFFFFFFFFFFFFFFFFFFFFFFFFFFFFFFFFFFFFFFFFFFFFFFFFFFFFFFFF31
S1236B80FFFFFFFFFFFFFFFFFFFFFFFFFFFFFFFFFFFFFFFFFFFFFFFFFFFFFFFFFFFFFFFF11
S1236BA0FFFFFFFFFFFFFFFFFFFFFFFFFFFFFFFFFFFFFFFFFFFFFFFFFFFFFFFFFFFFFFFFF1
S1236BC0FFFFFFFFFFFFFFFFFFFFFFFFFFFFFFFFFFFFFFFFFFFFFFFFFFFFFFFFFFFFFFFFD1
S1236BE0FFFFFFFFFFFFFFFFFFFFFFFFFFFFFFFFFFFFFFFFFFFFFFFFFFFFFFFFFFFFFFFFB1
S1236C00FFFFFFFFFFFFFFFFFFFFFFFFFFFFFFFFFFFFFFFFFFFFFFFFFFFFFFFFFFFFFFFF90
S1236C20FFFFFFFFFFFFFFFFFFFFFFFFFFFFFFFFFFFFFFFFFFFFFFFFFFFFFFFFFFFFFFFF70
S1236C40FFFFFFFFFFFFFFFFFFFFFFFFFFFFFFFFFFFFFFFFFFFFFFFFFFFFFFFFFFFFFFFF50

S1236C60FFFFFFFFFFFFFFFFFFFFFFFFFFFFFFFFFFFFFFFFFFFFFFFFFFFFFFFFFFFFFFFF30

S1236C80FFFFFFFFFFFFFFFFFFFFFFFFFFFFFFFFFFFFFFFFFFFFFFFFFFFFFFFFFFFFFFFF10

S1236CA0FFFFFFFFFFFFFFFFFFFFFFFFFFFFFFFFFFFFFFFFFFFFFFFFFFFFFFFFFFFFFFFFF0

S1236CC0FFFFFFFFFFFFFFFFFFFFFFFFFFFFFFFFFFFFFFFFFFFFFFFFFFFFFFFFFFFFFFFFD0

S1236CE0FFFFFFFFFFFFFFFFFFFFFFFFFFFFFFFFFFFFFFFFFFFFFFFFFFFFFFFFFFFFFFFFB0

S1236D00FFFFFFFFFFFFFFFFFFFFFFFFFFFFFFFFFFFFFFFFFFFFFFFFFFFFFFFFFFFFFFFF8F

S1236D20FFFFFFFFFFFFFFFFFFFFFFFFFFFFFFFFFFFFFFFFFFFFFFFFFFFFFFFFFFFFFFFF6F

S1236D40FFFFFFFFFFFFFFFFFFFFFFFFFFFFFFFFFFFFFFFFFFFFFFFFFFFFFFFFFFFFFFFF4F

S1236D60FFFFFFFFFFFFFFFFFFFFFFFFFFFFFFFFFFFFFFFFFFFFFFFFFFFFFFFFFFFFFFFF2F

S1236D80FFFFFFFFFFFFFFFFFFFFFFFFFFFFFFFFFFFFFFFFFFFFFFFFFFFFFFFFFFFFFFFF0F

S1236DA0FFFFFFFFFFFFFFFFFFFFFFFFFFFFFFFFFFFFFFFFFFFFFFFFFFFFFFFFFFFFFFFFEF

S1236DC0FFFFFFFFFFFFFFFFFFFFFFFFFFFFFFFFFFFFFFFFFFFFFFFFFFFFFFFFFFFFFFFFCF

S1236DE0FFFFFFFFFFFFFFFFFFFFFFFFFFFFFFFFFFFFFFFFFFFFFFFFFFFFFFFFFFFFFFFFAF

S1236E00FFFFFFFFFFFFFFFFFFFFFFFFFFFFFFFFFFFFFFFFFFFFFFFFFFFFFFFFFFFFFFFF8E

S1236E20FFFFFFFFFFFFFFFFFFFFFFFFFFFFFFFFFFFFFFFFFFFFFFFFFFFFFFFFFFFFFFFF6E

S1236E40FFFFFFFFFFFFFFFFFFFFFFFFFFFFFFFFFFFFFFFFFFFFFFFFFFFFFFFFFFFFFFFF4E

S1236E60FFFFFFFFFFFFFFFFFFFFFFFFFFFFFFFFFFFFFFFFFFFFFFFFFFFFFFFFFFFFFFFF2E

S1236E80FFFFFFFFFFFFFFFFFFFFFFFFFFFFFFFFFFFFFFFFFFFFFFFFFFFFFFFFFFFFFFFF0E

S1236EA0FFFFFFFFFFFFFFFFFFFFFFFFFFFFFFFFFFFFFFFFFFFFFFFFFFFFFFFFFFFFFFFFEE

S1236EC0FFFFFFFFFFFFFFFFFFFFFFFFFFFFFFFFFFFFFFFFFFFFFFFFFFFFFFFFFFFFFFFFCE

S1236EE0FFFFFFFFFFFFFFFFFFFFFFFFFFFFFFFFFFFFFFFFFFFFFFFFFFFFFFFFFFFFFFFFAE

S1236F00FFFFFFFFFFFFFFFFFFFFFFFFFFFFFFFFFFFFFFFFFFFFFFFFFFFFFFFFFFFFFFFF8D

S1236F20FFFFFFFFFFFFFFFFFFFFFFFFFFFFFFFFFFFFFFFFFFFFFFFFFFFFFFFFFFFFFFFF6D

S1236F40FFFFFFFFFFFFFFFFFFFFFFFFFFFFFFFFFFFFFFFFFFFFFFFFFFFFFFFFFFFFFFFF4D

S1236F60FFFFFFFFFFFFFFFFFFFFFFFFFFFFFFFFFFFFFFFFFFFFFFFFFFFFFFFFFFFFFFFF2D

S1236F80FFFFFFFFFFFFFFFFFFFFFFFFFFFFFFFFFFFFFFFFFFFFFFFFFFFFFFFFFFFFFFFF0D

S1236FA0FFFFFFFFFFFFFFFFFFFFFFFFFFFFFFFFFFFFFFFFFFFFFFFFFFFFFFFFFFFFFFFFED

S1236FC0FFFFFFFFFFFFFFFFFFFFFFFFFFFFFFFFFFFFFFFFFFFFFFFFFFFFFFFFFFFFFFFFCD

S1236FE0FFFFFFFFFFFFFFFFFFFFFFFFFFFFFFFFFFFFFFFFFFFFFFFFFFFFFFFFFFFFFFFFAD

S1237000FFFFFFFFFFFFFFFFFFFFFFFFFFFFFFFFFFFFFFFFFFFFFFFFFFFFFFFFFFFFFFFF8C

S1237020FFFFFFFFFFFFFFFFFFFFFFFFFFFFFFFFFFFFFFFFFFFFFFFFFFFFFFFFFFFFFFFF6C

S1237040FFFFFFFFFFFFFFFFFFFFFFFFFFFFFFFFFFFFFFFFFFFFFFFFFFFFFFFFFFFFFFFF4C

```
S1237060FFFFFFFFFFFFFFFFFFFFFFFFFFFFFFFFFFFFFFFFFFFFFFFFFFFFFFFFFFFFFFFF2C
S1237080FFFFFFFFFFFFFFFFFFFFFFFFFFFFFFFFFFFFFFFFFFFFFFFFFFFFFFFFFFFFFFFF0C
S12370A0FFFFFFFFFFFFFFFFFFFFFFFFFFFFFFFFFFFFFFFFFFFFFFFFFFFFFFFFFFFFFFFFEC
S12370C0FFFFFFFFFFFFFFFFFFFFFFFFFFFFFFFFFFFFFFFFFFFFFFFFFFFFFFFFFFFFFFFFCC
S12370E0FFFFFFFFFFFFFFFFFFFFFFFFFFFFFFFFFFFFFFFFFFFFFFFFFFFFFFFFFFFFFFFFAC
S1237100FFFFFFFFFFFFFFFFFFFFFFFFFFFFFFFFFFFFFFFFFFFFFFFFFFFFFFFFFFFFFFFF8B
S1237120FFFFFFFFFFFFFFFFFFFFFFFFFFFFFFFFFFFFFFFFFFFFFFFFFFFFFFFFFFFFFFFF6B
S1237140FFFFFFFFFFFFFFFFFFFFFFFFFFFFFFFFFFFFFFFFFFFFFFFFFFFFFFFFFFFFFFFF4B
S1237160FFFFFFFFFFFFFFFFFFFFFFFFFFFFFFFFFFFFFFFFFFFFFFFFFFFFFFFFFFFFFFFF2B
S1237180FFFFFFFFFFFFFFFFFFFFFFFFFFFFFFFFFFFFFFFFFFFFFFFFFFFFFFFFFFFFFFFF0B
S12371A0FFFFFFFFFFFFFFFFFFFFFFFFFFFFFFFFFFFFFFFFFFFFFFFFFFFFFFFFFFFFFFFFEB
S12371C0FFFFFFFFFFFFFFFFFFFFFFFFFFFFFFFFFFFFFFFFFFFFFFFFFFFFFFFFFFFFFFFFCB
S12371E0FFFFFFFFFFFFFFFFFFFFFFFFFFFFFFFFFFFFFFFFFFFFFFFFFFFFFFFFFFFFFFFFAB
S1237200FFFFFFFFFFFFFFFFFFFFFFFFFFFFFFFFFFFFFFFFFFFFFFFFFFFFFFFFFFFFFFFF8A
S1237220FFFFFFFFFFFFFFFFFFFFFFFFFFFFFFFFFFFFFFFFFFFFFFFFFFFFFFFFFFFFFFFF6A
S1237240FFFFFFFFFFFFFFFFFFFFFFFFFFFFFFFFFFFFFFFFFFFFFFFFFFFFFFFFFFFFFFFF4A
S1237260FFFFFFFFFFFFFFFFFFFFFFFFFFFFFFFFFFFFFFFFFFFFFFFFFFFFFFFFFFFFFFFF2A
S1237280FFFFFFFFFFFFFFFFFFFFFFFFFFFFFFFFFFFFFFFFFFFFFFFFFFFFFFFFFFFFFFFF0A
S12372A0FFFFFFFFFFFFFFFFFFFFFFFFFFFFFFFFFFFFFFFFFFFFFFFFFFFFFFFFFFFFFFFFEA
S12372C0FFFFFFFFFFFFFFFFFFFFFFFFFFFFFFFFFFFFFFFFFFFFFFFFFFFFFFFFFFFFFFFFCA
S12372E0FFFFFFFFFFFFFFFFFFFFFFFFFFFFFFFFFFFFFFFFFFFFFFFFFFFFFFFFFFFFFFFFAA
S1237300FFFFFFFFFFFFFFFFFFFFFFFFFFFFFFFFFFFFFFFFFFFFFFFFFFFFFFFFFFFFFFFF89
S1237320FFFFFFFFFFFFFFFFFFFFFFFFFFFFFFFFFFFFFFFFFFFFFFFFFFFFFFFFFFFFFFFF69
S1237340FFFFFFFFFFFFFFFFFFFFFFFFFFFFFFFFFFFFFFFFFFFFFFFFFFFFFFFFFFFFFFFF49
S1237360FFFFFFFFFFFFFFFFFFFFFFFFFFFFFFFFFFFFFFFFFFFFFFFFFFFFFFFFFFFFFFFF29
S1237380FFFFFFFFFFFFFFFFFFFFFFFFFFFFFFFFFFFFFFFFFFFFFFFFFFFFFFFFFFFFFFFF09
S12373A0FFFFFFFFFFFFFFFFFFFFFFFFFFFFFFFFFFFFFFFFFFFFFFFFFFFFFFFFFFFFFFFFE9
S12373C0FFFFFFFFFFFFFFFFFFFFFFFFFFFFFFFFFFFFFFFFFFFFFFFFFFFFFFFFFFFFFFFFC9
S12373E0FFFFFFFFFFFFFFFFFFFFFFFFFFFFFFFFFFFFFFFFFFFFFFFFFFFFFFFFFFFFFFFFA9
S1237400FFFFFFFFFFFFFFFFFFFFFFFFFFFFFFFFFFFFFFFFFFFFFFFFFFFFFFFFFFFFFFFF88
S1237420FFFFFFFFFFFFFFFFFFFFFFFFFFFFFFFFFFFFFFFFFFFFFFFFFFFFFFFFFFFFFFFF68
S1237440FFFFFFFFFFFFFFFFFFFFFFFFFFFFFFFFFFFFFFFFFFFFFFFFFFFFFFFFFFFFFFFF48
```

S1237460FFFFFFFFFFFFFFFFFFFFFFFFFFFFFFFFFFFFFFFFFFFFFFFFFFFFFFFFFFFFFFFF28

S1237480FFFFFFFFFFFFFFFFFFFFFFFFFFFFFFFFFFFFFFFFFFFFFFFFFFFFFFFFFFFFFFFF08

S12374A0FFFFFFFFFFFFFFFFFFFFFFFFFFFFFFFFFFFFFFFFFFFFFFFFFFFFFFFFFFFFFFFFE8

S12374C0FFFFFFFFFFFFFFFFFFFFFFFFFFFFFFFFFFFFFFFFFFFFFFFFFFFFFFFFFFFFFFFFC8

S12374E0FFFFFFFFFFFFFFFFFFFFFFFFFFFFFFFFFFFFFFFFFFFFFFFFFFFFFFFFFFFFFFFFA8

S1237500FFFFFFFFFFFFFFFFFFFFFFFFFFFFFFFFFFFFFFFFFFFFFFFFFFFFFFFFFFFFFFFF87

S1237520FFFFFFFFFFFFFFFFFFFFFFFFFFFFFFFFFFFFFFFFFFFFFFFFFFFFFFFFFFFFFFFF67

S1237540FFFFFFFFFFFFFFFFFFFFFFFFFFFFFFFFFFFFFFFFFFFFFFFFFFFFFFFFFFFFFFFF47

S1237560FFFFFFFFFFFFFFFFFFFFFFFFFFFFFFFFFFFFFFFFFFFFFFFFFFFFFFFFFFFFFFFF27

S1237580FFFFFFFFFFFFFFFFFFFFFFFFFFFFFFFFFFFFFFFFFFFFFFFFFFFFFFFFFFFFFFFF07

S12375A0FFFFFFFFFFFFFFFFFFFFFFFFFFFFFFFFFFFFFFFFFFFFFFFFFFFFFFFFFFFFFFFFE7

S12375C0FFFFFFFFFFFFFFFFFFFFFFFFFFFFFFFFFFFFFFFFFFFFFFFFFFFFFFFFFFFFFFFFC7

S12375E0FFFFFFFFFFFFFFFFFFFFFFFFFFFFFFFFFFFFFFFFFFFFFFFFFFFFFFFFFFFFFFFFA7

S1237600FFFFFFFFFFFFFFFFFFFFFFFFFFFFFFFFFFFFFFFFFFFFFFFFFFFFFFFFFFFFFFFF86

S1237620FFFFFFFFFFFFFFFFFFFFFFFFFFFFFFFFFFFFFFFFFFFFFFFFFFFFFFFFFFFFFFFF66

S1237640FFFFFFFFFFFFFFFFFFFFFFFFFFFFFFFFFFFFFFFFFFFFFFFFFFFFFFFFFFFFFFFF46

S1237660FFFFFFFFFFFFFFFFFFFFFFFFFFFFFFFFFFFFFFFFFFFFFFFFFFFFFFFFFFFFFFFF26

S1237680FFFFFFFFFFFFFFFFFFFFFFFFFFFFFFFFFFFFFFFFFFFFFFFFFFFFFFFFFFFFFFFF06

S12376A0FFFFFFFFFFFFFFFFFFFFFFFFFFFFFFFFFFFFFFFFFFFFFFFFFFFFFFFFFFFFFFFFE6

S12376C0FFFFFFFFFFFFFFFFFFFFFFFFFFFFFFFFFFFFFFFFFFFFFFFFFFFFFFFFFFFFFFFFC6

S12376E0FFFFFFFFFFFFFFFFFFFFFFFFFFFFFFFFFFFFFFFFFFFFFFFFFFFFFFFFFFFFFFFFA6

S1237700FFFFFFFFFFFFFFFFFFFFFFFFFFFFFFFFFFFFFFFFFFFFFFFFFFFFFFFFFFFFFFFF85

S1237720FFFFFFFFFFFFFFFFFFFFFFFFFFFFFFFFFFFFFFFFFFFFFFFFFFFFFFFFFFFFFFFF65

S1237740FFFFFFFFFFFFFFFFFFFFFFFFFFFFFFFFFFFFFFFFFFFFFFFFFFFFFFFFFFFFFFFF45

S1237760FFFFFFFFFFFFFFFFFFFFFFFFFFFFFFFFFFFFFFFFFFFFFFFFFFFFFFFFFFFFFFFF25

S1237780FFFFFFFFFFFFFFFFFFFFFFFFFFFFFFFFFFFFFFFFFFFFFFFFFFFFFFFFFFFFFFFF05

S12377A0FFFFFFFFFFFFFFFFFFFFFFFFFFFFFFFFFFFFFFFFFFFFFFFFFFFFFFFFFFFFFFFFE5

S12377C0FFFFFFFFFFFFFFFFFFFFFFFFFFFFFFFFFFFFFFFFFFFFFFFFFFFFFFFFFFFFFFFFC5

S12377E0FFFFFFFFFFFFFFFFFFFFFFFFFFFFFFFFFFFFFFFFFFFFFFFFFFFFFFFFFFFFFFFFA5

S1237800FFFFFFFFFFFFFFFFFFFFFFFFFFFFFFFFFFFFFFFFFFFFFFFFFFFFFFFFFFFFFFFF84

S1237820FFFFFFFFFFFFFFFFFFFFFFFFFFFFFFFFFFFFFFFFFFFFFFFFFFFFFFFFFFFFFFFF64

S1237840FFFFFFFFFFFFFFFFFFFFFFFFFFFFFFFFFFFFFFFFFFFFFFFFFFFFFFFFFFFFFFFF44

S1237860FFFFFFFFFFFFFFFFFFFFFFFFFFFFFFFFFFFFFFFFFFFFFFFFFFFFFFFFFFFFFFFF24

S1237880FFFFFFFFFFFFFFFFFFFFFFFFFFFFFFFFFFFFFFFFFFFFFFFFFFFFFFFFFFFFFFFF04

S12378A0FFFFFFFFFFFFFFFFFFFFFFFFFFFFFFFFFFFFFFFFFFFFFFFFFFFFFFFFFFFFFFFFE4

S12378C0FFFFFFFFFFFFFFFFFFFFFFFFFFFFFFFFFFFFFFFFFFFFFFFFFFFFFFFFFFFFFFFFC4

S12378E0FFFFFFFFFFFFFFFFFFFFFFFFFFFFFFFFFFFFFFFFFFFFFFFFFFFFFFFFFFFFFFFFA4

S1237900FFFFFFFFFFFFFFFFFFFFFFFFFFFFFFFFFFFFFFFFFFFFFFFFFFFFFFFFFFFFFFFF83

S1237920FFFFFFFFFFFFFFFFFFFFFFFFFFFFFFFFFFFFFFFFFFFFFFFFFFFFFFFFFFFFFFFF63

S1237940FFFFFFFFFFFFFFFFFFFFFFFFFFFFFFFFFFFFFFFFFFFFFFFFFFFFFFFFFFFFFFFF43

S1237960FFFFFFFFFFFFFFFFFFFFFFFFFFFFFFFFFFFFFFFFFFFFFFFFFFFFFFFFFFFFFFFF23

S1237980FFFFFFFFFFFFFFFFFFFFFFFFFFFFFFFFFFFFFFFFFFFFFFFFFFFFFFFFFFFFFFFF03

S12379A0FFFFFFFFFFFFFFFFFFFFFFFFFFFFFFFFFFFFFFFFFFFFFFFFFFFFFFFFFFFFFFFFE3

S12379C0FFFFFFFFFFFFFFFFFFFFFFFFFFFFFFFFFFFFFFFFFFFFFFFFFFFFFFFFFFFFFFFFC3

S12379E0FFFFFFFFFFFFFFFFFFFFFFFFFFFFFFFFFFFFFFFFFFFFFFFFFFFFFFFFFFFFFFFFA3

S1237A00FFFFFFFFFFFFFFFFFFFFFFFFFFFFFFFFFFFFFFFFFFFFFFFFFFFFFFFFFFFFFFFF82

S1237A20FFFFFFFFFFFFFFFFFFFFFFFFFFFFFFFFFFFFFFFFFFFFFFFFFFFFFFFFFFFFFFFF62

S1237A40FFFFFFFFFFFFFFFFFFFFFFFFFFFFFFFFFFFFFFFFFFFFFFFFFFFFFFFFFFFFFFFF42

S1237A60FFFFFFFFFFFFFFFFFFFFFFFFFFFFFFFFFFFFFFFFFFFFFFFFFFFFFFFFFFFFFFFF22

S1237A80FFFFFFFFFFFFFFFFFFFFFFFFFFFFFFFFFFFFFFFFFFFFFFFFFFFFFFFFFFFFFFFF02

S1237AA0FFFFFFFFFFFFFFFFFFFFFFFFFFFFFFFFFFFFFFFFFFFFFFFFFFFFFFFFFFFFFFFFE2

S1237AC0FFFFFFFFFFFFFFFFFFFFFFFFFFFFFFFFFFFFFFFFFFFFFFFFFFFFFFFFFFFFFFFFC2

S1237AE0FFFFFFFFFFFFFFFFFFFFFFFFFFFFFFFFFFFFFFFFFFFFFFFFFFFFFFFFFFFFFFFFA2

S1237B00FFFFFFFFFFFFFFFFFFFFFFFFFFFFFFFFFFFFFFFFFFFFFFFFFFFFFFFFFFFFFFFF81

S1237B20FFFFFFFFFFFFFFFFFFFFFFFFFFFFFFFFFFFFFFFFFFFFFFFFFFFFFFFFFFFFFFFF61

S1237B40FFFFFFFFFFFFFFFFFFFFFFFFFFFFFFFFFFFFFFFFFFFFFFFFFFFFFFFFFFFFFFFF41

S1237B60FFFFFFFFFFFFFFFFFFFFFFFFFFFFFFFFFFFFFFFFFFFFFFFFFFFFFFFFFFFFFFFF21

S1237B80FFFFFFFFFFFFFFFFFFFFFFFFFFFFFFFFFFFFFFFFFFFFFFFFFFFFFFFFFFFFFFFF01

S1237BA0FFFFFFFFFFFFFFFFFFFFFFFFFFFFFFFFFFFFFFFFFFFFFFFFFFFFFFFFFFFFFFFFE1

S1237BC0FFFFFFFFFFFFFFFFFFFFFFFFFFFFFFFFFFFFFFFFFFFFFFFFFFFFFFFFFFFFFFFFC1

S1237BE0FFFFFFFFFFFFFFFFFFFFFFFFFFFFFFFFFFFFFFFFFFFFFFFFFFFFFFFFFFFFFFFFA1

S1237C00FFFFFFFFFFFFFFFFFFFFFFFFFFFFFFFFFFFFFFFFFFFFFFFFFFFFFFFFFFFFFFFF80

S1237C20FFFFFFFFFFFFFFFFFFFFFFFFFFFFFFFFFFFFFFFFFFFFFFFFFFFFFFFFFFFFFFFF60

S1237C40FFFFFFFFFFFFFFFFFFFFFFFFFFFFFFFFFFFFFFFFFFFFFFFFFFFFFFFFFFFFFFFF40

```
S1237C60FFFFFFFFFFFFFFFFFFFFFFFFFFFFFFFFFFFFFFFFFFFFFFFFFFFFFFFFFFFFFFFF20
S1237C80FFFFFFFFFFFFFFFFFFFFFFFFFFFFFFFFFFFFFFFFFFFFFFFFFFFFFFFFFFFFFFFF00
S1237CA0FFFFFFFFFFFFFFFFFFFFFFFFFFFFFFFFFFFFFFFFFFFFFFFFFFFFFFFFFFFFFFFFE0
S1237CC0FFFFFFFFFFFFFFFFFFFFFFFFFFFFFFFFFFFFFFFFFFFFFFFFFFFFFFFFFFFFFFFFC0
S1237CE0FFFFFFFFFFFFFFFFFFFFFFFFFFFFFFFFFFFFFFFFFFFFFFFFFFFFFFFFFFFFFFFFA0
S1237D00FFFFFFFFFFFFFFFFFFFFFFFFFFFFFFFFFFFFFFFFFFFFFFFFFFFFFFFFFFFFFFFF7F
S1237D20FFFFFFFFFFFFFFFFFFFFFFFFFFFFFFFFFFFFFFFFFFFFFFFFFFFFFFFFFFFFFFFF5F
S1237D40FFFFFFFFFFFFFFFFFFFFFFFFFFFFFFFFFFFFFFFFFFFFFFFFFFFFFFFFFFFFFFFF3F
S1237D60FFFFFFFFFFFFFFFFFFFFFFFFFFFFFFFFFFFFFFFFFFFFFFFFFFFFFFFFFFFFFFFF1F
S1237D80FFFFFFFFFFFFFFFFFFFFFFFFFFFFFFFFFFFFFFFFFFFFFFFFFFFFFFFFFFFFFFFFFF
S1237DA0FFFFFFFFFFFFFFFFFFFFFFFFFFFFFFFFFFFFFFFFFFFFFFFFFFFFFFFFFFFFFFFFDF
S1237DC0FFFFFFFFFFFFFFFFFFFFFFFFFFFFFFFFFFFFFFFFFFFFFFFFFFFFFFFFFFFFFFFFBF
S1237DE0FFFFFFFFFFFFFFFFFFFFFFFFFFFFFFFFFFFFFFFFFFFFFFFFFFFFFFFFFFFFFFFF9F
S1237E00FFFFFFFFFFFFFFFFFFFFFFFFFFFFFFFFFFFFFFFFFFFFFFFFFFFFFFFFFFFFFFFF7E
S1237E20FFFFFFFFFFFFFFFFFFFFFFFFFFFFFFFFFFFFFFFFFFFFFFFFFFFFFFFFFFFFFFFF5E
S1237E40FFFFFFFFFFFFFFFFFFFFFFFFFFFFFFFFFFFFFFFFFFFFFFFFFFFFFFFFFFFFFFFF3E
S1237E60FFFFFFFFFFFFFFFFFFFFFFFFFFFFFFFFFFFFFFFFFFFFFFFFFFFFFFFFFFFFFFFF1E
S1237E80FFFFFFFFFFFFFFFFFFFFFFFFFFFFFFFFFFFFFFFFFFFFFFFFFFFFFFFFFFFFFFFFFE
S1237EA0FFFFFFFFFFFFFFFFFFFFFFFFFFFFFFFFFFFFFFFFFFFFFFFFFFFFFFFFFFFFFFFFDE
S1237EC0FFFFFFFFFFFFFFFFFFFFFFFFFFFFFFFFFFFFFFFFFFFFFFFFFFFFFFFFFFFFFFFFBE
S1237EE0FFFFFFFFFFFFFFFFFFFFFFFFFFFFFFFFFFFFFFFFFFFFFFFFFFFFFFFFFFFFFFFF9E
S1237F00FFFFFFFFFFFFFFFFFFFFFFFFFFFFFFFFFFFFFFFFFFFFFFFFFFFFFFFFFFFFFFFF7D
S1237F20FFFFFFFFFFFFFFFFFFFFFFFFFFFFFFFFFFFFFFFFFFFFFFFFFFFFFFFFFFFFFFFF5D
S1237F40FFFFFFFFFFFFFFFFFFFFFFFFFFFFFFFFFFFFFFFFFFFFFFFFFFFFFFFFFFFFFFFF3D
S1237F60FFFFFFFFFFFFFFFFFFFFFFFFFFFFFFFFFFFFFFFFFFFFFFFFFFFFFFFFFFFFFFFF1D
S1237F80FFFFFFFFFFFFFFFFFFFFFFFFFFFFFFFFFFFFFFFFFFFFFFFFFFFFFFFFFFFFFFFFFD
S1237FA0FFFFFFFFFFFFFFFFFFFFFFFFFFFFFFFFFFFFFFFFFFFFFFFFFFFFFFFFFFFFFFFFDD
S1237FC0FFFFFFFFFFFFFFFFFFFFFFFFFFFFFFFFFFFFFFFFFFFFFFFFFFFFFFFFFFFFFFFFBD
S1237FE0FFFFFFFFFFFFFFFFFFFFFFFFFFFFFFFFFFFFFFFFFFFFFFFFFFFFFFFFFFFFFFFF9D
S9030000FC
```

J8 is the access port connector. J8 allows communication with the SPROC via a suitable external development system. DAC U38 provides an analog representation of the internal SPROC registers for use with such development system. J7 provides access to the RTS, GPIO and COMPUTE lines. J9 and J10 provide access to the SPROC serial output and serial input ports. J7, J9 and J10 also provide access to the SPROC. None of the above are utilized in normal operation, but are available for enhancements and further development.

U43 is a watchdog PLD which in conjunction with U39 looks for the absence of certain address and data combinations to constantly monitor the operation of the SPROC to help ensure that it does not hang up. If a required combination is absent, U39 times out and U43 initiates a reset of the SPROC. While one skilled in the art will be able to program PLD U43 from the teachings herein, the program for the preferred embodiment is given below in industry standard JEDEC form:

```
CUPL        3.2a Serial# MD-32A-6506
Device      v750 Library DLIB-h-25-2
Created     Thu May 05 09:22:36 1994
Name        watchdog
Partno      xxxxxx
Revision    xxxxxx
Date        xxxxxx
Designer    xxxxxx
Company     xxxxxx
Assembly    xxxxxx
Location    xxxxxx
*QP24
*QF14394
*G0
*F0
*L13184 00001111110111111111111111111111
*L13216 11111111111111111111111111111111
*L13248 11111111111111111111111100000000
*L13856 00001001111111011111011011111001
*L13888 11110110111110011111011011110101
*L13920 11111010111101011111100111011111
*L13952 11011111111111111111111111111111
*L13984 11111111111111111111111111111111
*L14016 11111111111110000000000000000000
*L14176 00000000000000000000011111111111
*L14208 11111111111111111111111111111111
*L14240 11111111111111111111111111111111
*L14272 11111111011111111111111101011111
*L14304 01101111100111110110111110011111
*L14336 10101111010111111010111101101001
```

-continued

```
*L14368 00100100100100100100100100100001
*C30CA
*D94E
```

Figure 8:
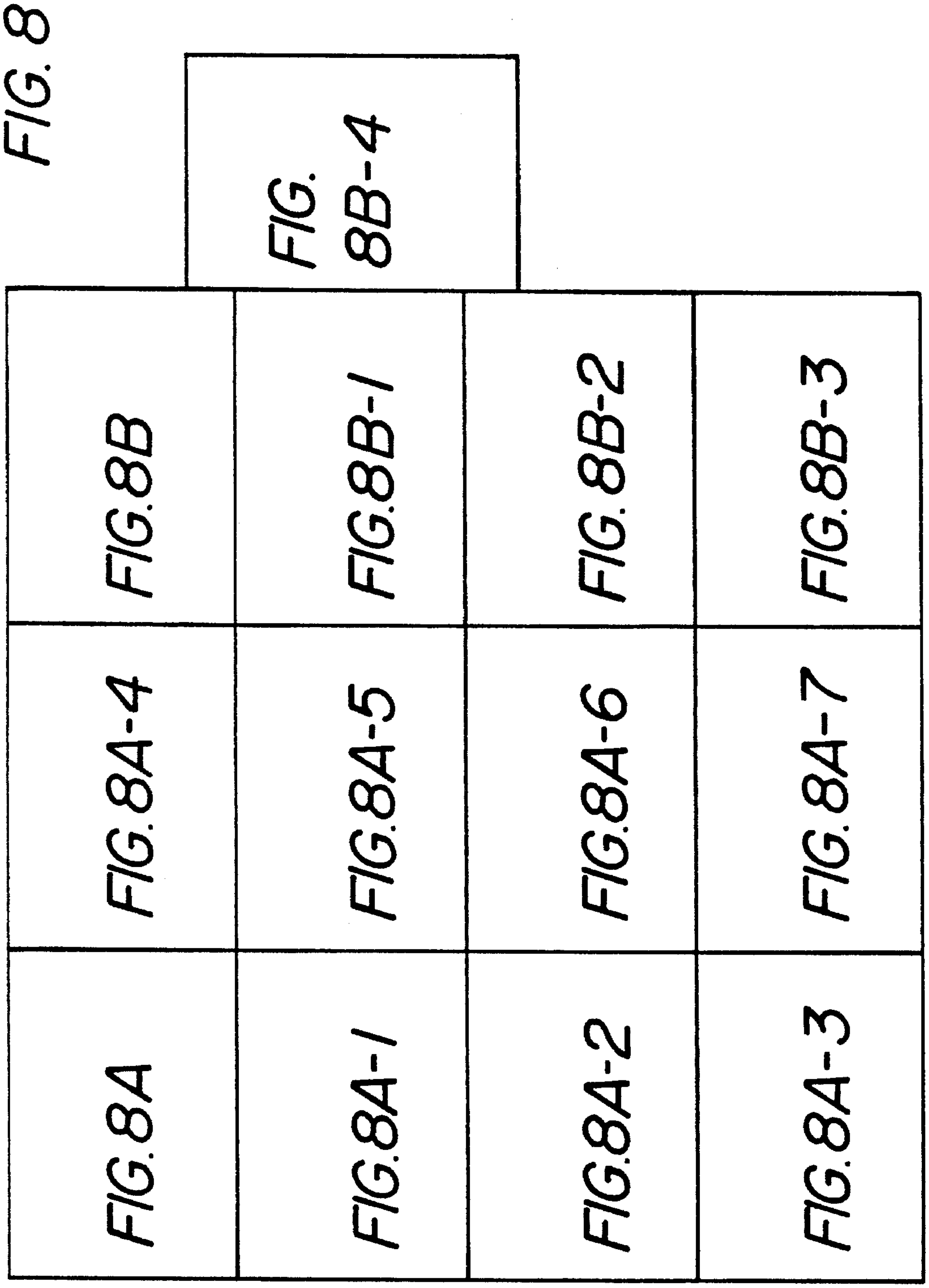
FIG. 8A is a fifth schematic drawing of the preferred embodiment of the invention.
FIG. 8B is a sixth schematic drawing of the preferred embodiment of the invention.
Figure 8A:
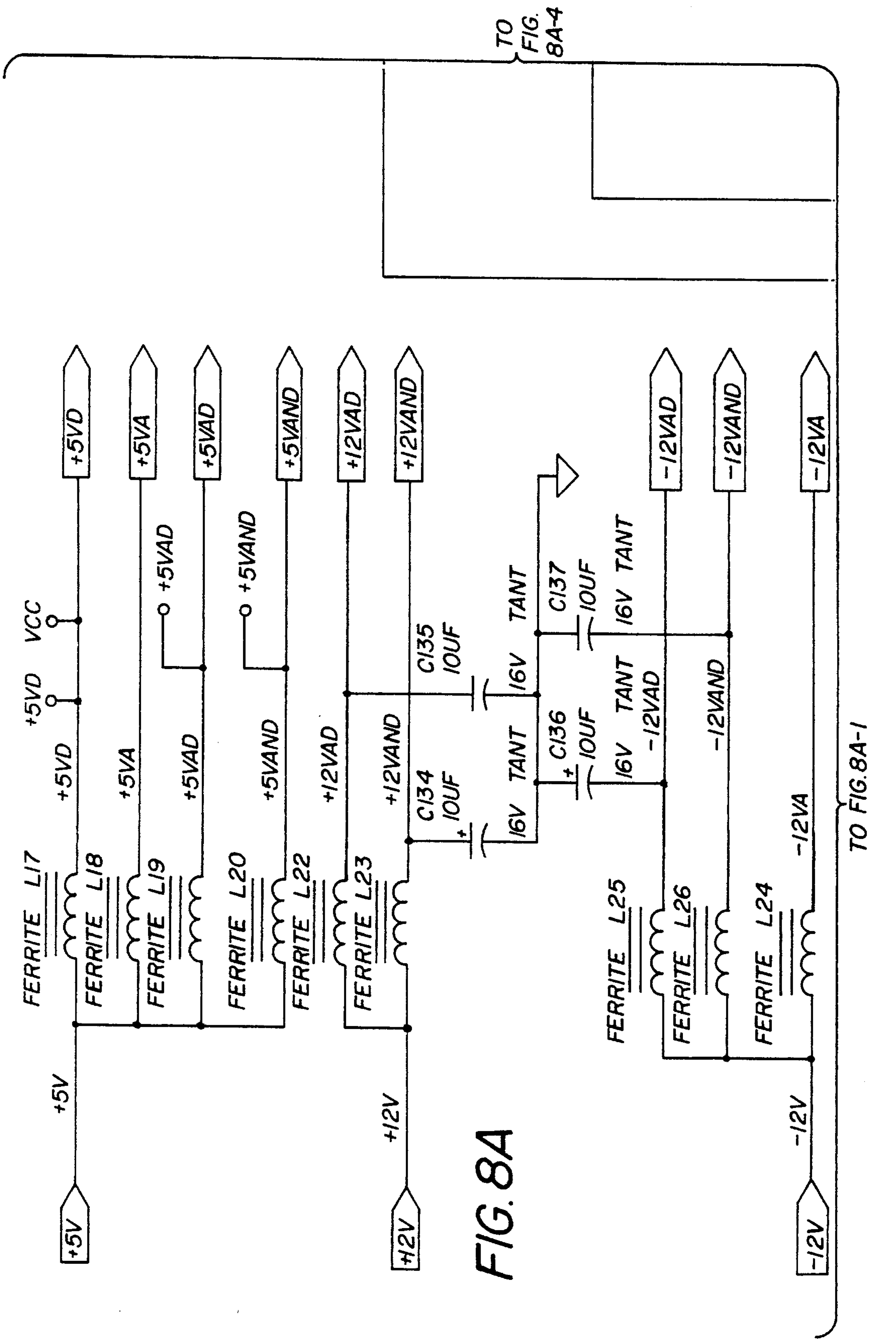
Figures 1, 8A:
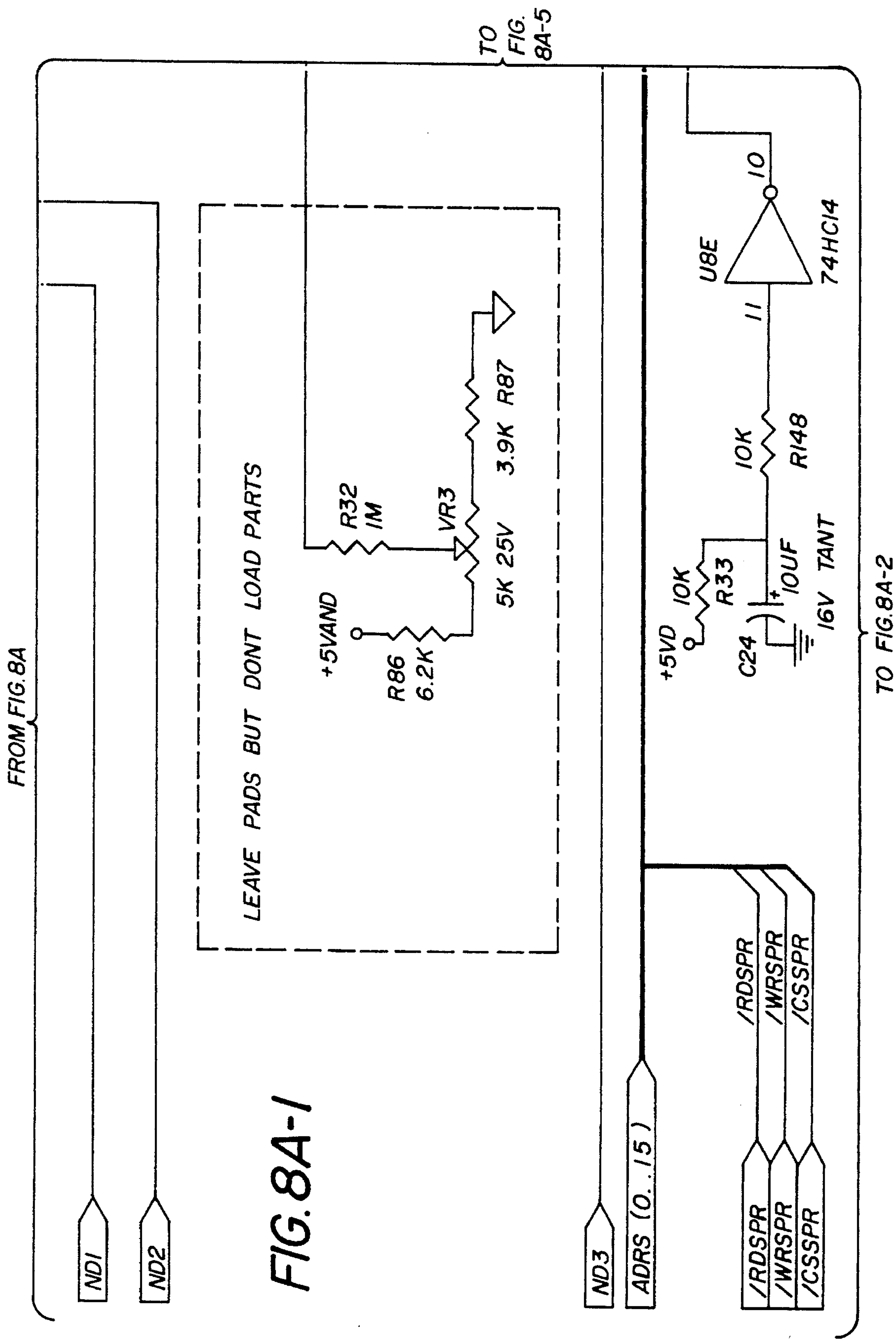
Figures 2, 8A:
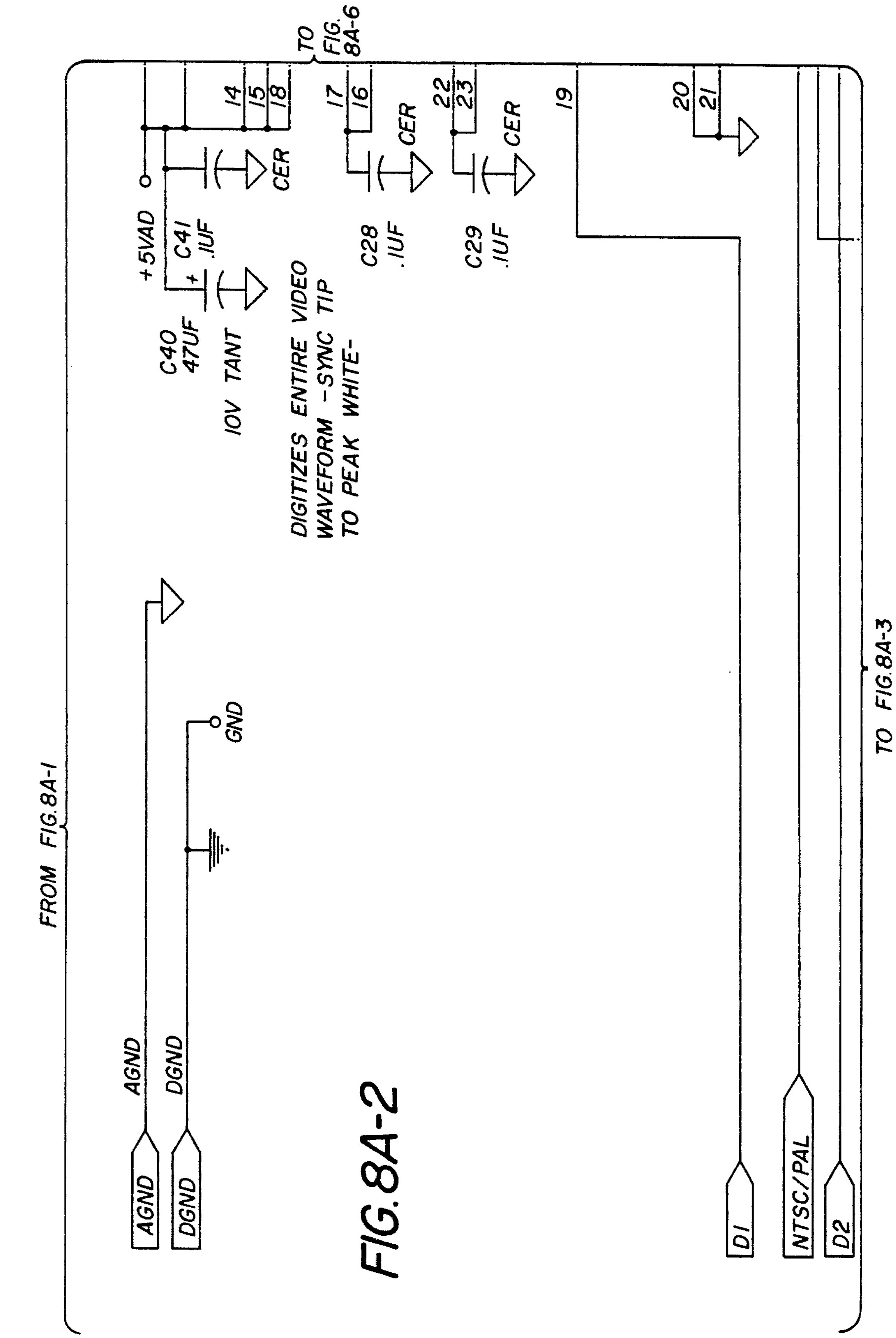
Figures 3, 8A:
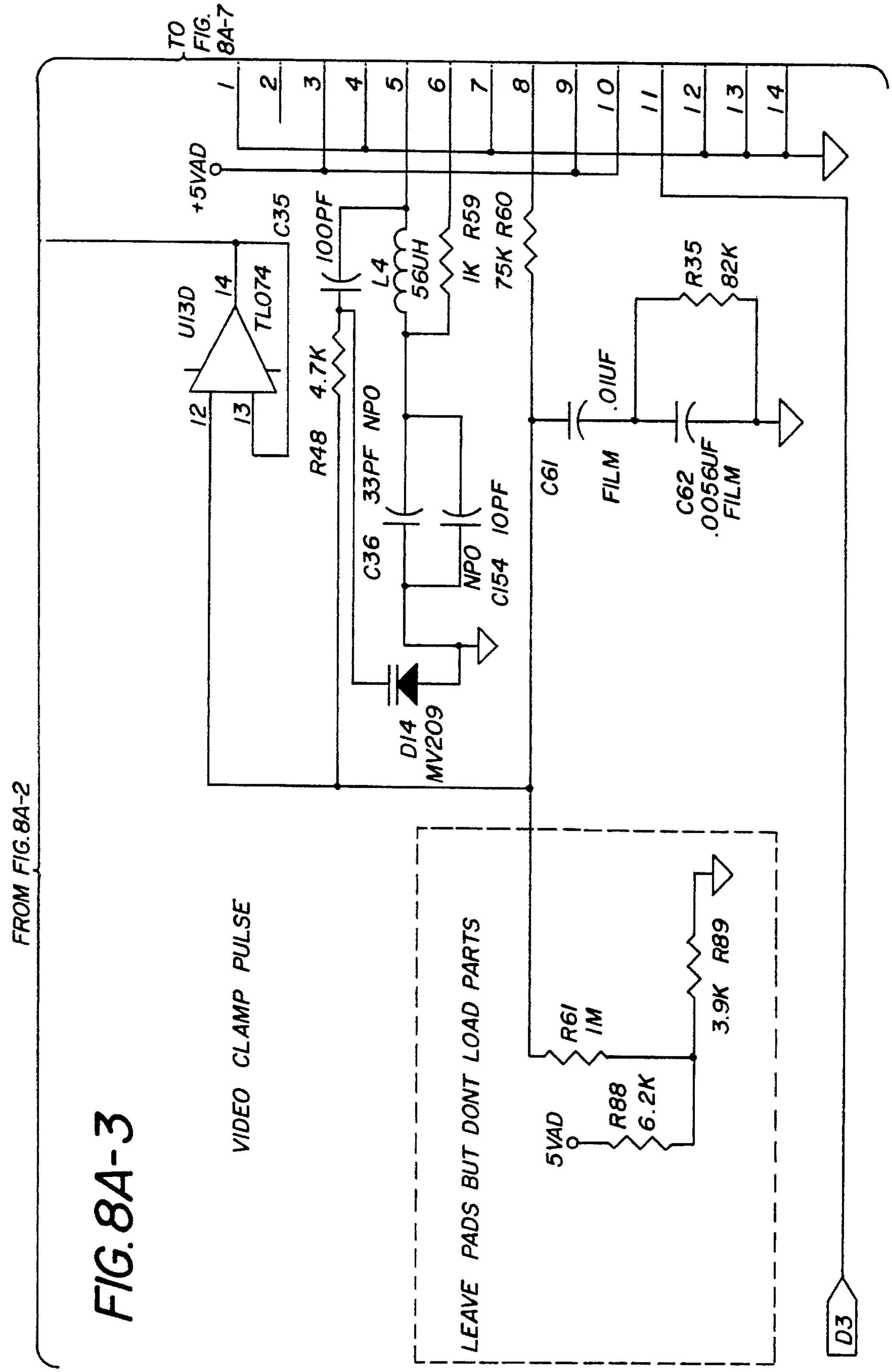
Figures 4, 8A:
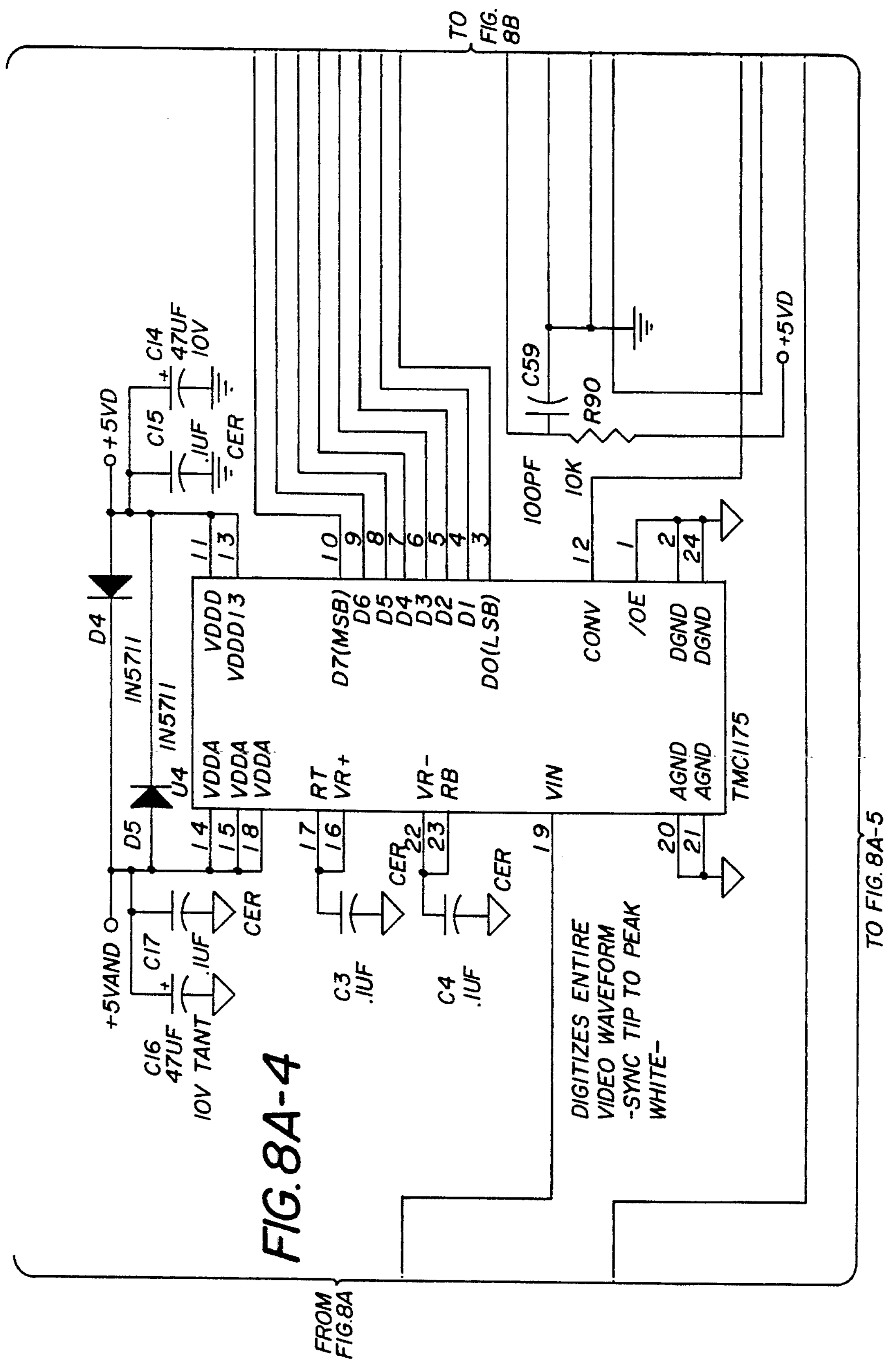
Figures 5, 8A:
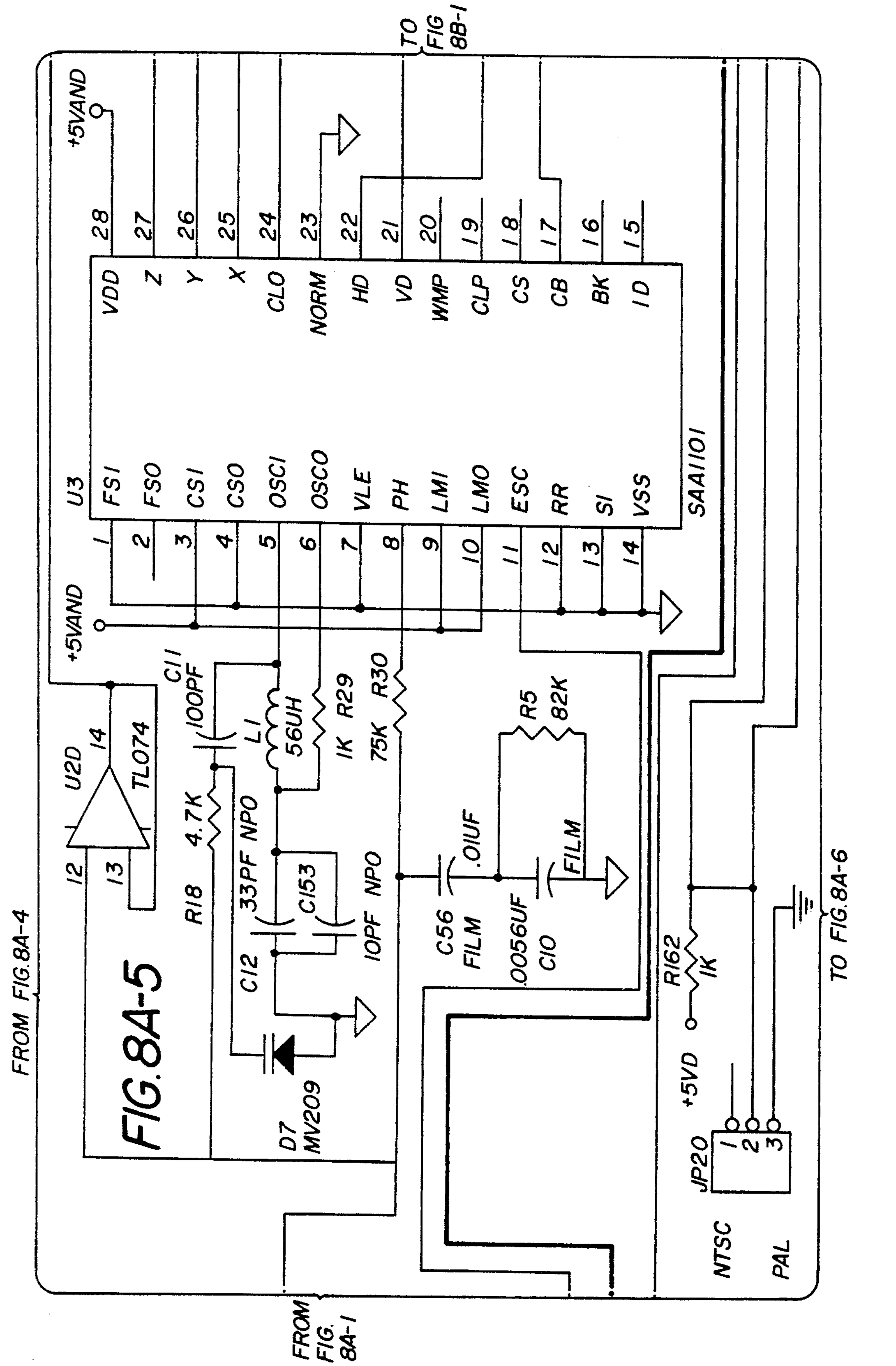
Figures 6, 8A:
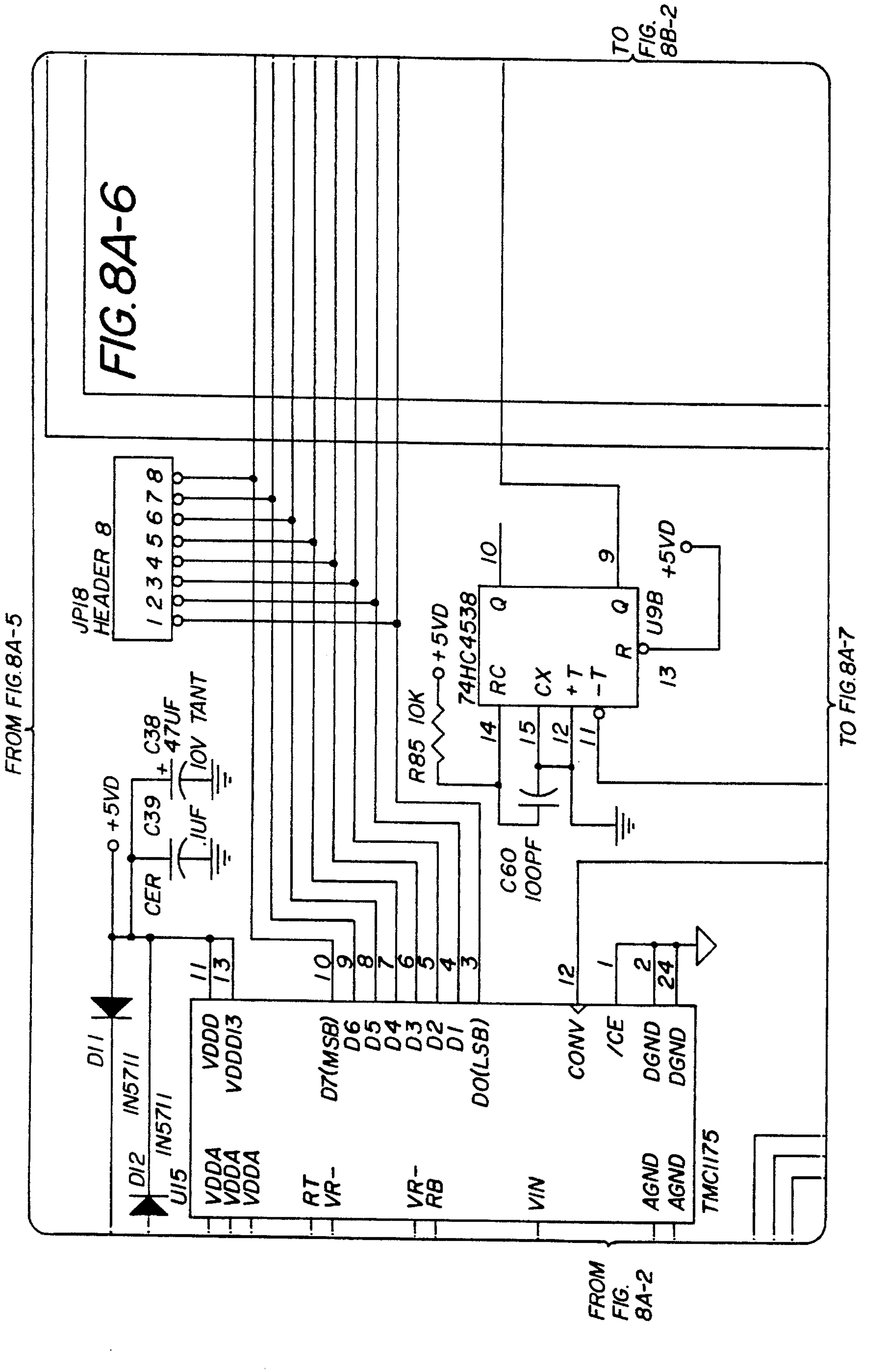
Figures 7, 8A:
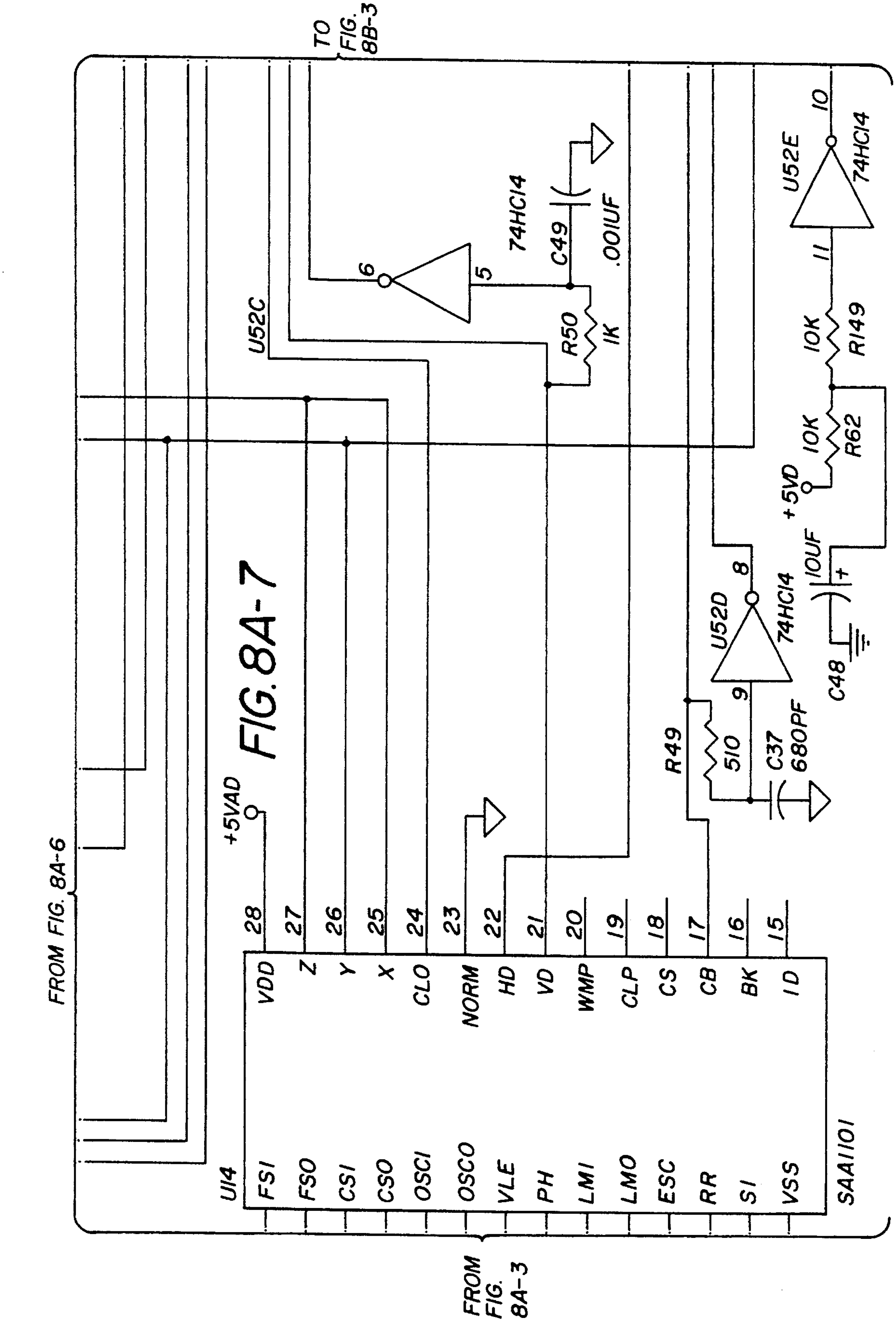
Figure 8B:
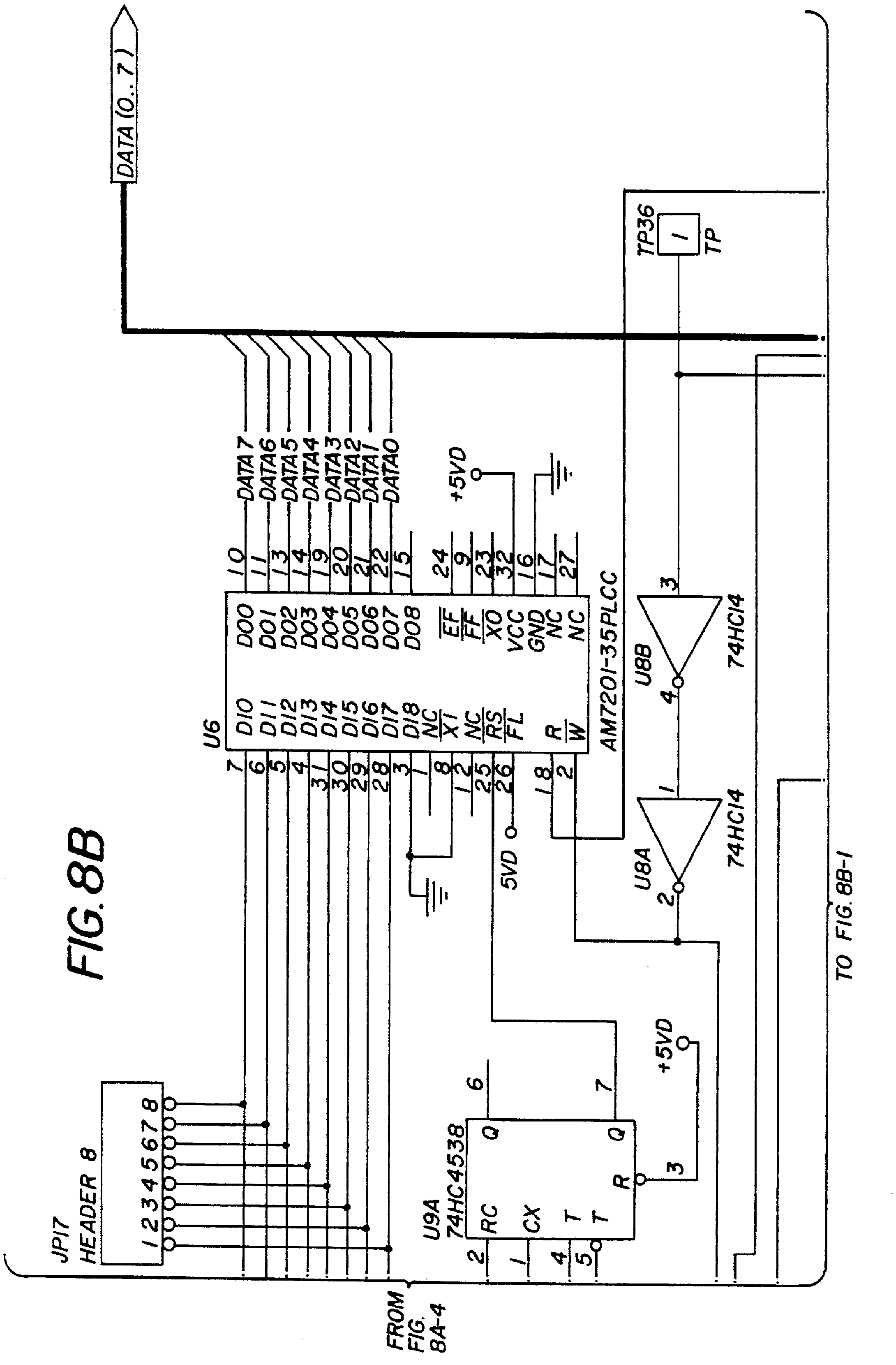
Figures 1, 8B:
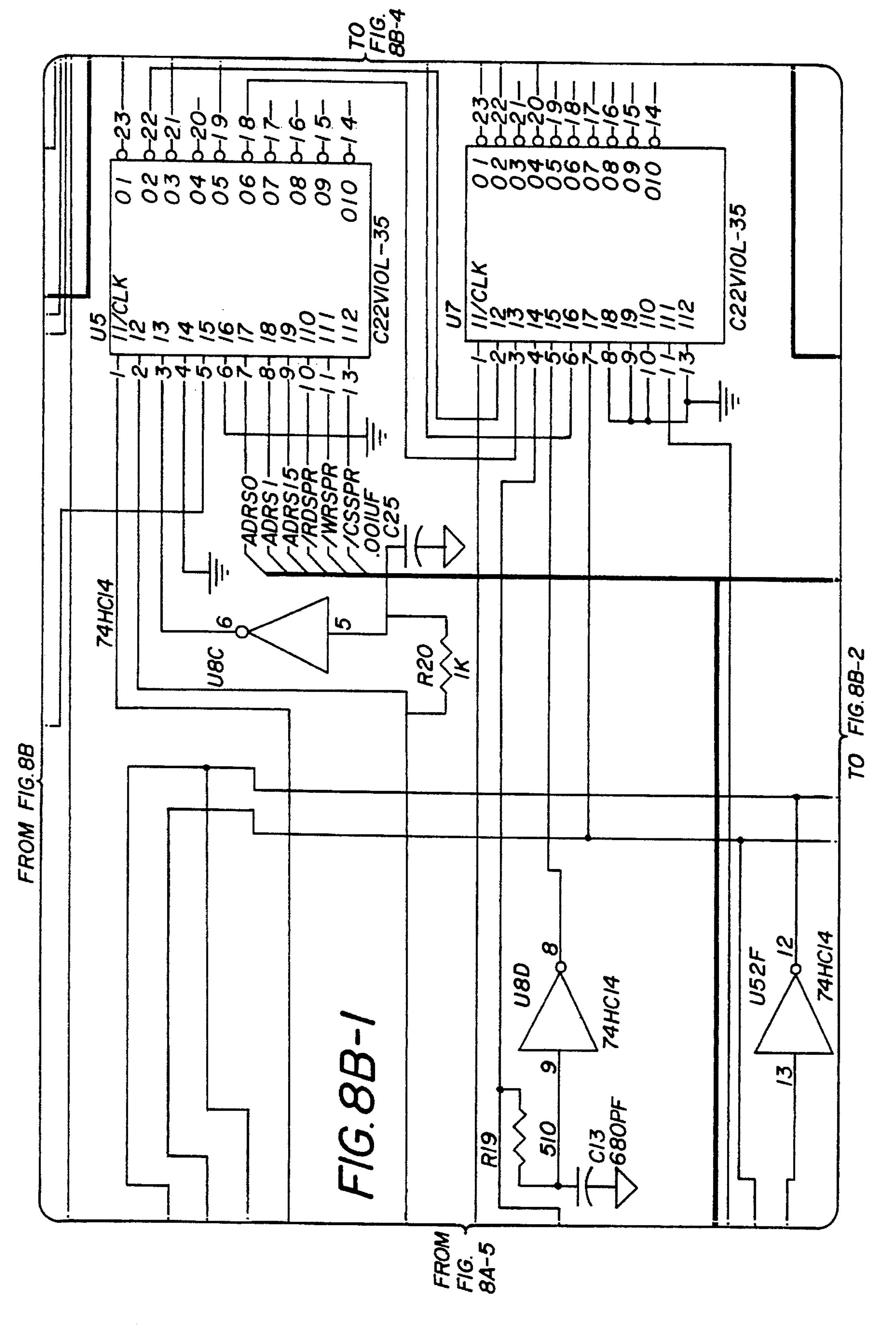
Figures 2, 8B:
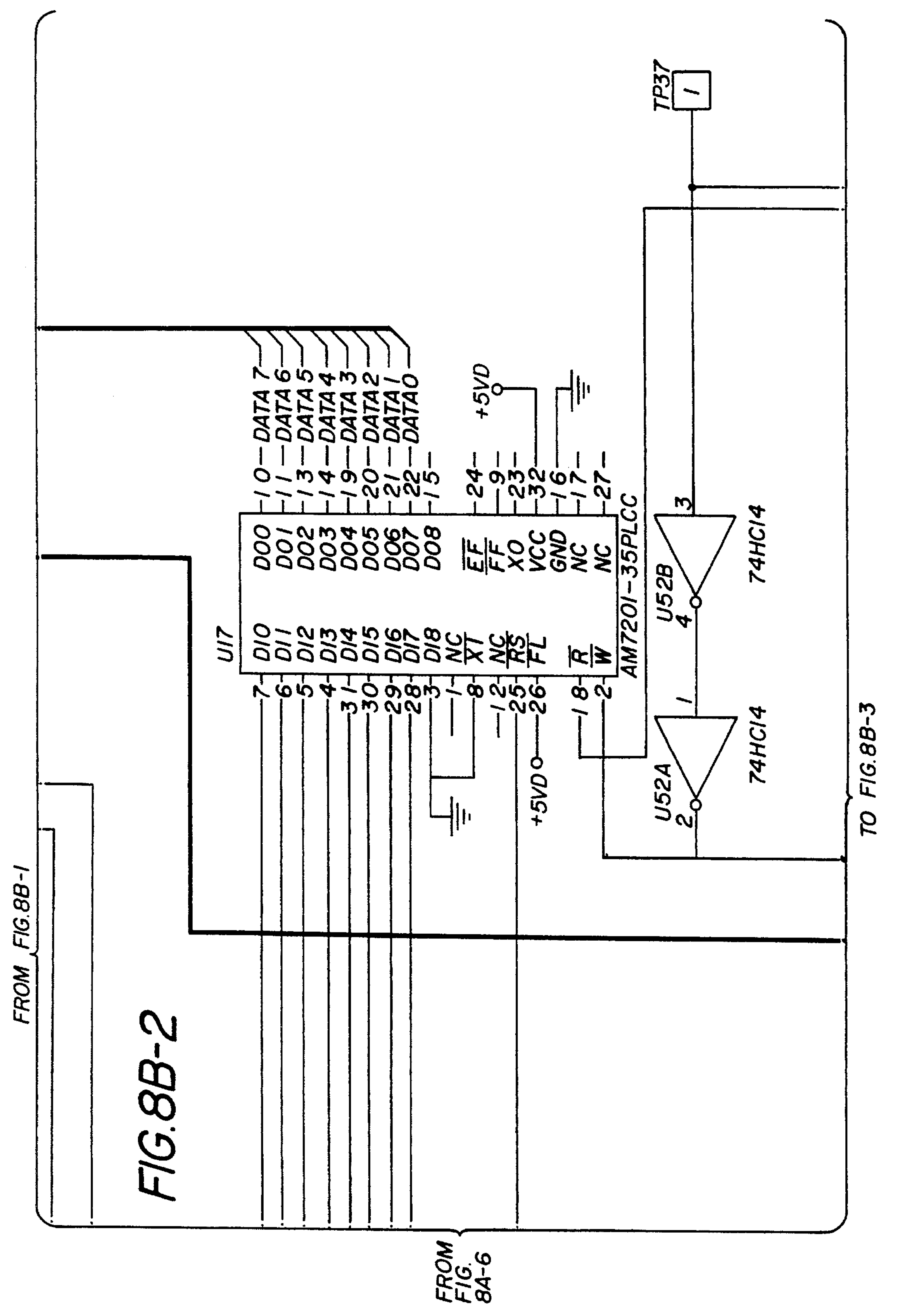
Figures 3, 8B:
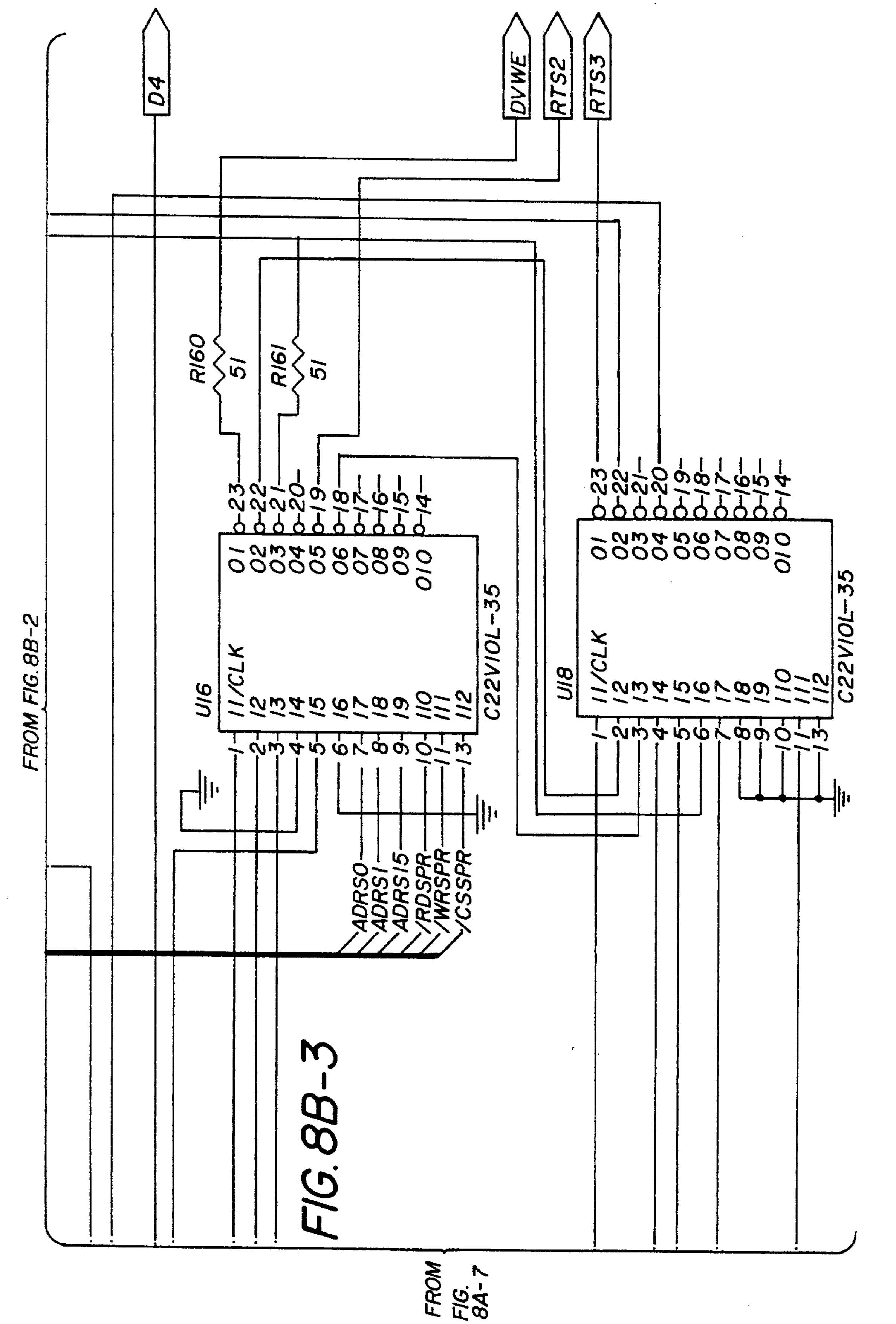
Figures 4, 8B:
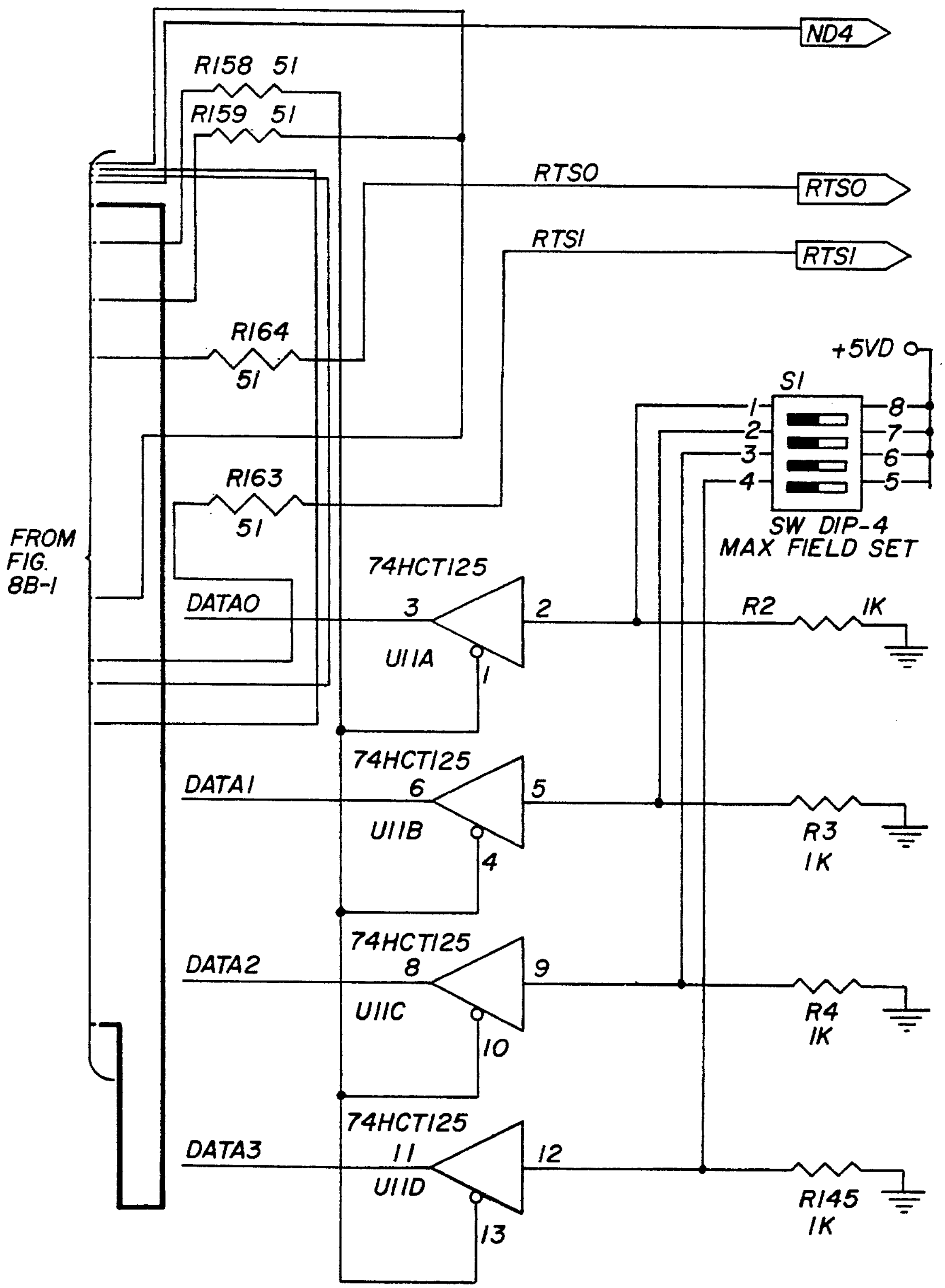

FIG. 8A and 8B comprise left and right hand portions of the third sheet of schematic drawings of the preferred embodiment of the invention. This circuit shows the A–D convertors for sampling the delayed and undelayed video from FIG. 6, FIFO and control logic for temporarily storing and supplying the digital samples to the SPROC, and PLL sync generators for providing various timing signals which are phase locked to the video and which allow sampling at known locations, for example within a circle as previously suggested. There are two very similar video A–D and PLL circuits occupying the upper and lower portions of these sheets of schematics. The upper portion will be described in detail and one skilled in the art will understand the lower portion from the description thereof.

Video is coupled to pin 19 of A–D convertor U4. Sampling clock is coupled to pin 12, and the A–D provides an 8 bit digital word corresponding to the sample at the data outputs on pins 3–10. The digital sample is written into a FIFO memory U6 where it is temporarily stored until it is read out on to the SPROC data bus to be transferred to the SPROC chip for processing.

Composite sync which has been separated from the video is coupled to PLL sync generator IC U3 on pin 11. U3 contains all PLL components to phase lock an oscillator on pins 5 & 6 to the comp sync signal, and provide a full compliment of phase locked video timing signals at its output. Of particular interest are clock output on pin 24, horizontal drive pin 22, vertical drive pin 21, and comp blanking on pin 17. These timing signals are coupled to Programmable Array Logic ICs U5 and U7 which provide control signals to the A–D, FIFO, SPROC, etc. in order to control the taking of samples of video and transferring those samples to the SPROC. ICs U5 and U7 utilize counters to count clocks and horizontal pulses in order to take samples at predetermined locations on the image. While one of ordinary skill in the art will be able to program PLDs U5 and U16, U7 and U18 the programs for the preferred embodiment is given in industry standard form below:

```
PALASM XPLOT, V2.23 - MARKET RELEASE (2-1-88)
(C) - COPYRIGHT MONOLITHIC MEMORIES INC, 1988
Title     : PIXEL DIVIDE BY 35/42 PR     Author  : XXXX
Pattern   : For IC U7/U18                 Company : PIXEL
Revision  : 03-16-94                     Date    : MARCH 14, 1994
PAL22V10
DIVIDE*
QP24*
QF5828*
G0*F0*
L0000 11111011111111111111111111111111111111111111*
```

L0044 11111111111111111111111111111111111111111111*

L0088 11111111111010111111111111111111111111111111*

L0132 11101111111111111111101111111111111111111111*

L0440 11111111111111111111111111111111111111111111*

L0484 11111111011011110111111111111111111111111111*

L0924 11111111111111111111111111111111111111111111*

L0968 11111111111111111110111110101111111111011111*

L1012 11111111111111111110111101111111111111101111*

L1496 11111111111111111111111111111111111111111111*

L1540 11111111111111111110111110101111111111011011*

L1584 11111111111111111110111101111111111111101011*

L2156 11111111111111111111111111111111111111111111*

L2200 11111111111111011110111111111101111111111111*

L2244 11111111111111011110111111111111110111111111*

L2288 11111111111111011110111111011111111111111111*

L2332 11111111111111011110111111111111111111011111*

L2376 11111111111111011101111011101110111011101111*

L2420 11111111111111011110110111111111111111111111*

L2904 11111111111111111111111111111111111111111111*

L2948 11111111111111011111110111111111110111111111*

L2992 11111111111111011111110111111101111111111111*

L3036 11111111111111011111110111111111111111011111*

L3080 11111111111111011111110111101110111011101111*

L3124 11111111111111011111111011011111111111111111*

L3652 11111111111111111111111111111111111111111111*

L3696 11111111111111011111111111101111110111111111*

L3740 11111111111111011111111111101111111111011111*

L3784 11111111111111011111111111011110111011101111*

L3828 11111111111111011111111111101101111111111111*

L4312 11111111111111111111111111111111111111111111*

L4356 11111111111111011111111111111110111111011111*

L4400 11111111111111011111111111111110111011101111*

```
L4444 11111111111111011111111111111110110111111111*
L4884 11111111111111111111111111111111111111111111*
L4928 11111111111111011111111111111111110111101111*
L4972 11111111111111011111111111111111110111011111*
L5368 11111111111111111111111111111111111111111111*
L5412 11111111111111011111111111111111111111011111*
L5808 0101100010*
L5818 1010101010*
CC639*
9375

PALASM XPLOT, V2.23 - MARKET RELEASE (2-1-88)
(C) - COPYRIGHT MONOLITHIC MEMORIES INC, 1988
Title     : 1'ST FIELD DETECTOR - IN      Author  : XXXX
Pattern   : U 5                        Company : Pixel
Revision  : 03-22-94                      Date    : JUN 21, 1993
PAL22V10
FFLAGIN*
QP24*
QF5828*
G0*F0*
L0000 11111111111101111111111111111111111111111111*
L0044 11111111111111111111111111111111111111111111*
L0088 11111111111111111111111110110111011110111110*
L0440 11111111111111111111111111111111111111111111*
L0484 11110111011111111111111111111111111111111111*
L0924 11111111111111111111111111111111111111111111*
L0968 11111111111111111111111101111011011110111110*
L1496 11111111111111111111111111111111111111111111*
L1540 11111111111111111111111110111011011111111010*
L2156 11111111111111111111111111111111111111111111*
L2200 11110111011111111111111111111111111111111111*
```

```
L2244 11111111111111101110111111111111111111111111*
L2904 11111111111111111111111111111111111111111111*
L2948 11111101111111111111111011111111110111111111*
L2992 11111101111111111111111011111101111111111111*
L3036 11111101111111111111111011111111111111011111*
L3080 11111101111111111111111011101110111011101111*
L3124 11111101111111111111111011011111111111111111*
L3652 11111111111111111111111111111111111111111111*
L3696 11111101111111111111111111110111111011111111*
L3740 11111101111111111111111111110111111111101111*
L3784 11111101111111111111111111110111011101110111*
L3828 11111101111111111111111111110110111111111111*
L4312 11111111111111111111111111111111111111111111*
L4356 11111101111111111111111111111111011111101111*
L4400 11111101111111111111111111111111011101110111*
L4444 11111101111111111111111111111111011011111111*
L4884 11111111111111111111111111111111111111111111*
L4928 11111101111111111111111111111111111011101111*
L4972 11111101111111111111111111111111111101101111*
L5368 11111111111111111111111111111111111111111111*
L5412 11111101111111111111111111111111111111011111*
L5808 0100011101*
L5818 1010101010*
CA6C5*
4E97
```

```
PALASM XPLOT, V2.23 - MARKET RELEASE (2-1-88)
(C) - COPYRIGHT MONOLITHIC MEMORIES INC, 1988
Title     : 1'ST FIELD DETECTOR - DE     Author   : XXXX
Pattern   : U 16                       Company : Pixel
Revision  : 03-22-94                     Date     : JUN 21, 1993
PAL22V10
```

FFLAGDLY*

QP24*

QF5828*

G0*F0*

L0000 11111111111101111111111111111111111111111111*

L0044 11111111111111111111111111111111111111111111*

L0088 11111111111111111111111110110111011111111010*

L0440 11111111111111111111111111111111111111111111*

L0484 11101110111111111111111111111111111111111111*

L0924 11111111111111111111111111111111111111111111*

L0968 11111111111111111111111110111011011110111110*

L1496 11111111111111111111111111111111111111111111*

L1540 11111111111111111111111101111011011111111010*

L2156 11111111111111111111111111111111111111111111*

L2200 11101110111111111111111111111111111111111111*

L2244 11111111111111101110111111111111111111111111*

L2904 11111111111111111111111111111111111111111111*

L2948 11111101111111111111111011111111110111111111*

L2992 11111101111111111111111011111101111111111111*

L3036 11111101111111111111111011111111111111011111*

L3080 11111101111111111111110111101110111011101111*

L3124 11111101111111111111111011011111111111111111*

L3652 11111111111111111111111111111111111111111111*

L3696 11111101111111111111111111011111101111111111*

L3740 11111101111111111111111111011111111110111111*

L3784 11111101111111111111111110111101110111011111*

L3828 11111101111111111111111111011011111111111111*

L4312 11111111111111111111111111111111111111111111*

L4356 11111101111111111111111111111110111111011111*

L4400 11111101111111111111111111111011110111011111*

L4444 11111101111111111111111111111110110111111111*

L4884 11111111111111111111111111111111111111111111*

L4928 11111101111111111111111111111111111011110111 1*

L4972 11111101111111111111111111111111111101101111 1*

L5368 11111111111111111111111111111111111111111111*

L5412 11111101111111111111111111111111111111011111*

L5808 0100011101*

L5818 1010101010*

CA6F2*

4EE9

It may be noted that U5 and U16 differ only in the decoding of the SPROC address bit ADRS0 so that the SPROC may individually read data from the delayed and undelayed channel.

The PLL sync generator IC additionally has control inputs X, Y and Z on pins 25–27 which can switch the part from NTSC to PAL operation under operator control, via Jumper JP20. The selection of NTSC or PAL operation is also coupled to the microprocessor on FIG. 9A.

The analog error voltage from the PLL of sync generator U3 is buffered by U2D and coupled to the window comparator U20 and U21 of FIG. 65 to generate the alarm signal in the event of loss of lock (which results in large error voltage excursions) as previously described.

Dip switch S1 on the right side of 85 is set by the operator to signify the maximum delay which the video signal may experience. For example, if the delay detector is utilized with an 8 field frame synchronizer, the switch is set to a binary 8 to signal the SPROC not to attempt to match any delay over this amount. This maximum delay setting is coupled to the SPROC bus by tri-state buffer U11 in response to a read command from the SPROC as decoded by U5. Switch 1 is the MSB and an on position corresponds to a one.

In operation, nine active video pixels are taken from each of seven video lines of each field, the seven lines being spaced 35 lines apart for NTSC and 42 lines apart for PAL. The samples are stored in the FIFO until all samples for a line are ready, and then PAL U7 outputs a FIFO data ready flag (RTS1) to SPROC. SPROC then reads the data for that line and clears the flag. In addition, PAL U5 outputs a field flag (RTS0) to SPROC. SPROC in turn writes a clear to U5 to clear the field flag. In this fashion, SPROC receives both sample data from known lines and field flags from each input video signal.

It should be noted that VR3 is not normally installed. This adjustment is used to match the phase of the sampling of the non-delayed PLL to match the phase of the sampling of the delayed PLL so that the first sample of the line is taken from the same position on the line. In practice it has been found that the PLLs match quite nicely and such adjustment is unnecessary.

Figure 9:
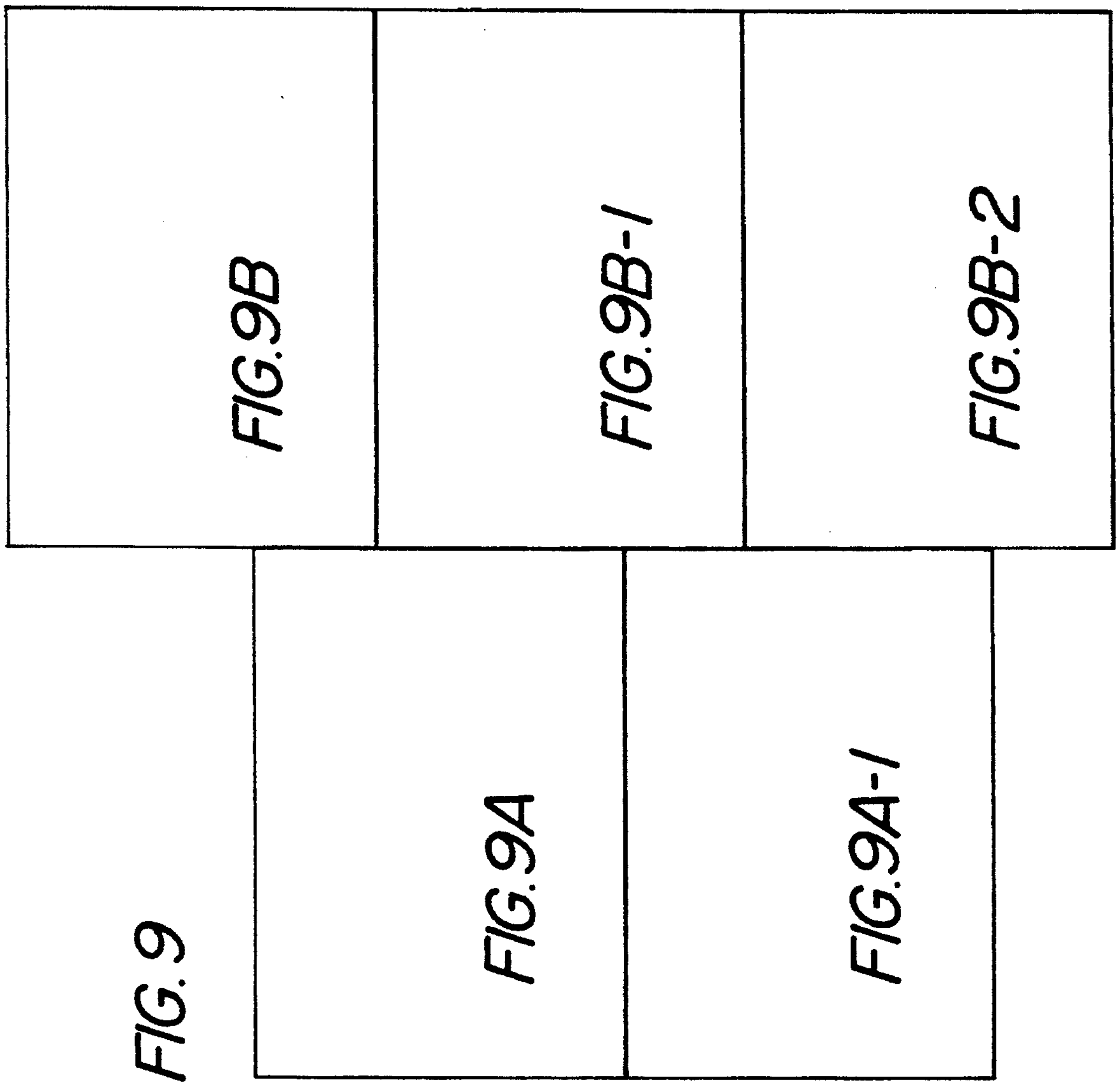
FIG. 9A is a seventh schematic drawing of the preferred embodiment of the invention.
FIG. 9B is a eighth schematic drawing of the preferred embodiment of the invention.
Figure 9A:
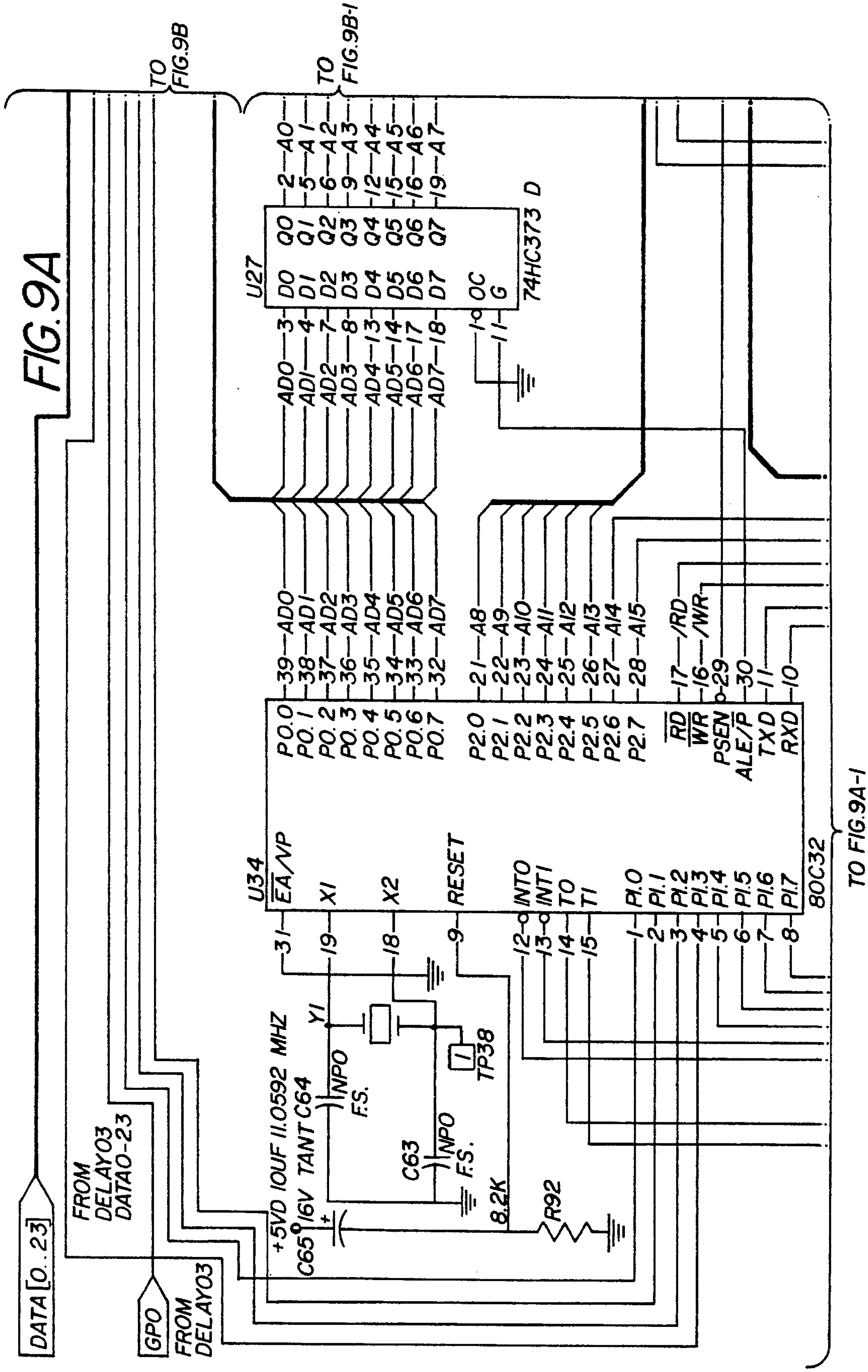
Figures 1, 9A:
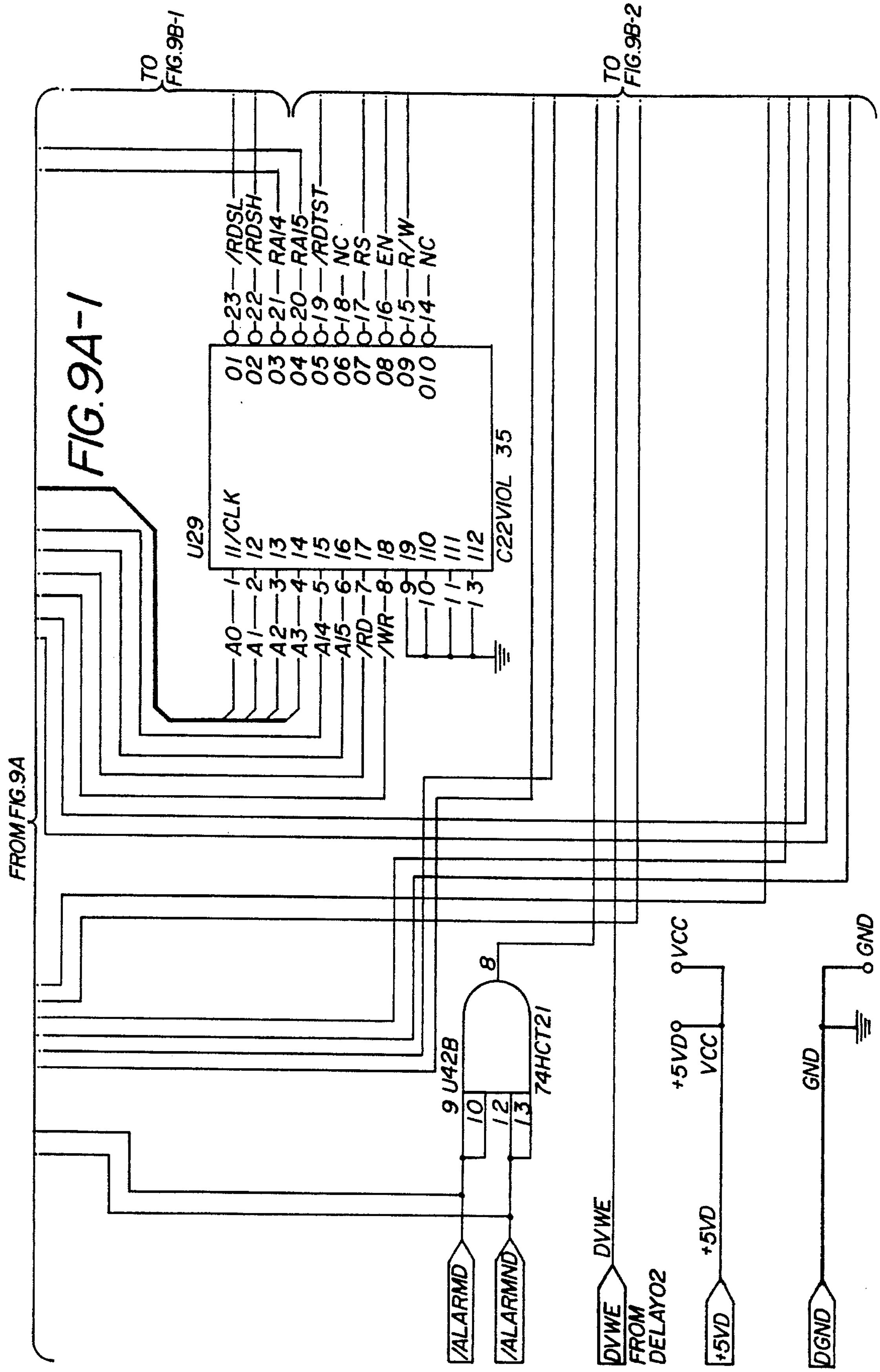
Figure 9B:
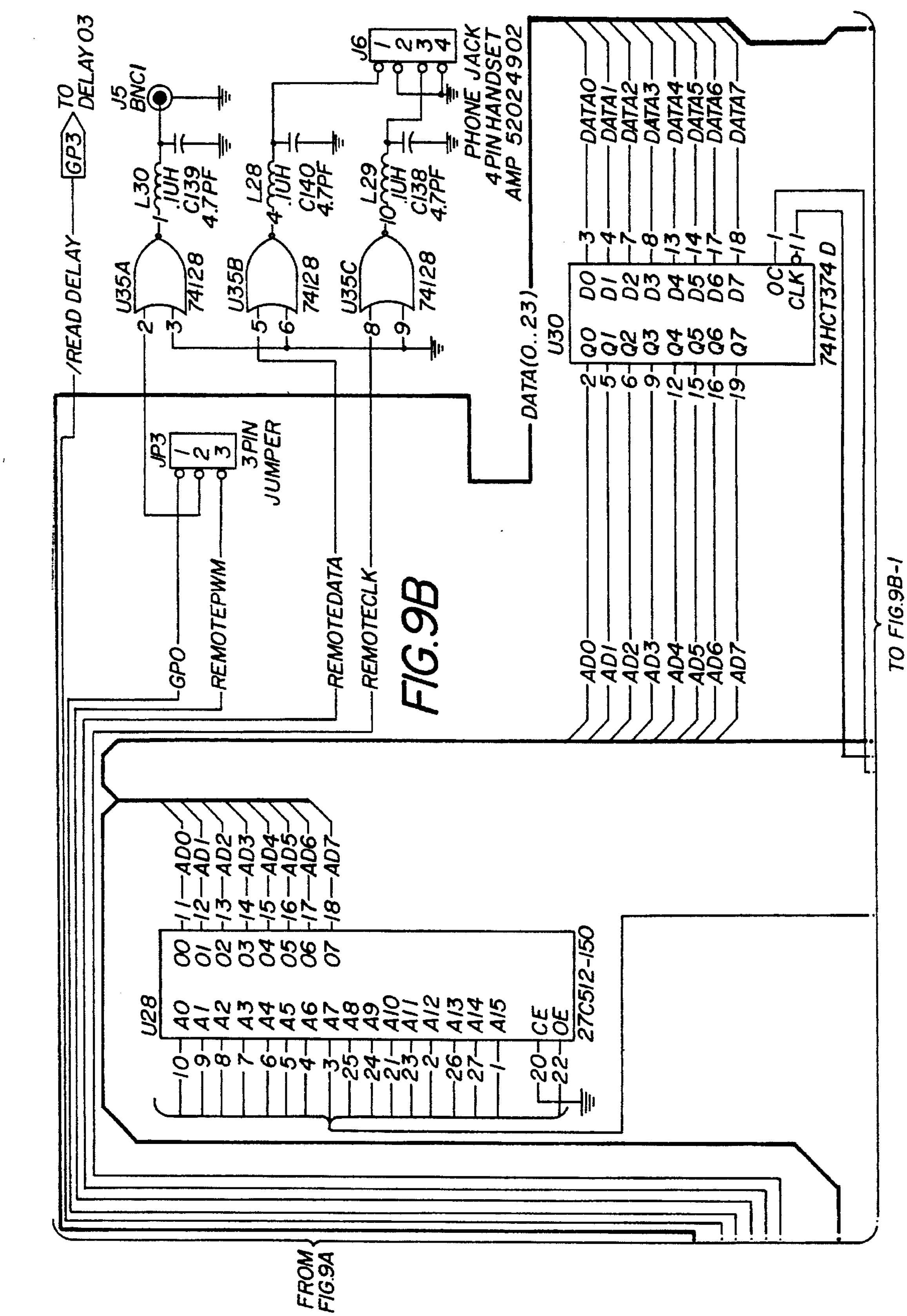
Figures 1, 9B:
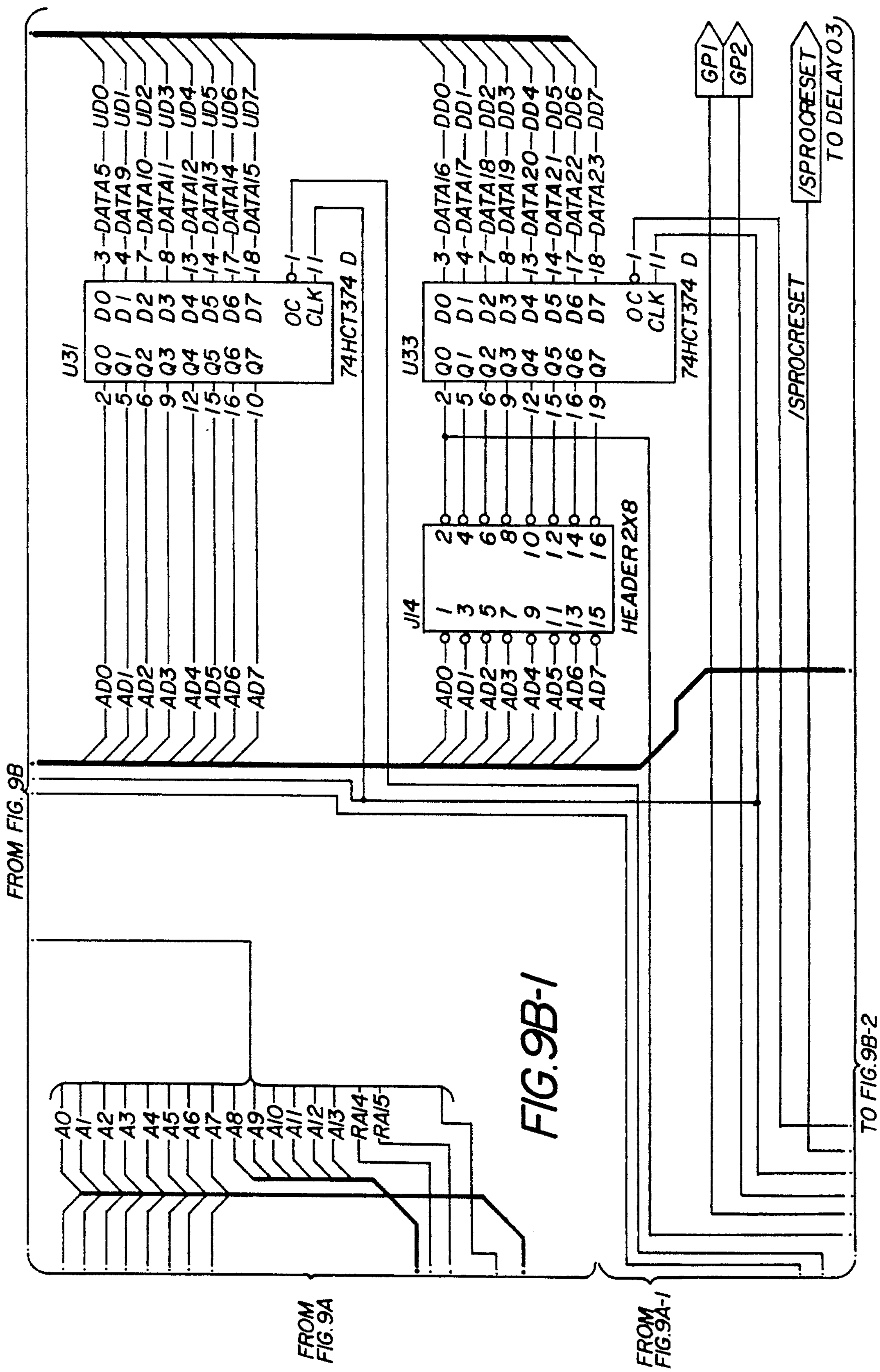
Figures 2, 9B:
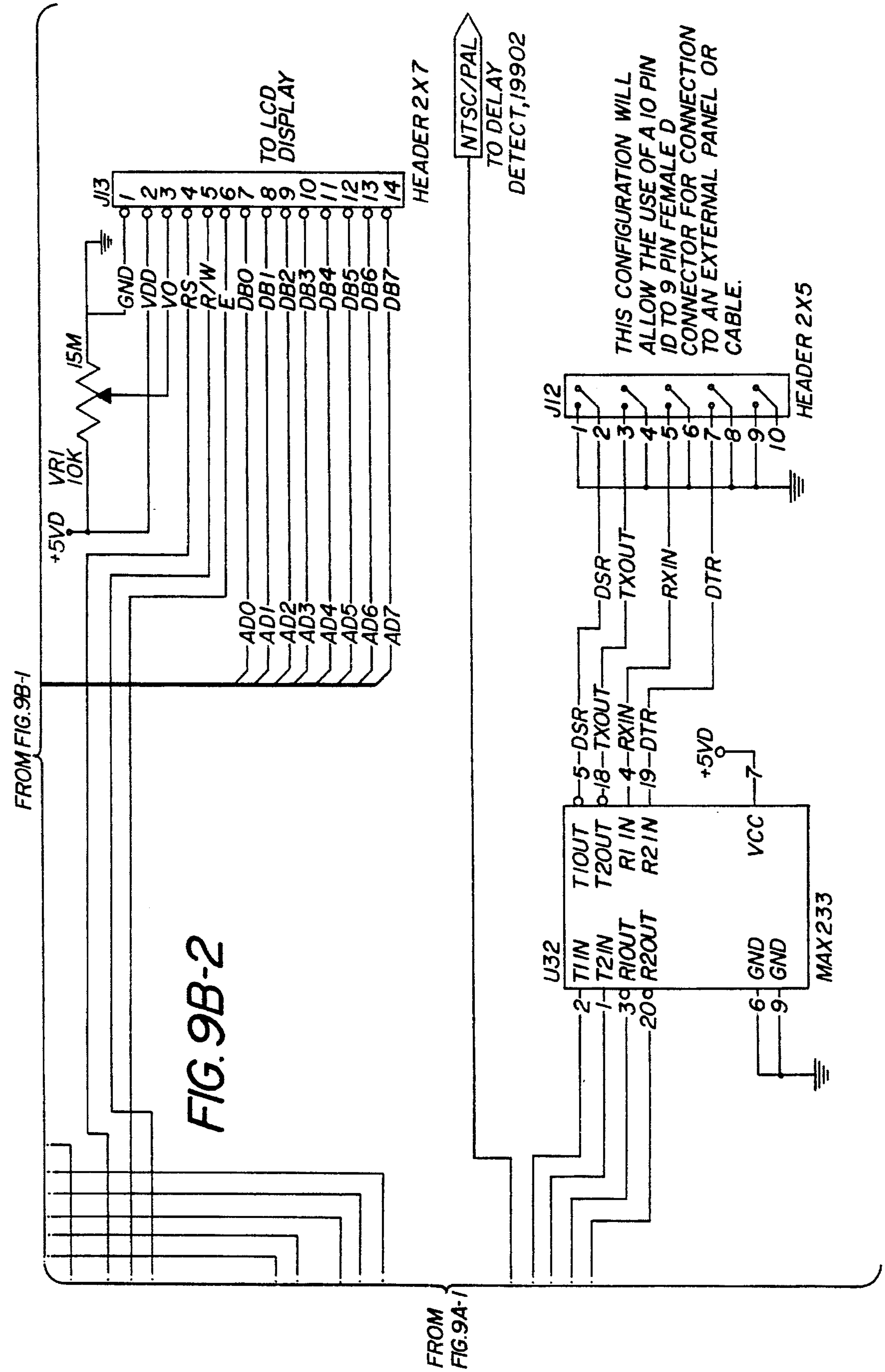

FIG. 9A and 9B comprise left and right hand portions of the fourth sheet of schematic drawings of the preferred embodiment of the invention. This sheet of schematics shows the control and operator interface microprocessor. The 80C32 general purpose microcontroller (microprocessor) U34 operates to receive information from the SPROC and the two alarms and provides delay information output via pulse output JS, serial data output J6 and to a LCD display via J13. The LCD display is manufactured by Optrex, part number DMC20261NYLYB. This component, as well as all of the other components of FIGS. 6–9 are available from numerous electronics component distributors, and one of ordinary skill in the art will be able to easily procure these parts.

EPROM U28 stores the operating instructions (program) for U34 and latches U27, U30, U31 and U33 operate to latch data and transfer it to and from the U34 data and address bus under control of Programmable Array Logic IC U29. While one of ordinary skill in the art will be capable of generating a suitable program for U29, the JEDEC file for U28 for the preferred embodiment of the invention is given below in industry standard form:

```
CUPL        3.2a Serial# MD-32A-6506
Device      p22v10 Library DLIB-h-25-17
Created     Tue May 03 08:34:44 1994
Name        delay-1
Partno      xxxxxx-000
Revision    01
Date        03/31/94
Designer    xxxxxx
Company     xxxxxx
Assembly    xxxxxx
*QP24
*QF5828
*G0
*F0
*L00032 00000000000011111111111111111111
*L00064 11111111111111111111111110111011
*L00096 10111011011111111011111111111111
*L00128 11110000000000000000000000000000
*L00416 00000000000000000000000001111111
*L00448 11111111111111111111111111111111
*L00480 11110111101110111011011111111011
*L00512 11111111111111110000000000000000
*L00896 00000000000000000000000000001111
*L00928 11111111111111111111111111111111
*L00960 11111110000000000000000000000000
*L01472 00000000000000000000000001111111
*L01504 11111111111111111111111111111111
*L01536 11110000000000000000000000000000
*L02144 00000000000011111111111111111111
*L02176 11111111111111111111111111111111
*L02208 11111111111111111111111111111111
*L02240 11110000000000000000000000000000
*L03648 00001111111111111111111111111111
*L03680 11111111111111110111011101111011
*L03712 01111111111111111111111111110000
*L04288 00000000000000000000000001111111
*L04320 11111111111111111111111111111111
*L04352 11111110111011110110111111111011
*L04384 11111111111111111111011101111011
*L04416 01111111111110111111111111110000
*L04864 00000000000000000000011111111111
*L04896 11111111111111111111111111111111
*L04928 10111011101101110111111111111011
*L04960 11111111111111111111111111111111
*L04992 11110111111111101111111111111111
*L05024 11111011111111111111111111011111
*L05056 11111111111101111111111111111111
*L05088 11111011111111111110111111111111
*L05120 11111111111111111011111111110111
*L05152 11111111111111111111111111111101
*L05184 11111111111111111111111110111111
*L05216 11111111101111111111000000000000
*L05792 00000000000000001011111101001111
*L05824 1100
*C7195
*9500
```

U29 decodes reading and writing requests from U34, thus providing the necessary enabling controls for the various input and output registers and devices.

The program for the operation of U34 is stored in EPROM U28 and is read at appropriate times in cooperation with U29. While one of ordinary skill in the art will be capable of generating a suitable program for U34, the EPROM code for U28 for the program for the preferred embodiment of the invention is given below in Intel Hex format:

```
:030000000200F902
:030003000200C236
:03000B0002001ED2
:030013000200DF09
:10001B00020094758CDCC0D0C0E0053CE53CB4001C
:10002B0002053D053EE53EB40002153E0519E519F6
:10003B00B43202D204B4641BD201751900051AE55F
:10004B001AB43C0F751A00051BE51BB43C05751B58
:10005B0000051C30052E209129D291C3E54633F5BE
```

-continued

```
:10006B0046E54533F545E54433F544E54333F54380
:10007B00B392920542E542B4300AC20575420002C2
:10008B00008FC291D0E0D0D032C0D0C0E01537E5A0
:10009B0037B4FF021538E537453870162090 0BD270
:1000AB0090753764753800020 0BDC2908535378571
:1000BB003638D0E0D0D032C0D0C0E0E4F53E0510E9
:1000CB00E510B400037510FFB40A004002D20AD049
:1000DB00E0D0D032C0D0C0E0E53EB4C800400AD278
:1000EB000037512007510 00C20AD0E0D0D032E4784C
:1000FB007FF6D8FD758150758921758DA2758BA200
:10010B00D28CD2A9D2AFD292D291754200753764FC
:10011B00753800D290D2BBD28ED2AB120515120518
:10012B00249040067438F01204E11204FB9003B1E2
:10013B002097039003D91204893001FDC2013001CD
:10014B00FD1204FBD288D28AD2AAD2A8C293020291
:01015B0000A3
:10020000E511B40010300442C204D2937511017597
:100210001F0002024AB4013230932F051FE51FB4BC
:100220000A0040267511009040 00E0F5349040012E
:10023000E05407F533C29312031ED2927543018531
:100240003344853445754600D205300325300122FC
:100250000751A00751B00751C00C20112033774402B
:1002600012058D90040E12048E0512E512B40102DF
:10027000C203A2B4B39208A2B5B39209200103024B
:100280000031CC201E5217003020312E532701174F0
:100290000220090A7403200A057401200800F532BF
:1002A00030020B12033712035AC20202031CD2029D
:1002B000E532B401030202C4B402030202D3B40360
:1002C000410202E290043712047320092920 0A2116
:1002D00002030290044B120473200A1520081C022A
:1002E000030290045F12047320081020090802031F
:1002F0000274030202FD74020202FD7401F532026F
:100300000030F20080A200907200A047400F53202AE
:10031000031C7400F53212033712035A41007D2882
:10032007C00AB33AA341210627583277582D81211
:1003300010008936883522900401120489740812 4D
:10034000058D120394EA70111205E51205A17410CF
:1003500012058D900409120484229004231204736 0
:10036000744C12058DA81C79001205E5E5391205BB
:100370006B743A1205D2A81B79001205E5E5391213
:10038000056B743A1205D2A81A79001205E5E53911
:1003900012056B227D047C00AB33AA341210627408
:1003A000F428F8740139F9E43AFA9003E8121000DD
:1003B00022202020202050495845 4C20204E545343A1
:1003C000202020202020444432313030 20434F4E22
:1003D00054524F4C4C455220202020202050495848
:1003E000454C20202020504 14C2020202020204444F7
:1003F00032313030 20434F4E54524F4C4C455220F6
:100400002044656C61793A20005365632E00202AF0
:100410002A2A2A4E6577205570646174652A2A2A33
:100420002A20004C617374205570646174652020 2B
:10043000202020202020204 16C61726D3A20446CE5
:10044000792764205669646 56F2020416C61726D64
:100450003A20556E646C79276420566964656F573D
:1004600041524E3A204D617820446C79205377698F
:10047000746368C083C082744012058DD082D083BB
:1004800012048E2278290204997829020490781 5A2
:100490001204D41205081204D418E8B41403020498
:1004A000A40204B61204D41205151205249040 06C5
:1004B00074C0F01204D4B4000122E493B4000281A9
:1004C000B91204D4120515120524904007F0120445
:1004D000D4A38199C583C531C583C582C530C58282
:1004E00022120515120524904006740CF022120504
:1004F00015120524904006740EF0221205151205FF
:1005000024904006740 1F02212051512052490403 3
:10051000067402F022C0E0120530904006E020E7A9
:10052000F6D0E022C0E0904008E0000000D0E022D9
:10053000C0E0904008F0000000D0E022B43A02741D
:1005400041B43B027442B43C027443B43D0274446F
:10055000B43E027445B43F02744622748E020562B2
:1005600074CEB115B124904006F022F5F054F0C4D9
:100570002430B13CB115B124904007F0E5F0540FA0
:100580002430B13CB115B124904007F022448012D0
:100590000598740C12059822B115B124904006F00C
:1005A00022743012 05D0742E1205D0E53A1205DB04
:1005B0001205D0E53A1205E11205D0E5391205DB46
:1005C0001205D0E5391205E11205D022540F24306E
:1005D000B13CB115B124904007F02254F0C424304E
:1005E00022540FA1DE753900753A00753B00E9FB16
:1005F000E8FA7911C3120603D90122EA33FAEB3380
```

-continued

```
:10060000FBA1F5E5393539D4F539E53A353AD4F574
:090610003AE53B353BD4F53B22F1
:10100000E4FCFDFEFF75F020C3E833F8E933F9EAAC
:1010100033FAEB33FBEC33FCED33FDEE33FEEF3311
:10102000FFEC9582C0E0ED9583C0E0EE9400C0E057
:10103000EF9400C0E0401EE82401F8E93400F9EA2A
:101040003400FAEB3400FBD0E0FFD0E0FED0E0FD4E
:10105000D0E0FC015DD0E0D0E0D0E0D0E0D5F0A859
:10106000EC22E4F8F97E10C3E833F8E933F9EA3307
:10107000FAEB33FB5010E82CF8E93DF9EA3400FABA
:09108000EB3400FB4002DEDF222C
:00000001FF
```

Data interface to SPROC occurs via bus DATA[0 . . . 23] with latches U30, U31 and U33 storing data from SPROC and then transferring the data to U34 at the appropriate time. An external monitoring device or other control may be coupled to the micro-controller via an RS-232 type serial port provided by U32 and J12 to implement additional features and operations.

The controller section reads the measured delay data from the SPROC and converts this data to the aforementioned output formats, as well as displaying the messages on the LCD control panel. U34 requests parallel delay data from the SPROC, the SPROC then writes data to registers for use by the micro. Video alarms/ALARMND and/ALARMD are also read, and in addition the micro reads line GP1 from the SPROC to indicate a new delay update. The micro generates delay, alarm and update information to the LCD and also calculates and displays the elapsed time since the last update.

Line driver U35A buffers the TTL pulse and outputs it to J5. Line drivers U35B and U35C buffer the serial remote data and clock from U34 and outputs these signals via J6. These serial signals convey the delay amount in binary code and may be utilized by other processing equipment.

Figure 10:
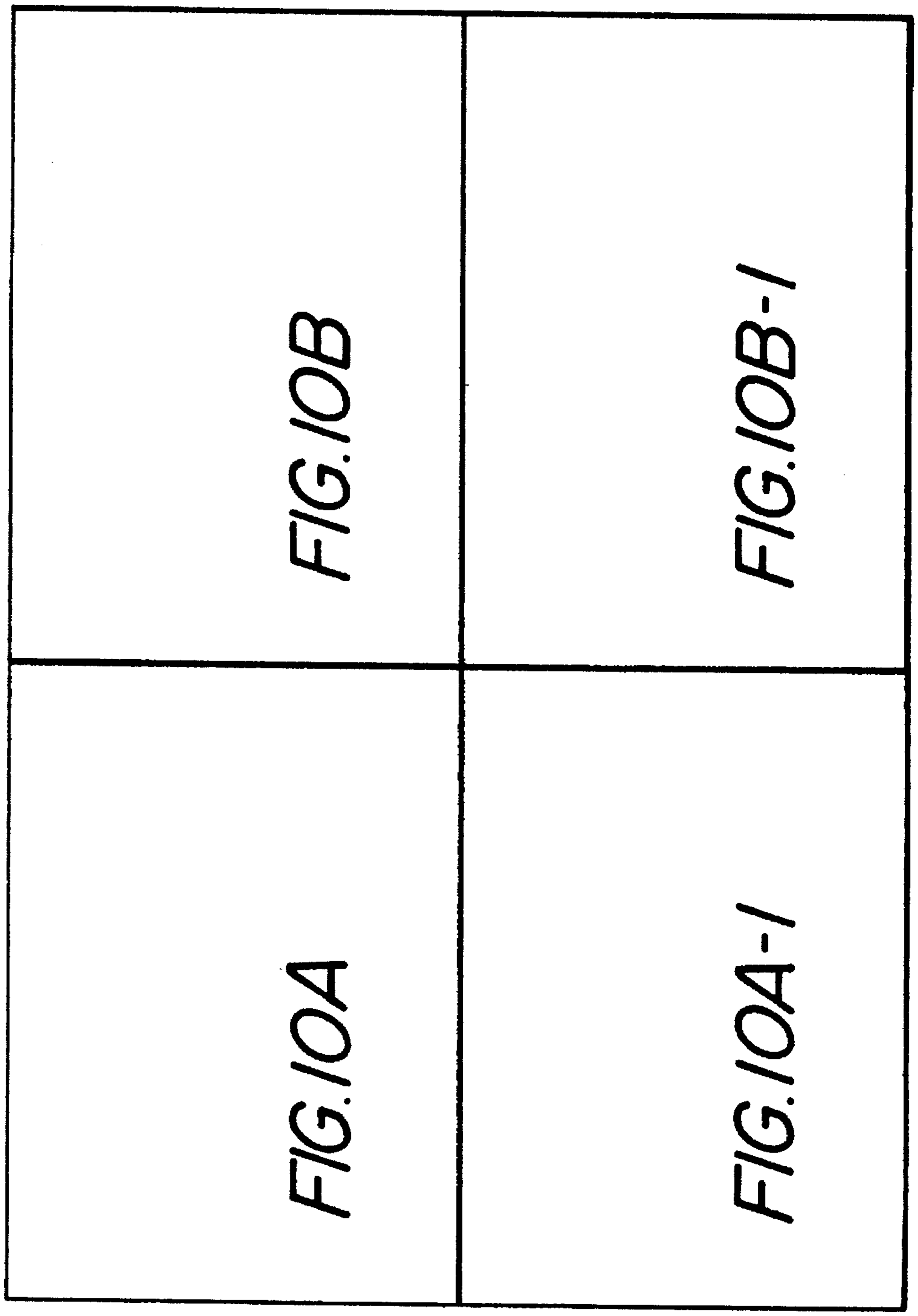
FIGS. 10A and 10B are a graphical representation of the DSP operation of the SPROC IC.
Figure 10A:
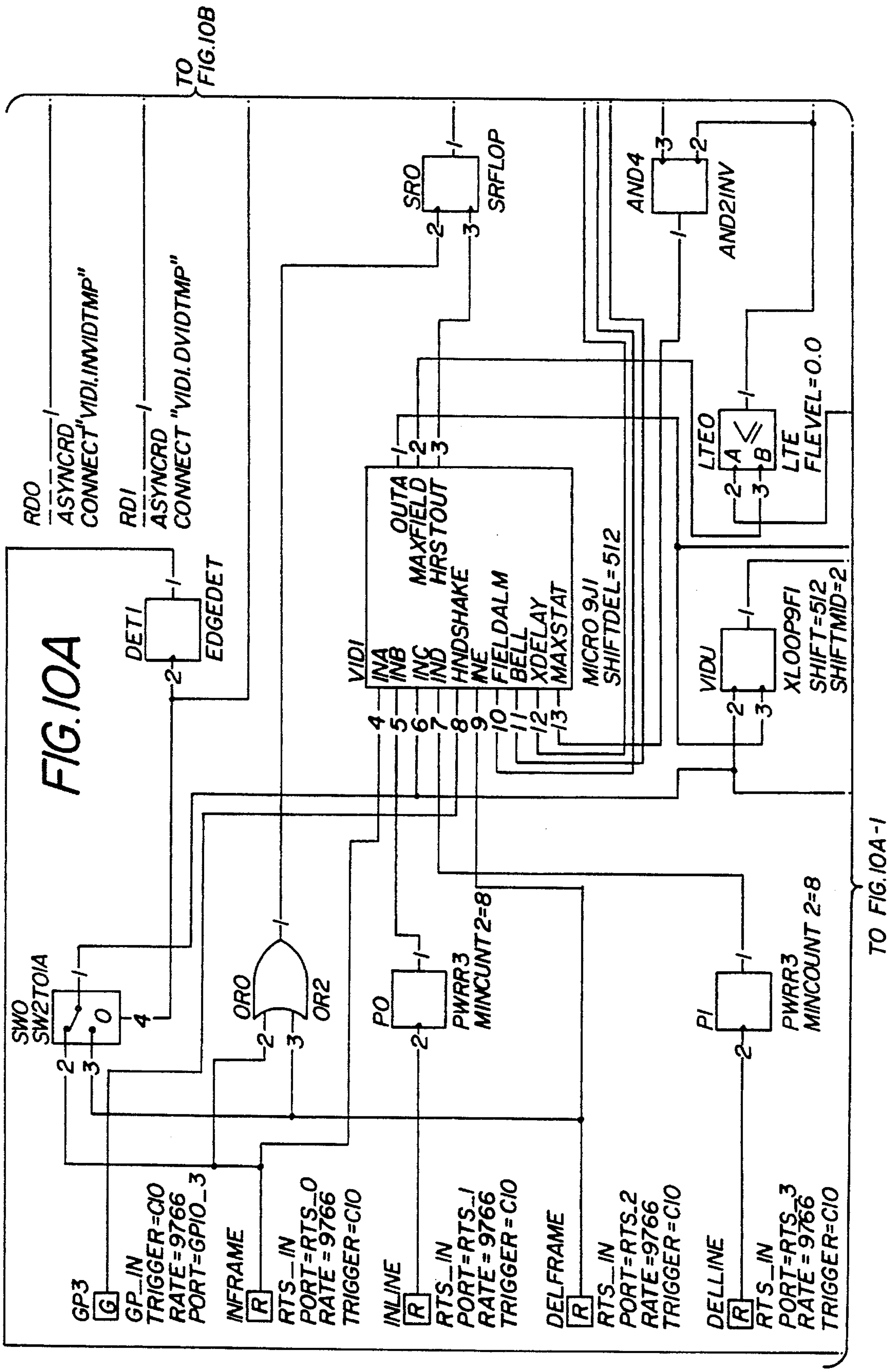
Figure 10B:
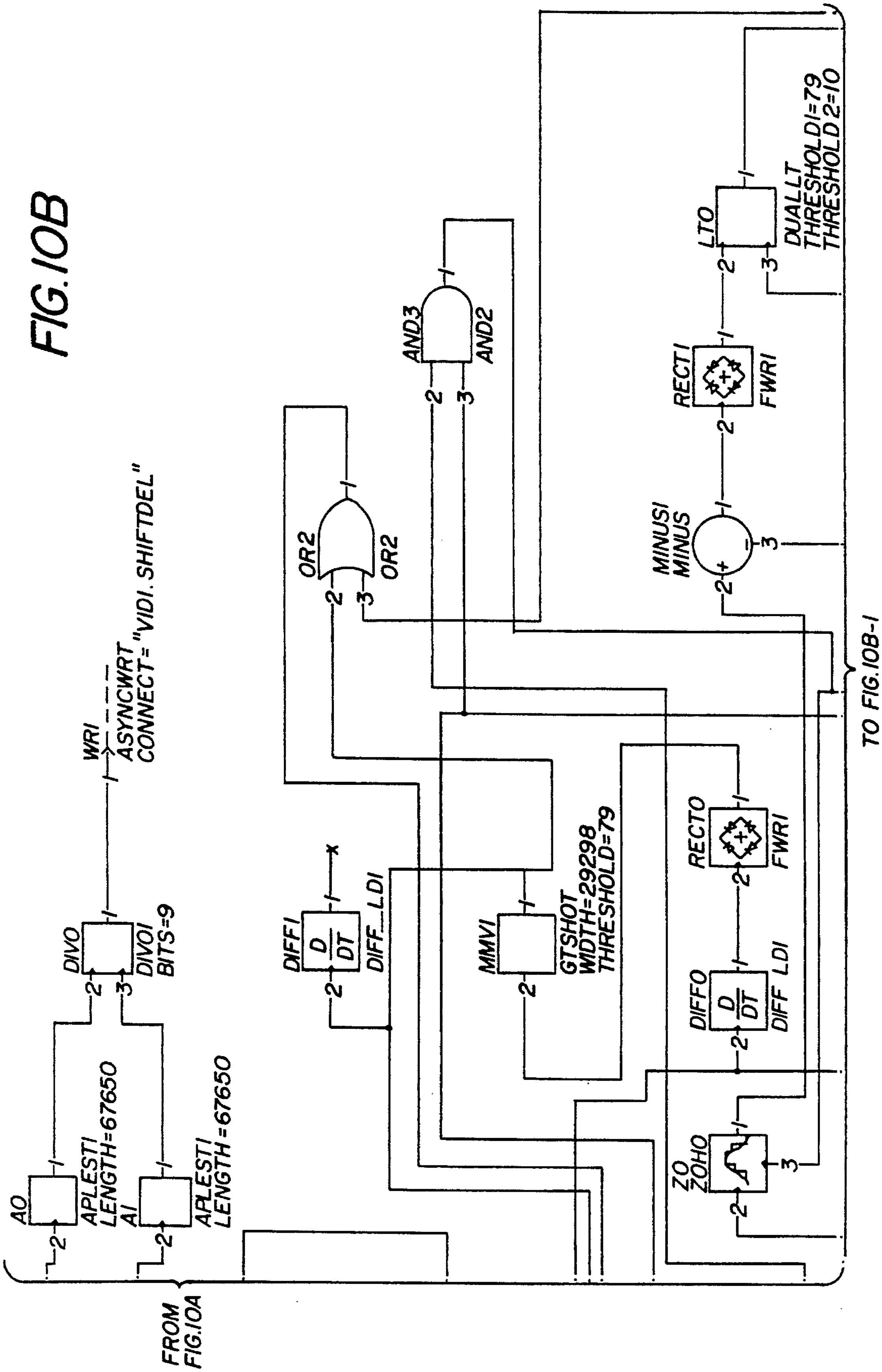
Figures 1, 10B:
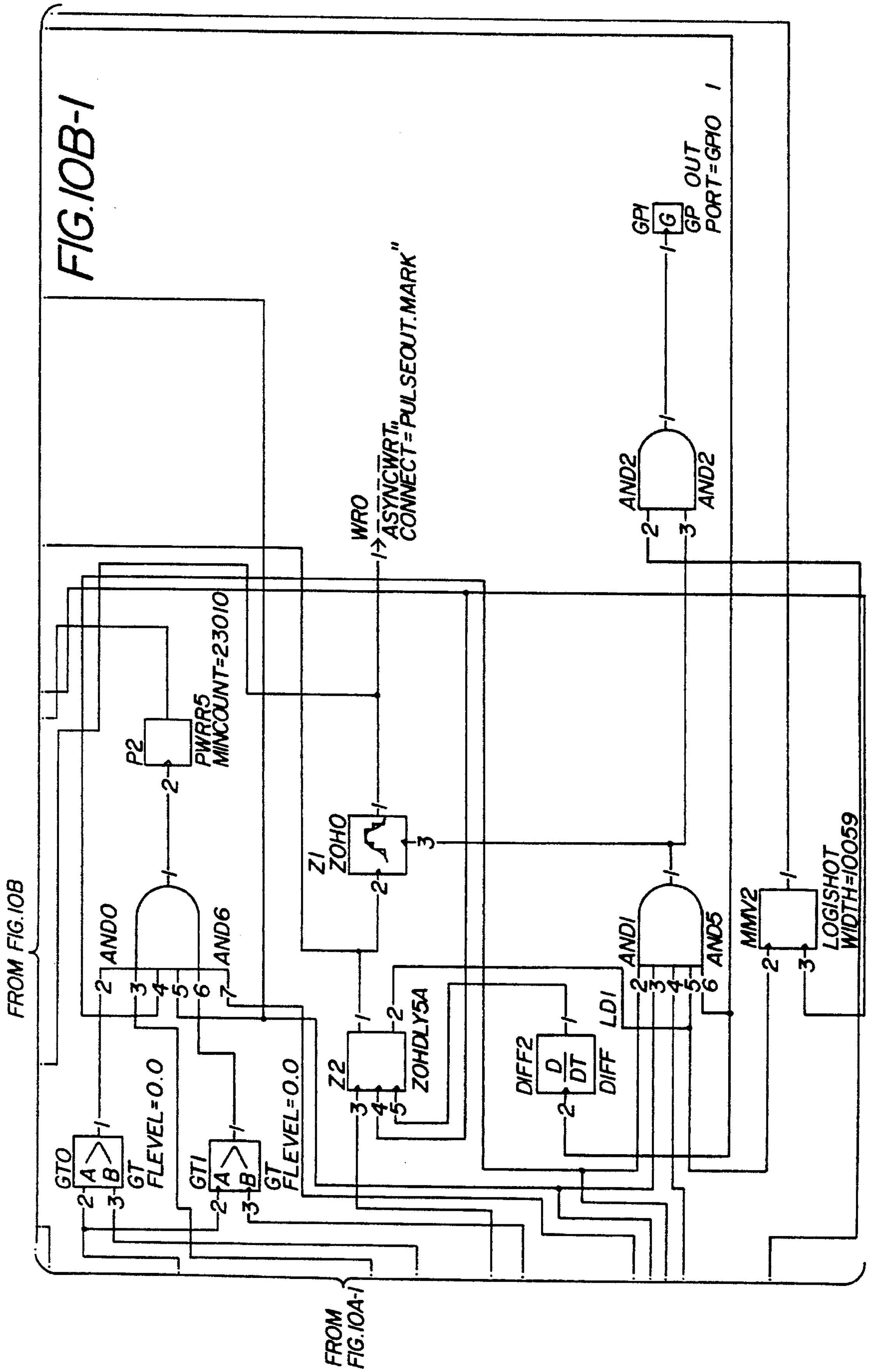

FIG. 10, comprised of sheets 10A and 10B is a graphical representation of the operation of the SPROC DSP IC in the preferred embodiment of the invention. Several novel features of the preferred embodiment will now be described in some detail with respect to this graphical representation with each block (or "cell") representing the hardware operation caused to be implemented in the SPROC by a segment of code stored in the U37 EPROM.

Cell VID1 is the main timing and control cell. Also embedded within VID1 are all parallel port bus reads and writes. VID1 obtains non-delayed field, non-delayed line, delayed field, and delayed line flags from cells INFRAME, INLINE, DELFRAME, and DELLINE, respectively. These latter four cells read the hardware lines RTs0 through RTS3, respectively. Cells P0 and P1 remove double-clocking (resulting from the asynchronous relationship between the COMPUTE0 clock and the video H rate) from the line flags.

Processing operates on an 18 field cycle. This is preferred since it accommodates an 8 field delay which is the maximum expected from a large percentage of equipment in use today, however other cycle lengths can be implemented as well from the teachings herein. VID1 numbers non-delayed fields 1 through 18. Delayed fields are also numbered 1 through 18, beginning with the first delayed field flag coincident with or lagging the first non-delayed field flag. VID1 counts and stores the delay of each delayed field relative to non-delayed field one. At each flag from cell INLINE, VID1 begins reading and storing the nine 8 bit pixels from that indicated line, via the parallel port. Sample accuracies other than 8 bits may be utilized as well. Nine pixels from seven lines from 18 fields, totaling 1134 points, are stored in the SPROC internal 24 bit word-width data RAM, although other numbers of samples may be used as well. The data is packed three bytes to a word, so 378 RAM locations are used. At each flag from cell DELLINE, VID1 begins reading the nine 8 bit pixels from that indicated line. As outlined more fully below, a novel operation whereby each delayed video pixel is processed and discarded before the next one is used, although this is a particular design implementation and other ways of performing the required tasks will be apparent to one of ordinary skill in the art from the teachings herein.

The hardware resets the line flags in response to pixel read activity. VID1 resets the field flags by writing specific locations with the parallel port. VID1 reads the Maximum Expected Delay DIP Switch, and makes that data available. VID1 outputs the measured delay number to the microcontroller registers. Diagnostic indicators are also output, to a separate register.

It is called to attention that delay counting errors can result from the asynchronous relationship between the COMPUTE clock and the video rates, when the non-delayed and delayed fields are close to alignment. This is especially true if there is some jitter on one video or the other. Hysteresis is preferred to be used to prevent this problem occurrence, although other methods of prevention may be used as well. Cell OR0 detects simultaneous field flags, and sets flip-flop SR0. SR0 controls switch SW0, and causes both field flags to be taken from the nondelayed video. This persists until counters in VID1 detect a minimum of ±2 count difference between the two actual field flags, at which point SR0 is reset. Thus, a maximum hysteresis magnitude of one count is suggested to be used, but other counts may also be utilized.

Cell VIDU performs correlation. Each data point (sample) from Delayed Field 1 is subtracted from it's counterpart from Non-Delayed Field 1. The result is squared, (this effectively removes the sign as could be done by taking the absolute value or other method) and accumulated in the zeroeth error vector location. Other comparisons of samples may be performed as well and although the correlation described is a particularly efficient implementation of the comparison, other ways of performing this comparison of the samples or even of the images will be apparent to one of ordinary skill in the art from the teachings herein, and may be resorted to meet particular needs for specific applications of the invention.

Delayed Fields 2 through 10 data is also correlated with Non-Delayed Fields 2 through 10 respectively, and the results accumulated in the error vector zero location (vector zero is the first vector). Each data point from Non-Delayed Field 1 is similarly correlated with it's image location counterpart from Delayed Field 2, 3, etc. for all possible delay positions and the results accumulated to the appropriate error vector location, for example samples from Non-Delayed field 1 through 10 are compared to Delayed 2 through 11 and are accumulated in the error vector one location (error vector 1 is the second vector). This process of comparing each sample with its corresponding samples continues until the samples of Delayed Fields 9 through 18 are correlated respectively with Non-Delayed Field 1 through 10, and the results accumulated in the eighth error vector location. All correlation associated with a given delayed pixel is performed immediately upon receipt of each delayed pixel, so that storage of an array of delayed pixels is not required and only the undelayed samples are stored. The reverse may of course be performed if desired. In the preferred embodiment it is chosen that 8.99 fields is the maximum measurable delay, so no correlation is performed more than eight field numbers apart. In addition, error vector accumulators are reset to zero before the beginning of each cycle. Therefore, each of the nine error vector locations represents the same number of accumulated squared-difference points. Other lengths may be chosen as well and although this is a particularly novel and efficient design implementation, other ways of performing the required tasks will be apparent to one of ordinary skill in the art from the teachings herein.

When program material motion or scene changes are present, the error vector location with the smallest accumulated result will tend to indicate the delay in numbers of fields. This occurrence was previously described with respect to FIG. 3, and cell VIDV performs a similar comparison function to that described. It operates on Non-Delayed Fields 10 through 18, plus Non-Delayed Field 1 from the next cycle, and Delayed Fields 10 through 18 of the current cycle, plus Delayed Fields 1 through 9 of the next cycle. Results are accumulated to a separate error vector.

VID1 resets the field counters at the first field after field 18, and the 18 field cycle repeats. Thus, two independent overlapping correlation operations occur for each 18 field cycle. This effectively results in a continuous correlation operation, so that even isolated scene change events may always present a measurement opportunity.

VIDU and VIDV alternately complete correlation operations at nine field intervals. At each completion, a trigger pulse is sent to cell MIN3. MIN3 sorts the appropriate error vector, and determines the values of the lowest and next lowest result. The error vector represents the match between fields for a particular given delay, a low error indicating a good match. A valid raw measurement (that is to the nearest field) is deemed to have occurred if the lowest result is below a known threshold, and the next lowest result is sufficiently removed by a known amount, as determined by cells MINUS0, AMP3, GT0, GT1, GT2, VR2, and VR4. Such operation has proven to provide a high degree of immunity to false triggering while maintaining efficient responsiveness to legitimate matches. If the above criteria are met, cell AND0 passes the trigger pulse coming from either VIDV or VIDU by way of XOR0 and DELAY2. Cell P2, connected to AND0's output, enforces a minimum of 2.4 seconds time diversity between raw measurements, ensuring that one abrupt burst of undesired events, for example noise, do not overload the correlation and cause a false reading. The trigger pulse, if passed by P2, increments the five-deep indicated delay vector location stack contained in cell Z2. If all five locations in the stack are the same, indicating five such events, Z2 enables an update of Z1 via cell AND1. Z1, a zero order hold, stores the output delay number contained in the indicated delay vector location.

The threshold and time diversity criteria applied to the raw measurements are a novel solution required to offset non-ideal characteristics observed in some typical video delay mechanisms. A certain degree of non-correlation between successive fields is required to exceed the resultant threshold settings. An abrupt scene change, as opposed to a fading scene change, rapid motion within a scene, or an abrupt brightness change within a scene, may be required to produce an allowed raw measurement.

Measurements are subject to some additional conditions. Z0 stores the most recent raw measurement delay number. An update of Z1 is prevented by MINUS1, RECT1, LT0, and AND1, if it would mean a difference between Z0 and Z1 outputs outside the range of −79 to +78 counts. Without this provision, if the first raw measurement after the non-delayed and delayed fields rolled through alignment (necessitating field re-acquisition) was in error, a one field error in Z1 output could result. The output of LT0 is high to enable a Z1 update, low to inhibit a Z1 update. In effect, when the fields are coincident, followed by non-coincidence, it is highly probable that the delay has changed by a one field increment, owing to hysteresis operation in the video device where a field is repeated or dropped. In order to speed acquisition of the new delay measurement, it is desirable to change the measurement parameters such as thresholds and time diversity criteria. It is also desirable to change these parameters in order to decrease false measurements for signals having lots of measurement opportunities and to increase the frequency of measurements for signals having few opportunities.

If the raw indicated delay vector location exceeds that allowed by the Maximum Expected Delay DIP Switch, as determined by cell LTE0, a raw measurement is disabled. In addition, cell AND4 output is asserted. This causes VID1 to transfer a status bit to the microcontroller, indicating a raw measurement attempt beyond the maximum set by the maximum expected delay switch. Raw measurements and Z1 updates are disabled by any alarm condition, since the loss of either sync or the loss of lock of either PLL indicates invalid samples are being taken. It is thus wise to disable updates and to hold the last known good delay value until new valid samples and correlations can be made. Cell GP2 detects a summary alarm condition as presented by the hardware. A static alarm here will disable the outputs of both AND0 and AND1. A transient alarm, as detected by edge detector DET0, will cause monostable multivibrator MMV0 to disable AND0 and AND1 outputs for 730 mS (36.5 PAL B/G fields), allowing possibly suspect data to be flushed from any correlation. OR1 combines one other transient alarm. A change in hysteresis status, as detected by DET1, and passed through OR1 will also fire MMV0.

If MMV0's output is active, an update of Z1 is prevented by MINUS1, RECT1, LT0, and AND1, if it would mean a difference between Z0 and Z1 outputs outside the range of −10 to +9 counts. A transition of LT0's output to the active low state is detected by first-difference cell DIFF2, and causes Z2 to partially reset the stack. After this partial reset, a minimum of four new raw measurements are required to enable a new Z1 update. Cell GP1, configured as an output, flags an update event (or attempt, in the case of the maximum expected delay field being exceeded) to the microcontroller. The signal to GP1 is gated by AND2 and LT1. LT1 compares the count of timer P2. A low count on P2, in conjunction with a true signal level from AND1, indicates an update.

Cells MMV2, DIFF0, RECT0, MMV1, OR2, and DIFF1, are used for diagnostics only, and perform no role during normal service of the preferred embodiment, and are available to implement suggested alternative operations.

Cell A0 produces a lowpass filtered estimate of non-delayed video average picture level. Cell A1 performs the same operation on delayed video. A ratio of non-delayed to delayed video APL estimates is output from divider cell DIV0. This ratio is fed back to VID1, where it is used to scale the delayed sample values before correlation. This scaling improves correlation quality when the non-delayed and delayed video input picture levels differ. It will not correct non-linear distortion such as compression or differences in video setup levels. These problems could be handled however with minimal changes to the operation should it be expected that such problems would occur. The changes to the SPROC operation necessary to implement these improvements will be readily understood and easily performed by one skilled in the art from the teachings herein. For example, offset errors may be simply detected by inspecting the lowest value, corresponding to black, of the two sets of samples, and corrected by adding the error to the lower. Nonlinear errors may be detected by comparing samples at various levels, for example black, gray and white, from a given frame of the delayed signal to the same frame of the undelayed signal. Once the black and white levels are caused to be corrected, the difference in the gray level would correspond to the nonlinear error. This can be corrected by multiplying the samples with a gamma correction function as is well known in the art. Alternatively, a lookup table may be created from the detected nonlinearity and utilized for correction, also as is well known in the art. Even without such correlations, the present embodiment tolerates a good amount of non-linear distortion without significant decrease in performance.

Z1's output is supplied to VID1 for parallel port output to the microcontroller. Cell GP3 reads a handshaking control line from the microcontroller.

Cells PULSEOUT and GP0 output the signal used to form the DDO, the Delay Detector Output. DDO is a standard method of communicating delays via a periodic pulse whose width is changed to match the delay. The active low true level duration of PULSEOUT is determined by the output from Z1. PULSEOUT duration quantization is the inverse of the sample rate, or 102.4 microseconds, with a minimum duration of 102.4 microseconds.

When the preferred programs are used to operate the device of the schematic FIGS. 6–9, the preferred embodiment of the invention operates with many novel and useful features. The operation of the preferred embodiment is described below.

The preferred embodiment measures the delay between a video source and a delayed version of the video source. The measurement, along with certain status indicators, is presented on a LCD display. Additionally, DDO pulse and serial data delay outputs are available. The DDO pulse or serial data outputs may be directly used to control the desired delay of the Pixel AD2100 Audio Delay Synchronizer. A delay of between 0 and 8 fields may be measured.

In operation, non-delayed video and delayed video are input to the preferred embodiment via high-impedance loop-through connectors. Vertical sync is counted to establish candidate delays for 0 through 8 fields. Delay is counted to a nominal resolution of 102.4 microseconds (1024/10 MHz). Sixty-three pixels from each field of both video signals are digitized, and a correlation is performed. Under conditions of significant motion or scene changes, correlation differences between fields are used to select the most likely of the candidate fields. Redundant time-diversified measurements are performed to reduce the incidence of measurement errors.

The above described operation is normally used, as selected by jumpering JP1 pins 1 and 2 of FIG. 7B together. An alternative operation may be selected by jumpering JP1 pins 2 and 3 together. This latter operation is identical to the one described above, except for two parameters. Parameter P2.mincount2 is changed to 58571 from 23010. This increases the minimum time diversity between raw measurements from 2.4 to 6 seconds. Parameter VR2.level is changed to 477E-6 from 80E-6. This increases the minimum difference required, between the lowest and next lowest correlation error results from MIN3, to produce a valid raw measurement.

The following signal connections are shown on the schematics FIGS. 6–9. This section describes the signal connectors and their functions. NON-DELAYED VIDEO INPUT: Two BNC female connectors, J1 and J2 of FIG. 6A for high impedance loop through. The non-delayed video source should be connected here. DELAYED VIDEO INPUT: Two BNC female connectors, J3 and J4 of FIG. 6B for high impedance loop through. The delayed video source should be connected here. DDO PULSE OUT: A BNC female connector, J5 of FIG. 9B which outputs a periodic rectangular waveform, with high period equal to measured delay. This may be connected to a companion audio delay for correction of the lip sync error in television systems, for example the REMOTE DELAY connector on the Pixel Instruments Corporation of Los Gatos, Calif. AD2100 audio synchronizer. This connection will allow remote pulse width control of the AD2100 to perform appropriate matching audio delay. SERIAL OUT: A modular handset connector, J6 of FIG. 9B which outputs serial measured delay data. This may be connected to a companion audio delay for correction of the lip sync error in television systems, for example the SERIAL IN connector on the Pixel Instruments Corporation AD2100 audio synchronizer. This connection will also allow serial data remote control of the AD2100 if desired. MAXIMUM EXPECTED DELAY DIP SWITCH: This switch, located on FIG. 8B, is used to limit the range of correlation measurements. The maximum expected delay in fields is selected as a four bit binary number. The valid range is 1 to 8 fields. Measurements beyond the settling are ignored. Please see the "Setup and Adjustment" section for more information. LCD DISPLAY: A backlit LCD display is utilized which displays 2 lines of 20 characters each which is connected to J13 of FIG. 9B. In normal operation, the top line shows the most recently measured delay in seconds, and the bottom line shows elapsed time, in hours:minutes:seconds format, since the last measurement update:

```
Delay:    .xxxx Sec.
Last Update xx:xx:xx
```

When an update event is detected, the lower line will flash an indication:

```
Delay:    .xxxx Sec.
 ***New Update***
```

When a video alarm is detected, the lower line will alternate continuously between the normal display and an alarm message:

```
Delay:    .xxxx Sec.
Alarm: Undly'd Video
Delay:    .xxxx Sec.
Alarm: Dly'd Video
```

This display condition will persist until the alarm is cleared. In the event both video alarms are detected, the lower line will sequentially display all three messages.

A novel warning is provided to the operator if there is operation indicating that the Maximum Expected Delay is not set properly. If ten or more consecutive raw measurements, as explained in the next subsection, corresponding to fields beyond the Maximum Expected Delay DIP Switch setting occur, a warning is displayed:

```
Delay:    .xxxx Sec.
WARN: Max Dly Switch
```

The lower line will alternate sequentially with other messages. If this warning is observed, the setting of the Maximum Expected Delay DIP Switch should be checked.

DISPLAY INTERPRETATION/GENERAL OPERATIONAL CHARACTERISTICS

The displayed delay is the most recent delay count for the delayed video field determined to have the best correlation measurement relative to an undelayed video field. The delay count is measured internally in increments of 102.4 microseconds, and converted to the nearest 0.1 mS for presentation by the LCD display. A raw measurement consists of a relative field delay indication resulting from a qualified correlation. Five consecutive raw measurements, spaced a minimum of 2.4 seconds each apart, all returning the same relative field, are required for field determination. Whenever a raw measurement agreeing with all four previous raw measurements is obtained the *New Update* indication will flash, and the elapsed time indication will reset. At power up, delay is initialized to zero. Once five raw measurements in agreement are obtained the delay of the determined field, based on vertical sync timing, is presented without the aforementioned time diversity delays. The elimination of the time diversity delays speeds acquisition of the new delay value after powerup. A new displayed reading will continue to become available once per second, in response to vertical sync timing, as long as the most recent five raw measurements agree, subject to limitations described below. If the most recent five raw measurements are not all the same, the displayed reading will hold at the last known number. This will occur during initial field acquisition, field re-acquisition after an anomalous raw measurement, or new field acquisition. New field acquisition is required when the non-delayed and delayed video vertical syncs roll through one another. New field acquisition may also be required when large delay discontinuities occur. Because of the redundant time-diversified measurement technique, a minimum of 12 seconds is required for field acquisition or re-acquisition.

Field acquisition or re-acquisition is also required if the delay of the determined field becomes removed from the last raw measurement value by approximately 8 mS or more, in the absence of an alarm condition. In the presence of an alarm condition, acquisition or re-acquisition is required if the delay of the determined field becomes removed from the last raw measurement value by approximately 1 mS or more. In these cases, a minimum of four raw measurements, covering a minimum of 9.6 seconds, is required. As before, the displayed reading will hold at the last known number until acquisition or re-acquisition is complete.

The pulse width of the DDO output signal corresponds to the displayed delay reading. SERIAL OUT data also corresponds to the displayed reading. These two signals retain the internal 102.4 microseconds resolution. The DDO pulse width is equal to the measured delay for all delays except zero. In the case of zero measured delay, the DDO pulse width is 102.4 microseconds. The repetition period of the DDO pulse is 840 milliseconds plus the pulse width. The repetition period of SERIAL OUT data is one second.

An abrupt scene change, rapid motion within a scene, or an abrupt brightness change within a scene, may be required to produce a raw measurement. Slow fades or subdued motion may not always produce a raw measurement. Program material of low brightness may produce fewer raw measurement opportunities.

Alarm indications result from loss of composite sync, or the assertion of the internal sync PLL lock alarms. During any alarm condition, all measurements are suspended, and the display reading, DDO width, and SERIAL OUT data are held at the last known value.

The preferred embodiment will now be described in more detail with respect to FIGS. 6–9. Operation of the preferred embodiment can be functionally divided into three areas—data acquisition, digital signal processing, and microcontroller/display.

Data Acquisition, FIGS. 6 and 8

Data acquisition circuits for the non-delayed and delayed video signals are identical and independent, up to the point of joining the SPROC digital signal processor parallel port bus. Input amplifiers U1/U12 are configured as high impedance differential instrumentation amplifiers. This minimizes loop through loading, and provides some common mode rejection. Video clamp pulses are produced by sync strippers U10/U19 and monostable multivibrators U26A/U25A. U2A, B,C/U13A, B,C condition the video signal for the sync strippers.

Sync generators U3/U14 phase lock to the composite sync output from U10/U19. U3 and U14 produce horizontal, vertical, composite blanking, and clock signals utilized by PLDs US/U16 and U7/U18. U5/U16 output field flags (RTS0/RTS2) to the SPROC. After reading these flags, the SPROC performs a write operation to US/U16. US/U16 decode this write, and clear the field flags. In each field, nine active video pixels from each of seven lines, spaced at 35 (NTSC) or 42 (PAL B/G) line intervals, are digitized to 8 bit resolution. U7/U18 produce the necessary timing signals for A/D converters U4/U15 and FIFO memories U6/U17. Analog video applied to U4/U15 from amplifiers U1/U12 is lowpass filtered by R8,C22/R38,C46 so that only luminance information is digitized. U7/U18 .output line flags (RTS1/RTS3) to the SPROC when FIFO data is ready. U5/U16 decode FIFO read enables from the SPROC bus. The first read enable also causes U7/U18 to reset the line flags. The SPROC reads the nine pixels from a given line at the average SPROC cycle interval of 102.4 microseconds. After all have been read, the FIFO is reset by U9A/U9B and U7/U18.

U3/U14 PLL tuning voltages are buffered by U2D/U13D, and then AC-coupled into window comparators U20/U23 and U21/U24. Tuning voltage transients resulting from loss of lock, or from a very noisy input signal, will exceed the window threshold. U20/U23 will then reset U22A/U22B, asserting active low alarm signal/ALARMND or/ALARMD. U22A/U22B also function as sync presence detectors. U22A/U22B are normally continuously retrigged by a 50% duty cycle H rate pulse from U26B/U25B. If sync is lost, U22A/U22B time out, asserting active low alarm signal ALARMND or/ALARMD. Therefore, either PLL loop transients and/or complete loss of sync will produce an alarm condition.

DIP switch S1 is used to set the 4 bit maximum expected delay in fields. U5 decodes the read enable, causing tri-state buffer U11 to place the DIP switch settings on the SPROC bus.

JP20 selects NTSC or PAL B/G video format by altering applicable control inputs to U3, U7, U14, and U18.

Digital Signal Processing Hardware FIG. 7

DSP chip U36 (the "SPROC") executes the signal processing algorithm. U36 is clocked at 50 MHz by TTL clock oscillator U47. JP2 selects master (jumper omitted) or slave (jumper installed) mode for U36. Master mode is used, so the JP2 jumper must be omitted. Communication between U36 and peripheral devices takes place via the SPROC parallel port. This port consists of 16 bit address bus ADRS[0 . . . 15], 24 bit data bus DATA[0..23], chip select CSSPR, write/WRSPR, and read/RDSPR. These signals allow bidirectional 24, 16 or 8 bit parallel data transfer. RTS0 through RTS3 are one bit input lines. GP0 through GP3 are one bit input or output lines.

Upon power-up, watchdog timer U39 resets U36. When U36 comes out of reset, an internal bootstrap routine loads the SPROC program from EPROM U37 into internal RAM. Two programs may be stored in U37, selected by JP1. Normally, the "LO" position is used. When program loading is complete, execution begins. Execution is triggered by a 9765.625 Hz (10 MHz/1024) square wave applied to U36 pin 67 (COMPUTE0). This forms the effective DSP "sample rate". This trigger signal is generated from the 50 MHz clock by dividers U46, U45, and U44.

J8 is the access port connector. J8 allows communication with internal registers of U36. DAC U38 provides an analog representation of internal U36 registers (output from the U36 probe port) under access port or U37 program control. Switched-capacitor filter U40 may be used as a reconstruction filter for the probe signal. U40 is clocked at 390.625 kHz by U45. U40 has a cutoff frequency of 0.01 times the clock frequency, or 3.906 kHz. J8, U38, and U40 are provided for factory test use, and are not used during normal operation. J7 provides access to the RTS, GPIO, and COMPUTE lines. J10 and J9 provide access to the SPROC serial output and serial input ports, respectively. J7, J9, and J10 are not used in the preferred embodiment.

PLD U43 triggers watchdog timer U39 at regular intervals, when presented with the proper address and data from the SPROC. If these resets from U43 should cease, U39 will time out and issue a SPROC reset. S2 provides manual reset capability for test use. S2 is not used during normal operation. J16 provides power for LCD illumination.

Microcontroller/Display FIG. 9

The controller section reads measured delay data and certain status information from the DSP and data acquisition sections; operates the LCD display; and outputs serial data for remote control of the AD2100. EPROM U28 stores the program for microprocessor U34. Address/Data bus multiplexing is performed by U27. U34 requests parallel delay data from the SPROC by asserting active low line/READ DELAY. The SPROC then writes data to registers U30, U31 and U33. After/READ DELAY is de-asserted, U34 may read the contents of U30 and U31, and the LSB of U33. U30 and U31 contain delay data. The U33 LSB, when true, indicates a raw measurement attempt beyond the setting of the Maximum Expected Delay DIP Switch. PLD U29 performs read enable decoding.

Video alarm lines/ALARMND and/ALARMD are read by U34. AND gate U42B transmits a summary alarm line to SPROC input GP2. U34 also reads SPROC output line GP1. GP1 is asserted by the SPROC to indicate an update event. JP20 is read by U34, and used to indicate NTSC or PAL mode on the LCD display at power-up. U34 transfers delay, alarm, and update information to the LCD display via header J13. U34 also calculates and displays elapsed time since the last update.

JP3 selects the DDO pulse origin. If JP3-1 and JP3-2 are connected, the SPROC GP0 line is used. If JP3-2 and JP3-3 are connected, the DDO pulse originates from U34. Line driver U35A buffers the DDO signal, and outputs it to J5. Line drivers U35B and U35C buffer serial remote data and clock from U34, and output these signals to modular handset jack J6. RS-232 interface U32, and connector J12, provide a U34 serial port for factory test use only. U32 and J12 are not used during normal operation.

Register U33 provides expansion capability. Header J14 allows for connection of U33's outputs to the U34 bus.

Setting Maximum Expected Delay

The Maximum Expected Delay DIP Switch, S1 is used to limit raw measurements to those within the expected valid range. While this switch is set by the operator in the preferred embodiment, It will be quite useful to set this value automatically by cooperation with the actual delaying mechanism, thus for example when video is processed in devices which can have a different maximum delay depending on the type of processing, the limit can be adjusted accordingly. For example, a compressed video decoder may have a different throughput delay depending on whether it delays PAL, HDTV or NTSC signals, and further depending on whether it operates with the MPEG 1 or the MPEG 2 compression standard. In this case, the current operation or the maximum delay may be coupled to the DSP section, for example by the expansion connectors which are provided.

When set, S1 will prevent possible anomalous measurements beyond the maximum anticipated number of fields of delay. It should be noted that if S1 is set below the actual maximum delay to be encountered, valid measurements may also be inhibited. The settings are as follows ("x" indicates "don't care"):

| MAXIMUM EXPECTED | SWITCH POSITION | | | |
|---|---|---|---|---|
| DELAY IN FIELDS | 4 | 3 | 2 | 1 |
| 1 | off | off | off | on |
| 2 | off | off | on | off |
| 3 | off | off | on | on |
| 4 | off | on | off | off |
| 5 | off | on | off | on |
| 6 | off | on | on | off |
| 7 | off | on | on | on |
| 8 | on | x | x | x |

A novel operator warning is provided if delays are consistently measured in excess of the maximum set on the switches. This assists the careless operator in making a proper setting while preventing the system from sending improper delay values during non-valid modes of video system operation.

Jumper/Connector Settings

JP3: Jumper must be installed from pins 1 to 2. JP3 selects the source of the DDO pulse. JP3-1 to JP3-2 selects the SPROC, JP3-2 to JP3-3 selects the microcontroller should one wish to program the microcontroller to provide this function. J14: J14 is not used. Must not have any jumpers installed. JP1: Selects one of two SPROC signal processing programs. The preferred embodiment is normally operated with the jumper installed from pins 1 to 2 of JP1. This will select the program with the operational characteristics as described above. JP2: Selects SPROC master or slave mode. Jumper omitted selects master mode, jumper installed selects slave mode. Jumpers and connectors J7, J8, J9, J10, and J12 are not used in the preferred embodiment. These jumpers and connectors, along with JP2, are omitted in the preferred embodiment but are provided to allow one of ordinary skill in the art to cascade SPROC ICs in order to add suggested improvements and enhancements which can not be programmed into a single device. 1.6. JP20: Selects NTSC (the two pins closest to the "NTSC" marking jumpered) or PAL B/G (the two pins closest to the "PAL" marking jumpered) mode. The LCD display indicates the selected mode at power-up.

ADJUSTMENTS

1. LCD Display Viewing Angle: While observing the LCD display, adjust VR1 until the desired result is obtained.

2. Adjustment of High Frequency Common Mode Rejection: After the circuitry has warmed up for 20 minutes, apply a sine wave signal of amplitude approximately 1 V pk-pk and frequency approximately 1 MHz simultaneously to both the center and outer contacts off J1. Monitor TP4 on an oscilloscope, using a 10X probe. Connect the probe ground lead to TP8. Adjust VC1 for minimum signal. Apply the same signal to both the center and outer contacts of J3. Monitor TP6 on an oscilloscope, using a 10X probe. Connect the probe ground lead to TP8. Adjust VC2 for minimum signal.

3. Adjustment of Video A/D Converter Offsets: Allow a warm up for 20 minutes before making this adjustment. Apply a 0 IRE video signal to both inputs. Adjust VR2 such that U4 produces an average output word of 25 hex. Some toggling of the two lowest-order bits may be observed. The U4 output word may be observed at J17. J17 pin 8 is the MSB. U4's convert signal may be monitored at TP36. The input signal is sampled at the falling edge of the convert signal, and the corresponding output word becomes available after a rising edge of the convert signal, delayed by 2 ½ convert signal cycles. Accuracy of the adjustment will be highest if samples taken near the end of a video line are used, since significant lowpass filtering is present ahead of U4. Similarly, adjust VR4 such that U15 produces an average output word of 25 hex. The U15 output word may be observed at J18. J18 pin 8 is the MSB. U15's convert signal may be monitored at TP37.

The identity of the DSP processor of the preferred embodiment, SPROC, is a trademark of Star Semiconductor Inc. While the present invention has been described in the particular form of its preferred embodiment by way of example, it will be understood that the invention disclosed herein may be practiced in other than the preferred embodiment, either by itself or in conjunction with other processing. The invention may be practiced with numerous changes in the arrangement, structure and combination of the individual elements, as well as with substitution of equivalent functions and circuits for the elements in order to optimize the invention for a particular application, all without departing from the scope and spirit of the invention as hereinafter claimed.

What is claimed is:

1. An apparatus for determining the best match between a first image and a plurality of other images, the system comprising in combination:

an element for selecting known image locations, an element for taking a first set of samples of said first image at said image locations, an element for taking at least a second set of samples from one of said plurality of other images at said known image locations, an element for taking at least a third set of samples from another of said plurality of other images at said known image locations, an element for comparing said first set of samples to said second set of samples and to said third set of samples, an element for determining which of said second and said third set of samples most closely matches said first set.

2. An apparatus as claimed in claim 1 wherein said image is rectangular, and all said locations are located in a circle contained within said rectangular image.

3. An apparatus as claimed in claim 2 wherein said circle has a diameter which is between 10% and 50% less than the length of the smallest side of said rectangle which circle is centered within said rectangle.

4. An apparatus as claimed in claim 1 wherein said samples are taken on only the luminance portion of said images.

5. An apparatus as claimed in claim 1 wherein said samples are taken on one or more color components of said images.

6. An apparatus as claimed in claim 1 wherein said element for determining which of said second and said third set of samples most closely matches requires that a given set match within a known threshold.

7. An apparatus as claimed in claim 1 wherein said element for determining which of said second and said third set of samples most closely matches requires that a given set match within a known offset amount better than any other set.

8. An apparatus as claimed in claim 6 or 7 wherein said threshold or said offset may be adjusted in response to image quality.

9. An apparatus for determining the delay of a delayed version of a sequence of images with respect to a relatively undelayed version, the system comprising in combination:

a) an element for taking a first set of samples of one of images from one of said delayed or undelayed sequences of images at a plurality of known sample positions, b) an element for taking other sets of samples for each of a plurality of images of the other of said delayed or undelayed sequences at said plurality of known sample positions, c) an element for comparing said first set of samples to said other sets of samples, d) an element for determining which of said other sets of samples most closely matches said first set.

10. An apparatus as claimed in claim 9 wherein said image is rectangular, and said locations are located in a circle contained within said rectangular image.

11. An apparatus as claimed in claim 10 wherein said circle has a diameter which is between 10% and 50% less than the length of the smallest side of said rectangle and centered within said rectangle.

12. An apparatus as claimed in claim 9 wherein said samples are taken on only the luminance portion of said images.

13. An apparatus as claimed in claim 9 wherein said samples are taken on one or more color components of said images.

14. An apparatus as claimed in claim 9 wherein said element a) takes samples of one of the images from said undelayed sequence.

15. An apparatus as claimed in claim 9 wherein said element a) takes samples of one of the images from said delayed sequence.

16. An apparatus as claimed in claim 9 wherein said sequence of images is a video signal in raster scanned format.

17. An apparatus as claimed in claim 9 wherein said sequence of images is a video signal in bit mapped format.

18. An apparatus as claimed in claim 9 wherein said sequence of images is a video signal in compressed data format.

19. An apparatus as claimed in claim 9 wherein said element for determining which of said other sets of samples most closely matches requires that a given other set match within a known threshold.

20. An apparatus as claimed in claim 9 wherein said element for determining which of said other sets of samples most closely matches requires that a given other set match within a known offset amount better than any other set.

21. An apparatus as claimed in claim 19 or 20 wherein said threshold or said offset may be adjusted in response to image quality.

22. A method for determining the best match between a first image and a plurality of other images, the system comprising the steps of:

selecting known image locations, taking a first set of samples of said first images at said image locations, taking at least a second set of samples from one of said plurality of other images at said known image locations, taking at least a third set of samples from another of said plurality of other images at said known image locations, comparing said first set of samples to said second set of samples and to said third set of samples, determining which of said second and said third set of samples most closely matches said first set.

23. A method as claimed in claim 22 wherein said image is rectangular, and said locations are located in a circle contained within said rectangular image.

24. A method as claimed in claim 23 wherein said circle has a diameter which is between 10% and 50% less than the length of the smallest side of said rectangle which circle is centered within said rectangle.

25. A method as claimed in claim 22 wherein said samples are taken on only the luminance portion of said images.

26. A method as claimed in claim 22 wherein said samples are taken on one or more color components of said images.

27. A method as claimed in claim 22 wherein said step for determining which of said second and said third set of samples most closely matches said first set requires that a given set match within a known threshold.

28. A method as claimed in claim 22 wherein said step for determining which of said second and said third set of samples most closely matches requires that a given set match within a known offset amount better than any other set.

29. A method as claimed in claim 27 or 28 wherein said threshold or said offset may be adjusted in response to image quality.

30. A method for determining the delay of a delayed version of a sequence of images with respect to a relatively undelayed version, the method including the steps of:

a) taking a first set of samples of one of images from one of said delayed or undelayed sequences of images at a plurality of known sample positions, b) taking a plurality of other sets of samples at said plurality of known sample positions for a plurality of images of the other of said delayed or undelayed sequences, c) comparing said first set of samples to each of said other sets of samples to determine the difference thereof, d) determining which of said other sets of samples most closely matches said first set.

31. A method as claimed in claim 30 wherein said image is rectangular, and said locations are located in a circle contained within said rectangular image.

32. A method as claimed in claim 31 wherein said circle has a diameter which is between 10% and 50% less than the length of the smallest side of said rectangle and centered within said rectangle.

33. A method as claimed in claim 30 wherein said samples are taken on only the luminance portion of said images.

34. A method as claimed in claim 30 wherein said samples are taken on one or more color components of said images.

35. A method as claimed in claim 30 wherein said step a) takes samples of one of the images from said undelayed sequence.

36. A method as claimed in claim 30 wherein said step a) takes samples of one of the images from said delayed sequence.

37. A method as claimed in claim 30 wherein said sequence of images is a video signal in raster scanned format.

38. A method as claimed in claim 30 wherein said sequence of images is a video signal in bit mapped format.

39. A method as claimed in claim 30 wherein said sequence of images is a video signal in compressed data format.

40. A method as claimed in claim 30 wherein said step for determining which of said second and said third set of samples most closely matches said first set requires that a given set match within a known threshold.

41. A method as claimed in claim 30 wherein said step for determining which of said second and said third set of samples most closely matches requires that a given set match by a known offset amount better than any other set.

42. A method as claimed in claim 40 or 41 wherein said threshold or said offset may be adjusted in response to image quality.

43. An apparatus for determining the delay of a delayed version of an image carrying signal with respect to a relatively undelayed version thereof, the system comprising in combination:

a) an element for taking a first set of samples of at least a first frame from one of said delayed or undelayed signals at a plurality of known sample positions, b) an element for taking other sets of samples for each of a plurality of frames of the other of said delayed or undelayed signal, c) an element for comparing said first set of samples to said other sets of samples, d) an element for determining which of said other sets of samples matches said first set within a known threshold value, e) an element for outputting said delay in response to the matching of said first and other sets of samples.

44. An apparatus for determining the delay of a delayed version of an image carrying signal with respect to a relatively undelayed version thereof, the system comprising in combination:

a) an element for taking a first set of samples of at least a first frame from one of said delayed or undelayed signals at a plurality of known sample positions, b) an element for taking other sets of samples for each of a plurality of frames of the other of said delayed or undelayed signal, c) an element for comparing said first set of samples to said other sets of samples, d) an element for determining which of said other sets of samples matches said first set by a known offset value better than any other set, e) an element for outputting said delay in response to the matching of said first and other sets of samples.

45. An apparatus as claimed in claim 43 or 44 wherein said image carrying signal is a video signal having vertical sync portions and said value of element d) is adjusted in response to coincidence of the vertical sync portion of said delayed and undelayed video signals.

46. An apparatus as claimed in claim 43 or 44 wherein said value of element d) is adjusted in response to the noise on said delayed or undelayed signal.

47. An apparatus as claimed in claim 43 or 44 wherein said value of element d) is adjusted in response to the motion on said delayed or undelayed signal.

48. An apparatus as claimed in claim 43 or 44 wherein element e) includes restricting the time between changing of said delay which is output.

49. An apparatus as claimed in claim 43 or 44 wherein said value of element d) is changed in response to the time from the last finding of a match in element d).

50. A method for determining the delay of a delayed version of an image sequence with respect to a relatively undelayed version thereof, said method comprising the steps of:

a) taking a first set of samples of at least a first image from one of said delayed or undelayed image sequences at a plurality of known sample locations, b) taking other sets of samples for each of a plurality of images of the other of said delayed or undelayed image sequences, c) comparing said first set of samples to said other sets of samples, d) determining which of said other sets of samples matches said first set of samples, e) outputting said delay in response to the matching of said first and other sets of samples.

51. A method as claimed in claim 50 wherein said value of step d) is changed in response to a restarting of said method.

52. A method as claimed in claim 50 wherein said value of step d) is changed in response to the removal of an alarm indicating an abnormal operation of step a) or b).

53. A method as claimed in claim 50 wherein said delay which is output in step e) is held in response to an alarm indicating an abnormal operation of step a) or b).

54. A method as claimed in claim 50 wherein said delay which is output in step e) is limited to a maximum amount.

55. A method as claimed in claim 50 wherein said delay which is output in step e) is limited to a maximum amount, and upon determination of a predetermined number of delay measurements which exceed said maximum amount a warning condition is generated.

56. A method as claimed in claim 50 wherein said delay which is output in step e) is limited to a maximum amount, which amount is responsive to a device which results in the creation of the delay of said delayed version.

* * * * *